United States Patent
McNelley et al.

(10) Patent No.: US 6,710,797 B1
(45) Date of Patent: Mar. 23, 2004

(54) ADAPTABLE TELECONFERENCING EYE CONTACT TERMINAL

(75) Inventors: Steve H. McNelley, San Juan Capistrano, CA (US); Jeffrey S. Machtig, Lake Forest, CA (US)

(73) Assignee: Videotronic Systems, San Juan Capistrano, CA (US)

( * ) Notice: Subject to any disclaimer, the term of this patent is extended or adjusted under 35 U.S.C. 154(b) by 85 days.

(21) Appl. No.: 10/033,655

(22) Filed: Dec. 27, 2001

Related U.S. Application Data

(63) Continuation-in-part of application No. 09/777,145, filed on Feb. 5, 2001, now abandoned, which is a continuation of application No. 09/262,974, filed on May 17, 1999, now Pat. No. 6,243,130, which is a continuation-in-part of application No. 09/108,476, filed on Jul. 1, 1998, now Pat. No. 5,953,052, which is a continuation-in-part of application No. 08/530,880, filed on Sep. 20, 1995, now Pat. No. 5,777,665.

(51) Int. Cl.[7] .................................................. H04N 7/14
(52) U.S. Cl. .............................. 348/14.16; 348/14.08; 348/14.09
(58) Field of Search .......................... 348/14.01–14.09, 348/14.1, 14.11–14.13, 14.16, 335, 835; 359/296; 313/478, 474; H04N 7/14

(56) References Cited

U.S. PATENT DOCUMENTS

| | | | | |
|---|---|---|---|---|
| 3,755,623 A | | 8/1973 | Cassagne | 340/20 |
| 4,400,725 A | | 8/1983 | Tanigaki | 348/14.16 |
| 4,598,973 A | * | 7/1986 | Greenleaf | 359/3 |

(List continued on next page.)

FOREIGN PATENT DOCUMENTS

| | | | | |
|---|---|---|---|---|
| DE | 3625646 | | 2/1988 | 379/53 |
| GB | 2353429 | | 2/2001 | 7/14 |
| JP | 63228890 | | 9/1988 | H04N/7/14 |
| JP | 36240283 A | * | 10/1988 | H04N/7/14 |
| JP | 403214899 A | * | 9/1991 | H04R/5/033 |
| JP | 406141318 A | * | 5/1994 | H04N/7/15 |
| JP | 406351010 A | * | 12/1994 | H04N/7/14 |
| JP | 02000175171 A | * | 6/2000 | H04N/7/15 |

OTHER PUBLICATIONS

"A Large–Screen Visual Telecommunication Device Enabling Eye Contact", Shinichi Shiwa et al. NTT Human Interface Laboratories, Yokosuka, Japan SID 91 Digest, pp. 327–328.

Private Eye (Advanced Technology Security Filter), Eyesaver International, Inc., Hingham, Massachusetts.

Optical Systems Light Control Film, from 3M.

"A device that provides and eye–to–eye video perspective for interactive television", by A. Rodney Wellens, Behavior Research Methods & Instrumentation, 1978, vol. 10 (1), pp. 25–26.

*Primary Examiner*—Melur Ramakrishnaiah
(74) *Attorney, Agent, or Firm*—Reed Smith LLP

(57) ABSTRACT

The present invention enables eye contact between conferees during a teleconference using a terminal equipped with a beam-splitter. The camera is positioned behind the viewing side of the beam-splitter to capture the conferee's image through the beam-splitter. The reflection of the video display appears to be positioned in a room environment with common room objects, serving to associate the position of the reflection in the room environment. The transparent quality of the beamsplitter is used not only for capturing eye contact images from one direction, but also revealing the room environment by enabling the conferee to see-through the beamsplitter. The invention can be configured to create the appearance that a life-size teleconference image of a remote conferee appears in the same room as the local conferee viewing the reflection and appears to be sitting on the other side of the desk or table.

53 Claims, 29 Drawing Sheets

U.S. PATENT DOCUMENTS

| | | | |
|---|---|---|---|
| 4,653,875 A | 3/1987 | Hines | 359/487 |
| 4,663,562 A | 5/1987 | Miller et al. | 313/478 |
| 4,738,522 A | 4/1988 | Lunde et al. | 353/28 |
| 4,805,895 A | 2/1989 | Rogers | 272/10 |
| 4,821,307 A | 4/1989 | Flint, III | 348/20 |
| 4,928,301 A | 5/1990 | Smoot | 348/14.16 |
| 5,104,210 A | 4/1992 | Tokas | 359/296 |
| 5,117,285 A | 5/1992 | Nelson et al. | 348/14.16 |
| 5,159,445 A | 10/1992 | Gitlin et al. | 348/14.01 |
| 5,170,427 A * | 12/1992 | Guichard et al. | 348/14.05 |
| 5,194,955 A | 3/1993 | Yoneta et al. | 348/14 |
| 5,243,413 A | 9/1993 | Gitlin et al. | 348/269 |
| 5,278,681 A | 1/1994 | Gitlin et al. | 349/61 |
| 5,317,405 A | 5/1994 | Kuriki et al. | 348/20 |
| 5,422,683 A | 6/1995 | Tanigaki | 348/15 |
| 5,438,357 A | 8/1995 | McNelley et al. | 348/14.1 |
| 5,489,938 A * | 2/1996 | Maruyama et al. | 348/14.08 |
| 5,532,736 A | 7/1996 | Kuriki et al. | 348/20 |
| 5,573,325 A | 11/1996 | Lekowski | 353/79 |
| 5,689,641 A * | 11/1997 | Ludwig et al. | 348/14.09 |
| 5,767,897 A * | 6/1998 | Howell | 348/14.08 |
| 5,777,665 A | 7/1998 | McNelley et al. | 348/20 |
| 5,953,052 A | 9/1999 | McNelley et al. | 348/20 |
| 6,243,130 B1 | 6/2001 | McNelley et al. | 348/20 |
| 6,290,359 B1 | 9/2001 | Shriver | 353/28 |
| 2001/0013891 A1 * | 8/2001 | Hamilton | 348/14.08 |

* cited by examiner

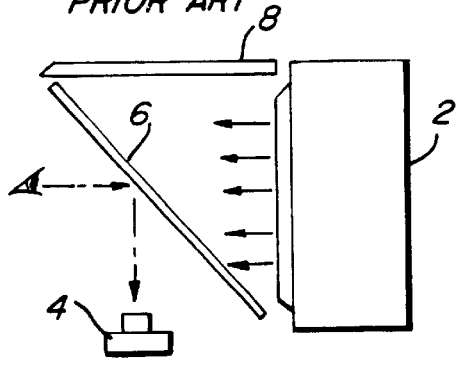
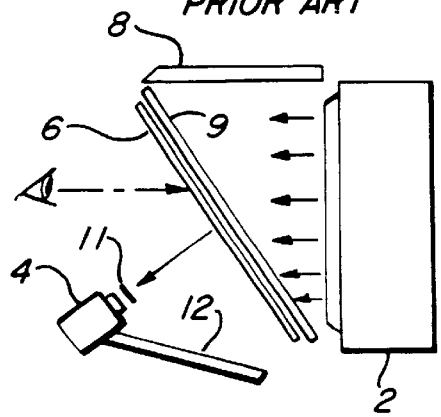
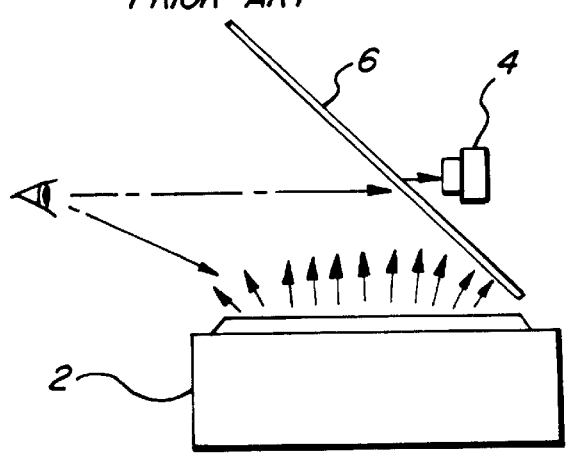
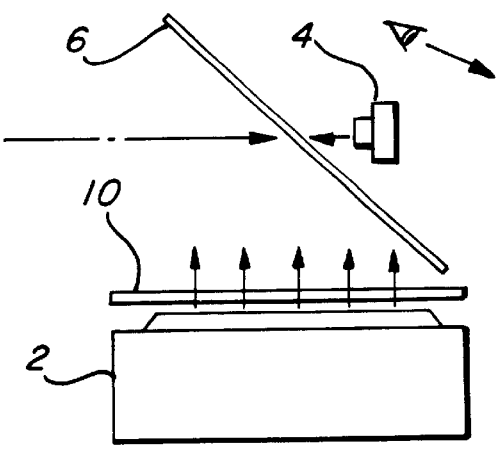
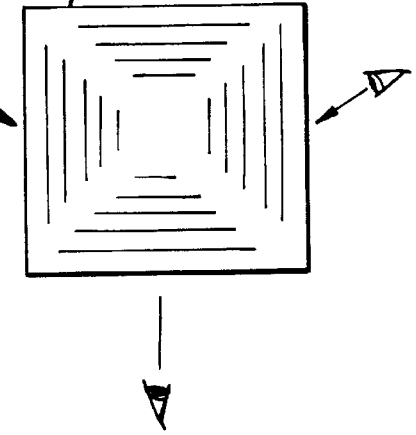

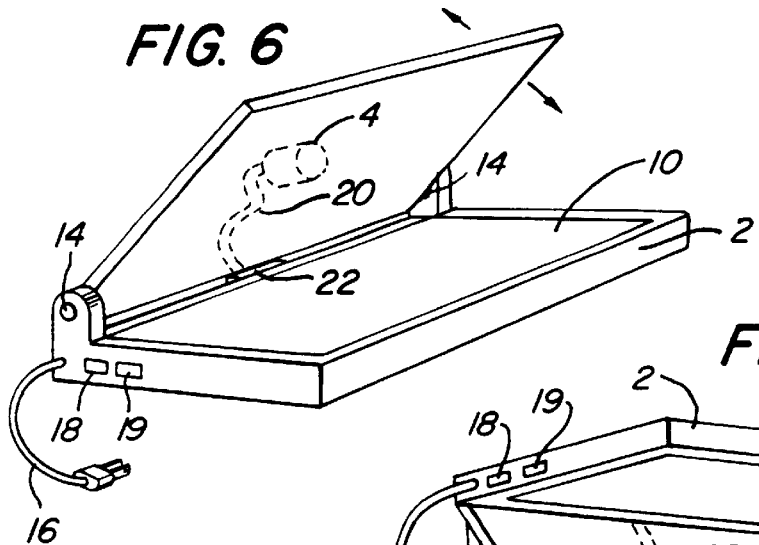
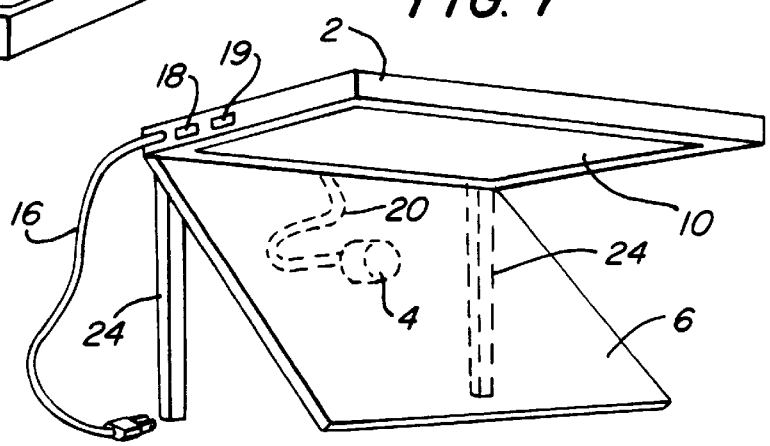
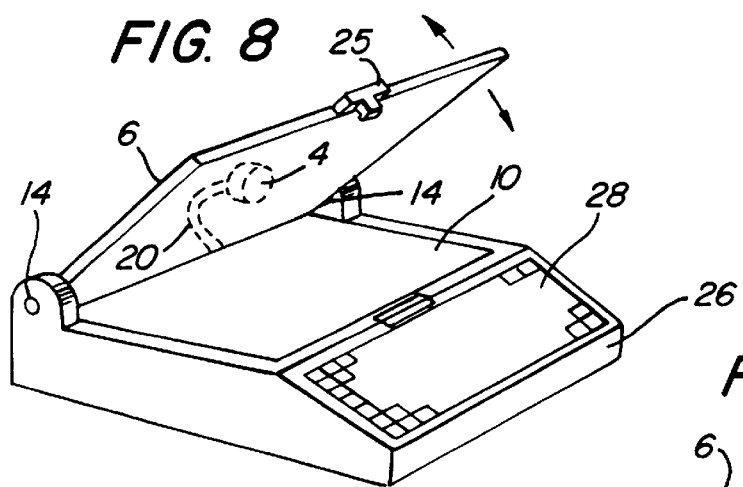
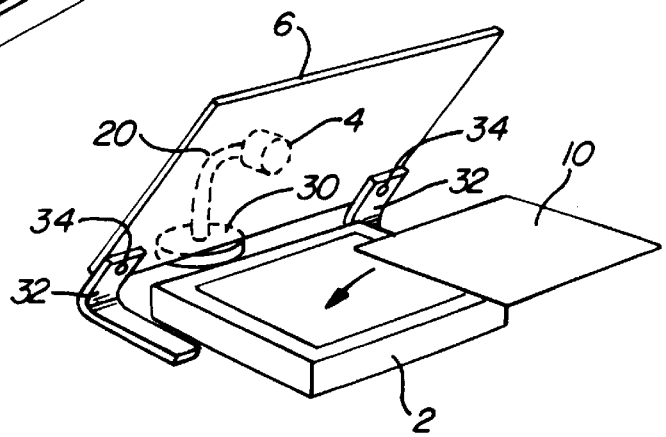

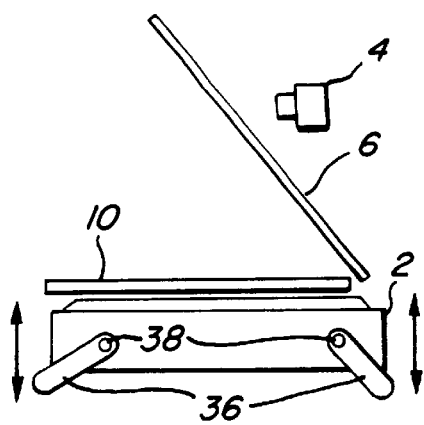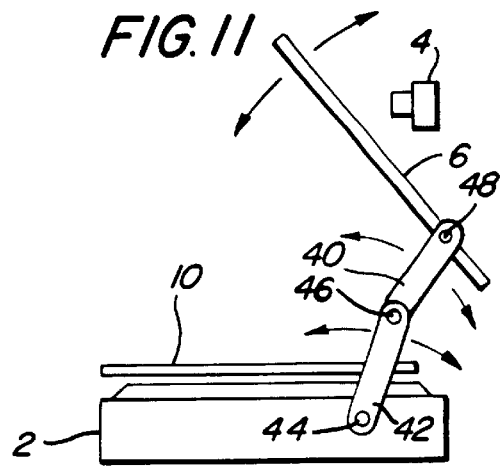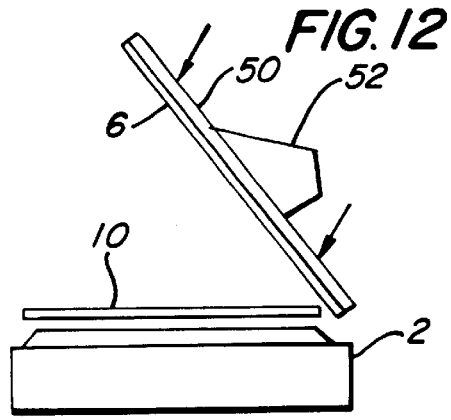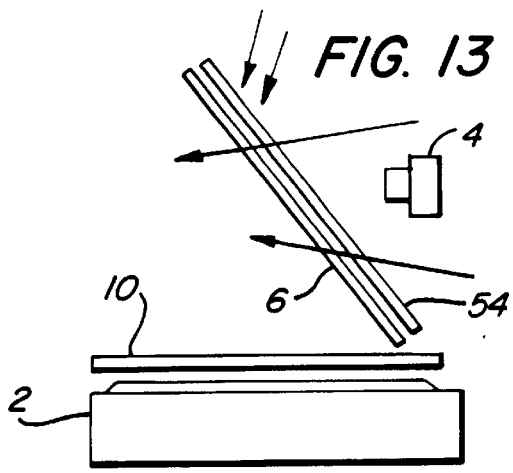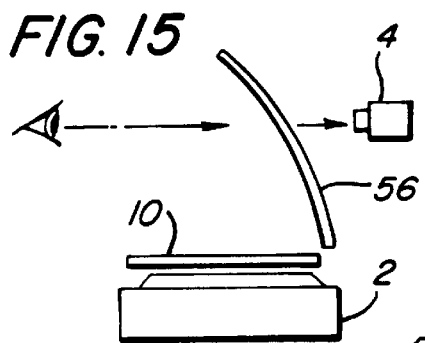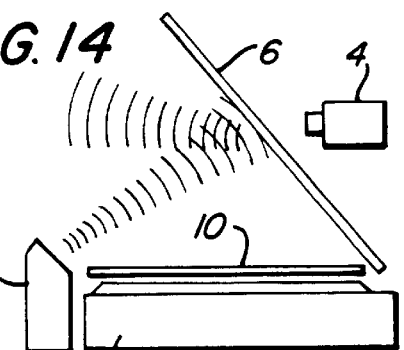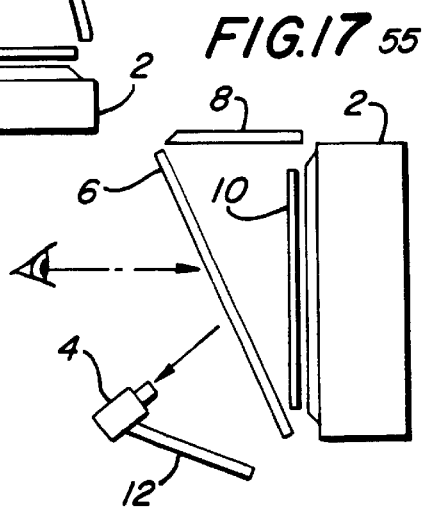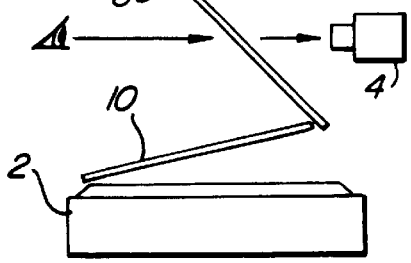

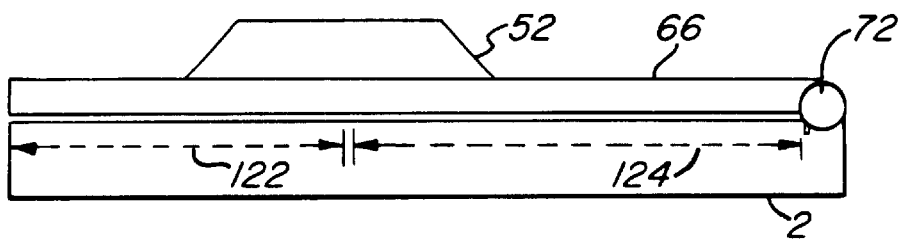
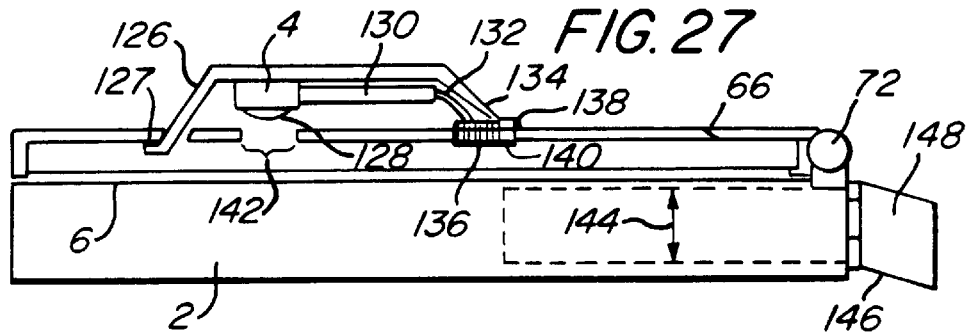
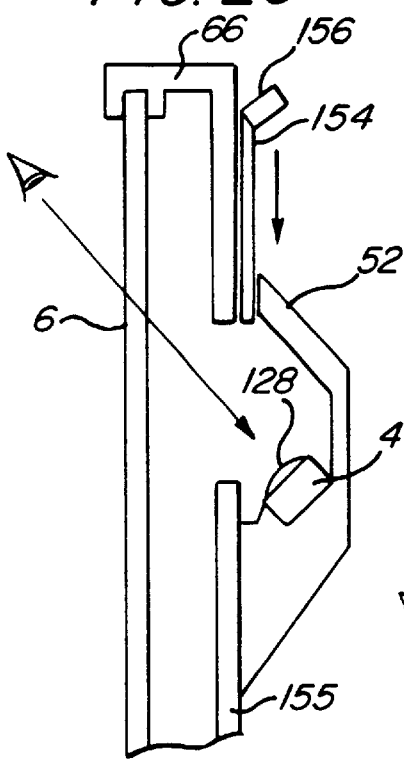
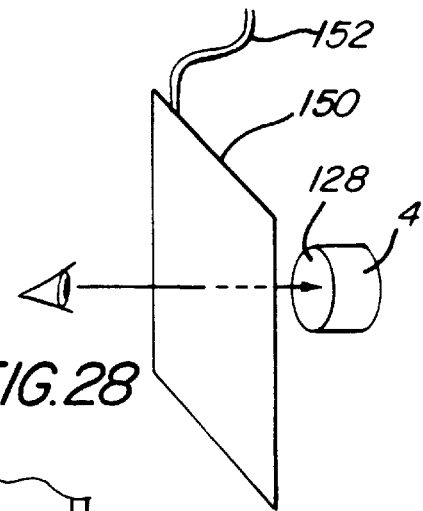
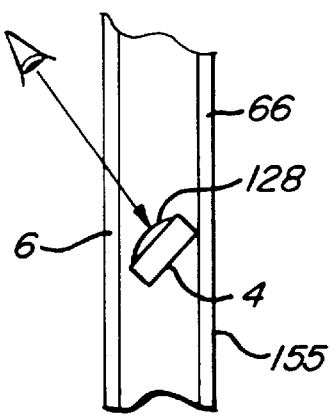

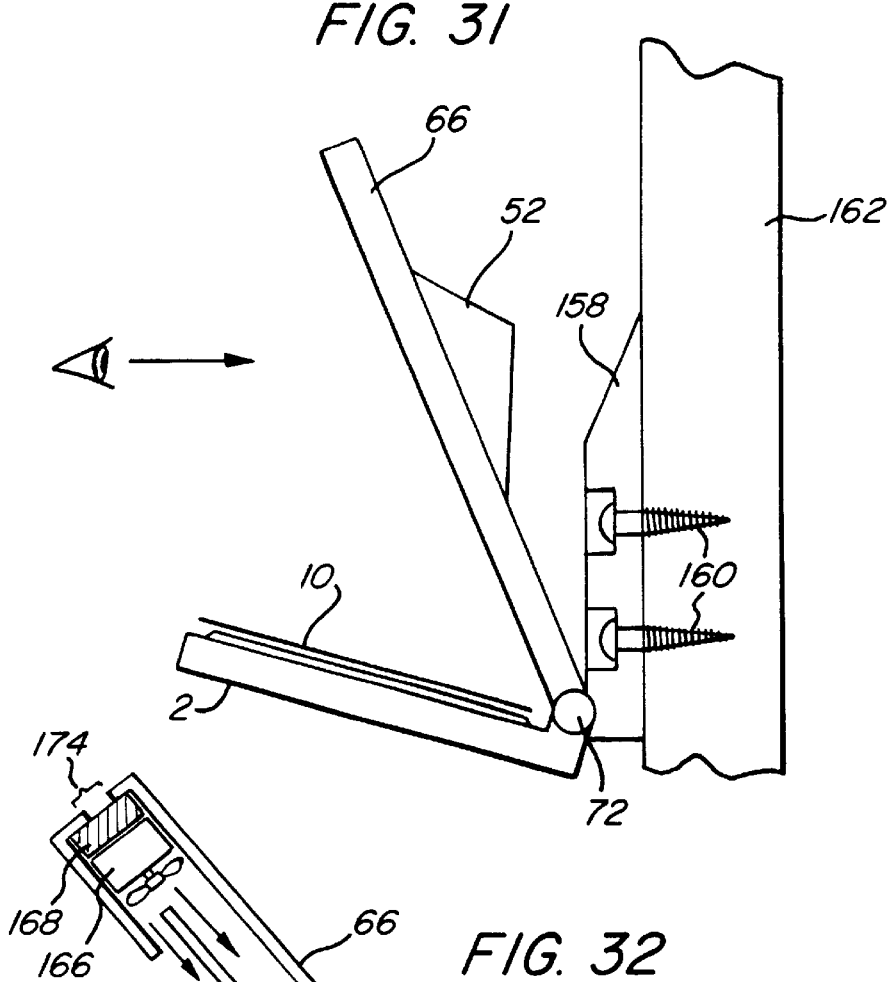
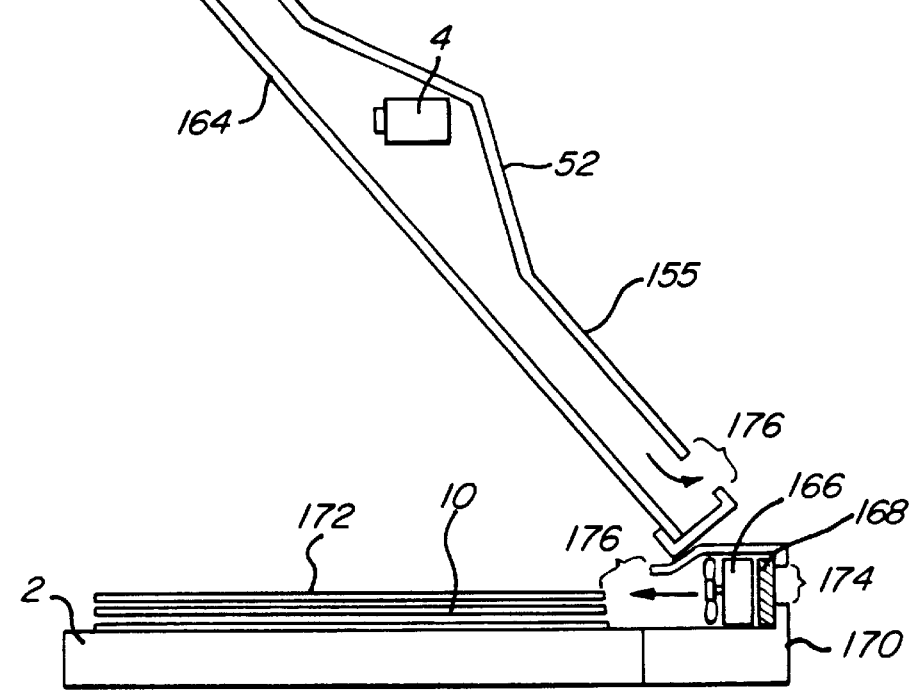

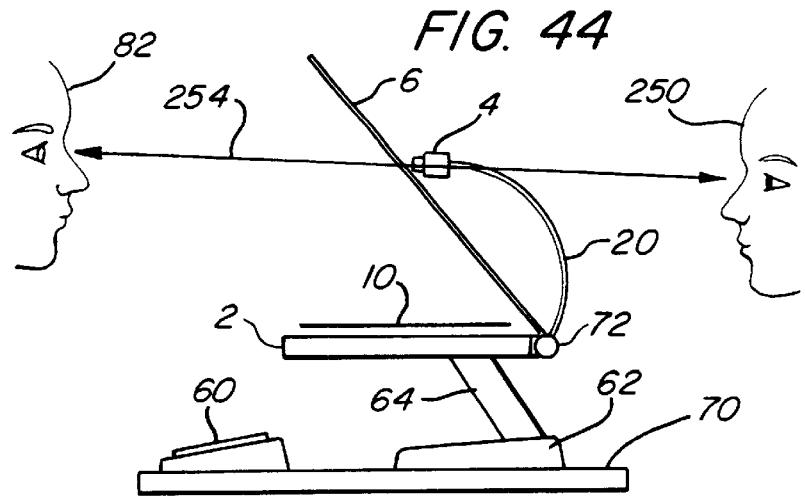
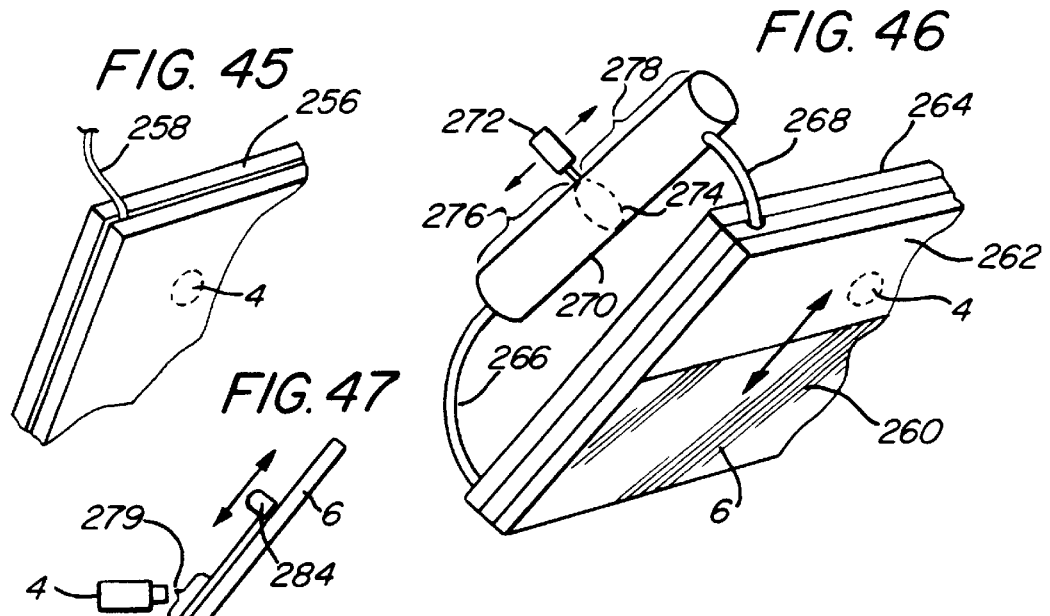
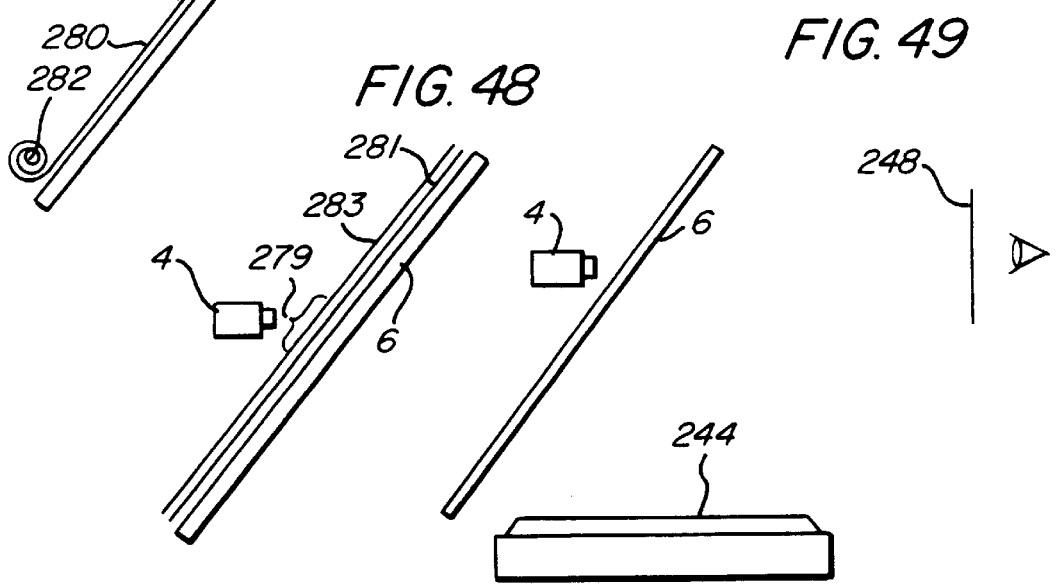

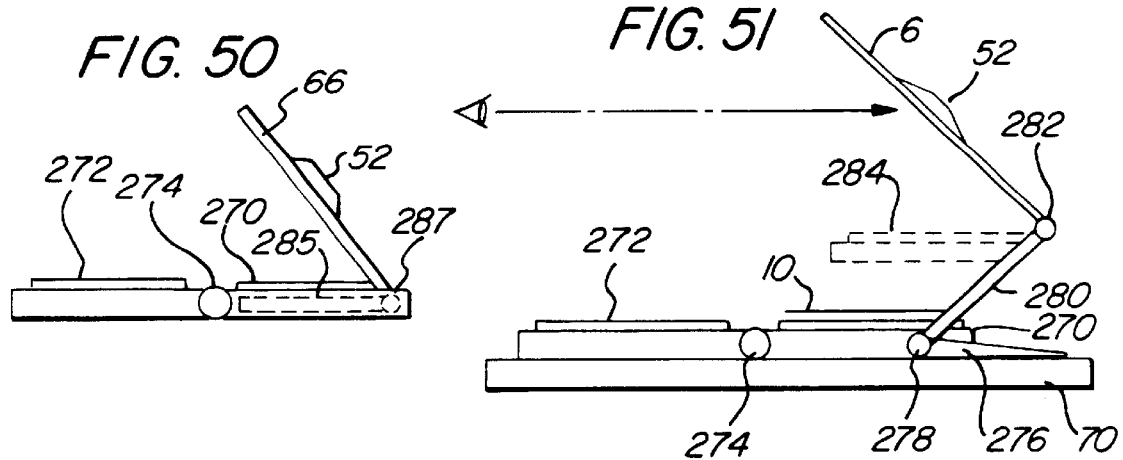
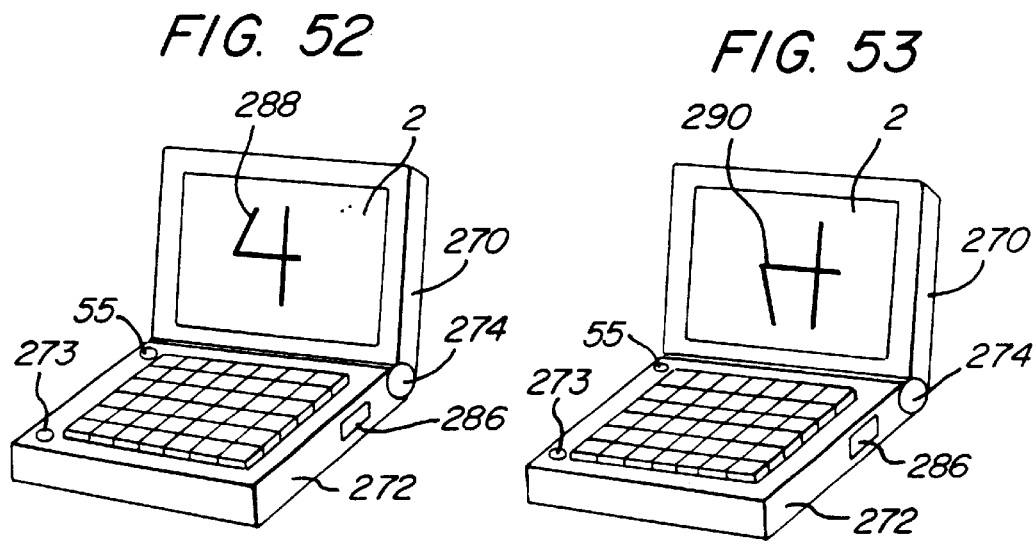
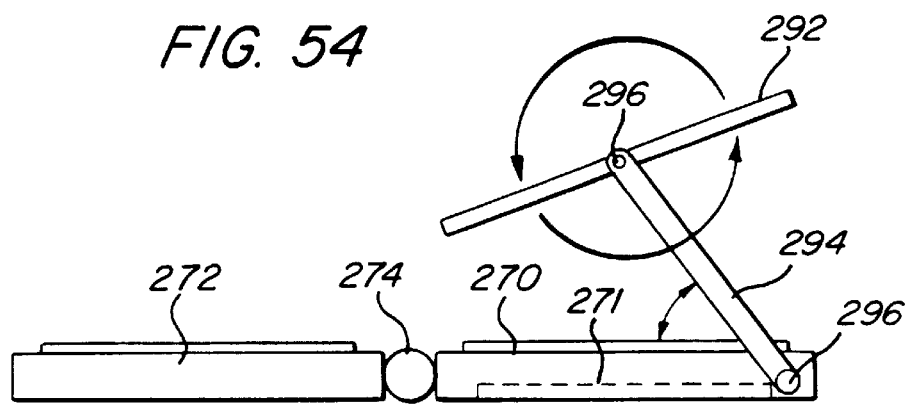

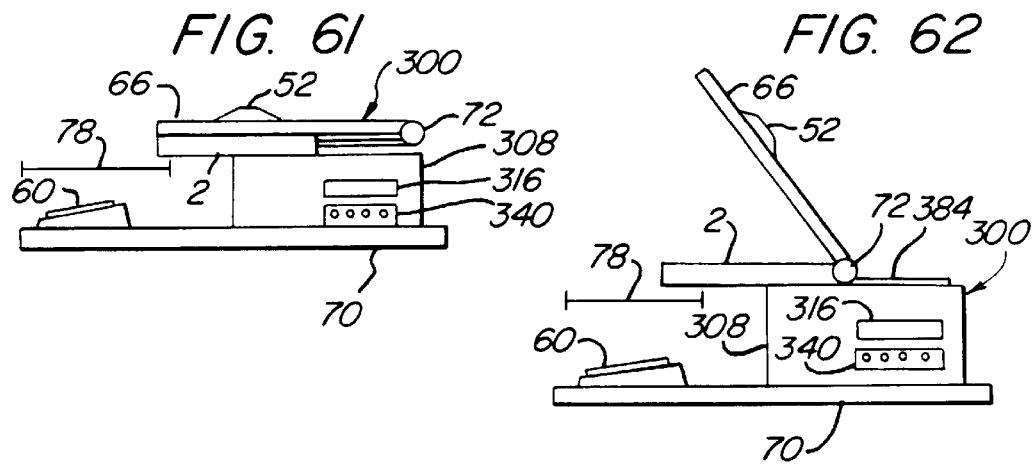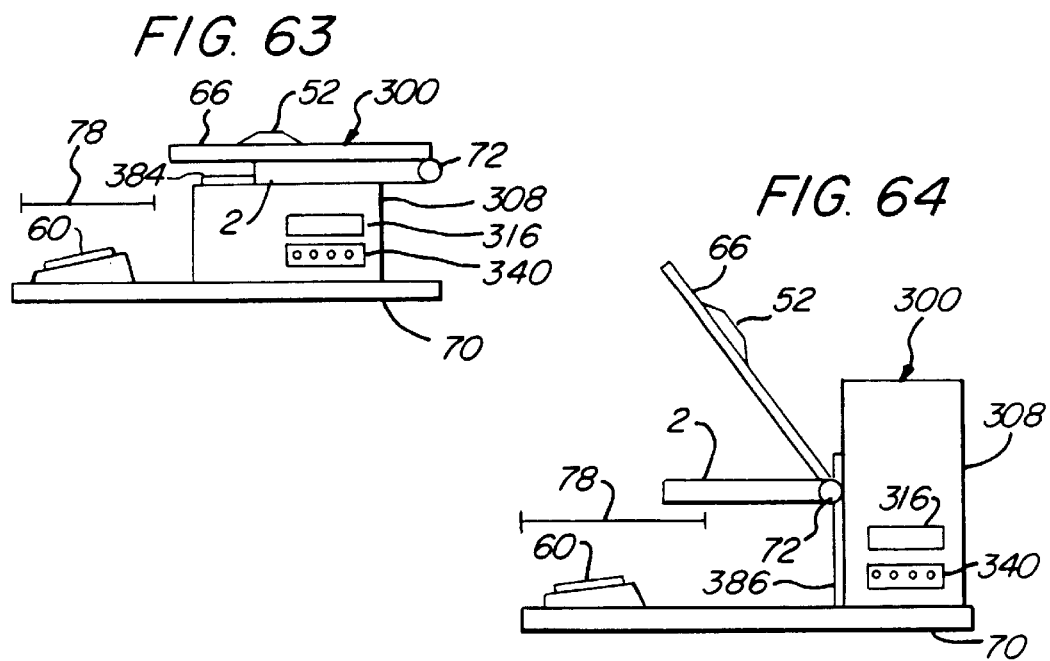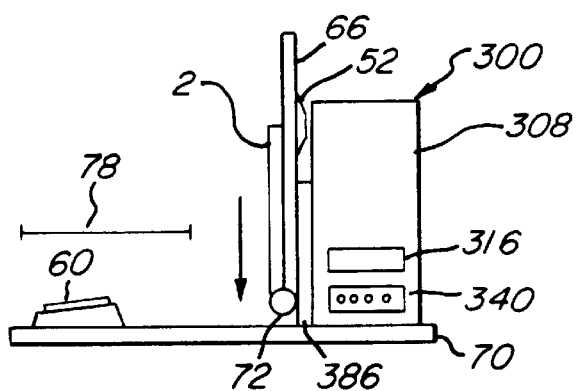

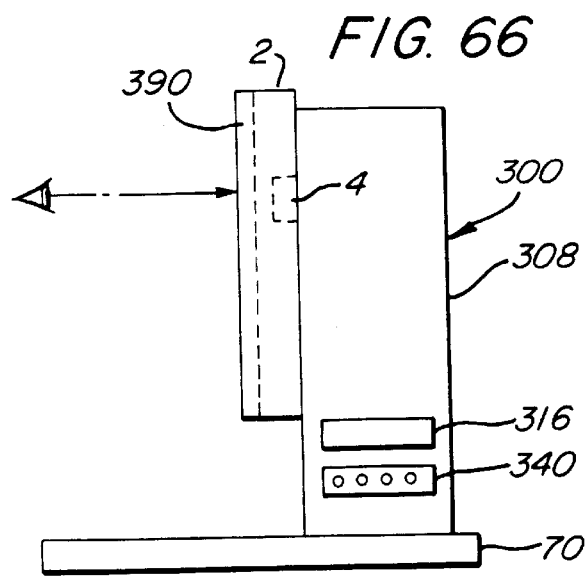
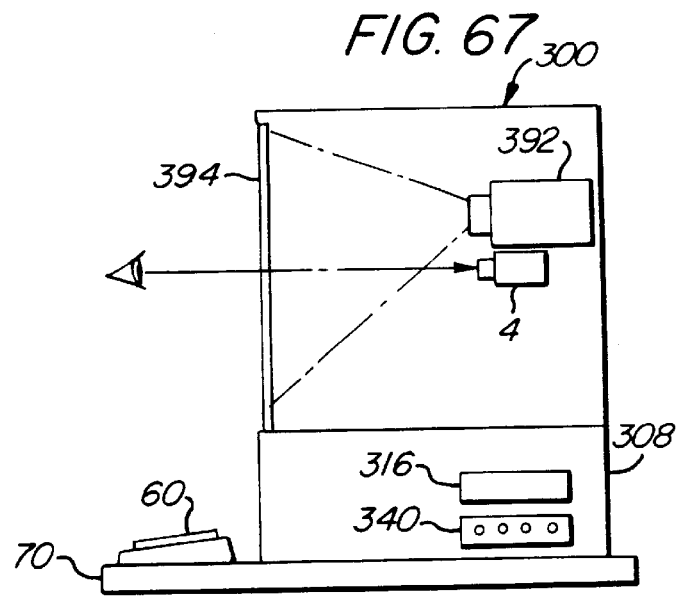
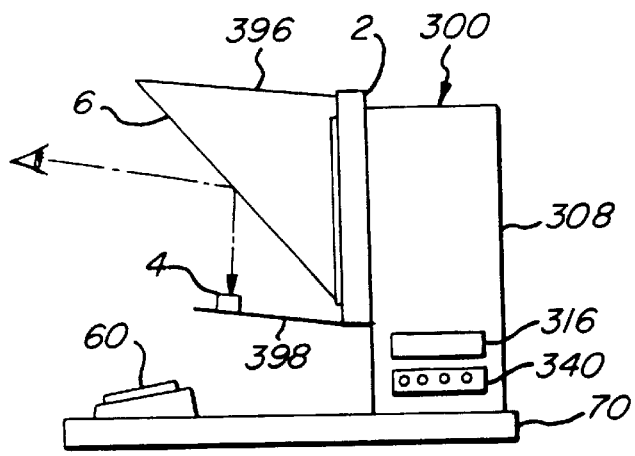

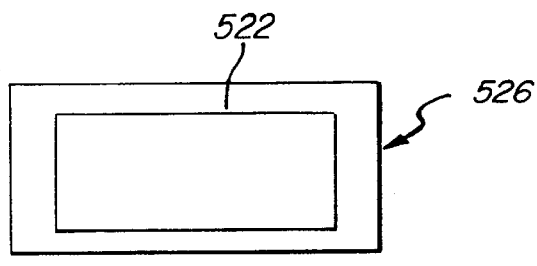
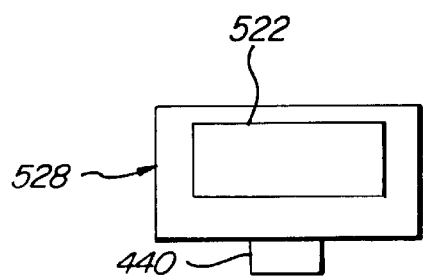
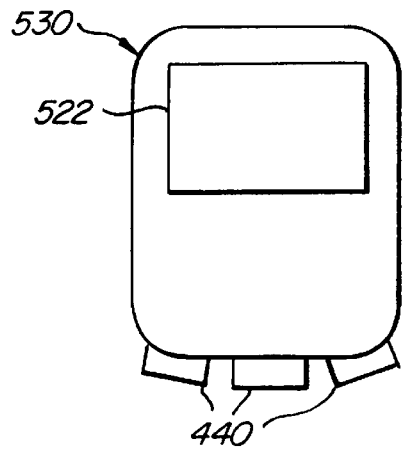
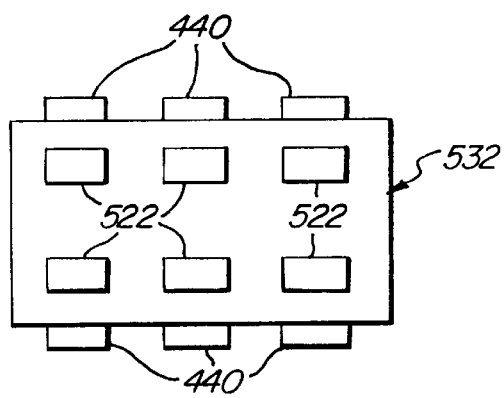
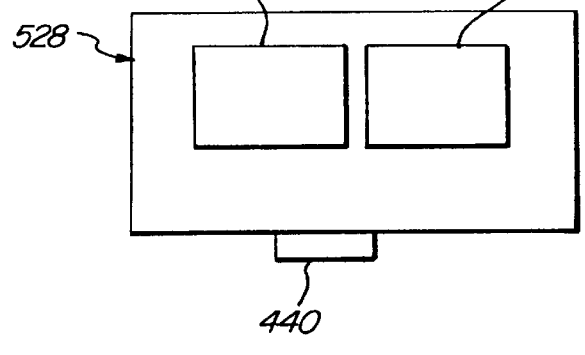
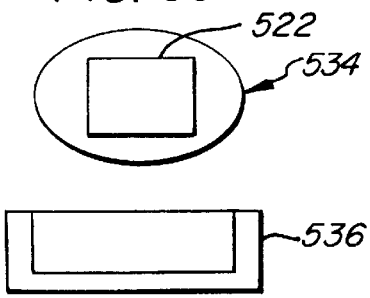

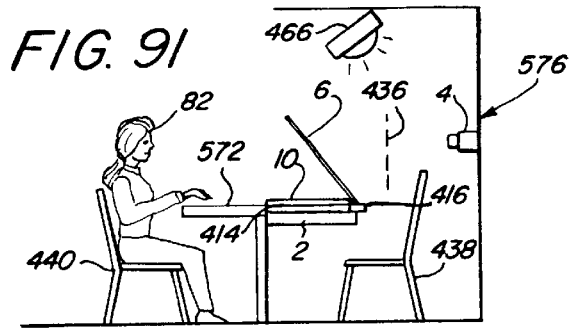
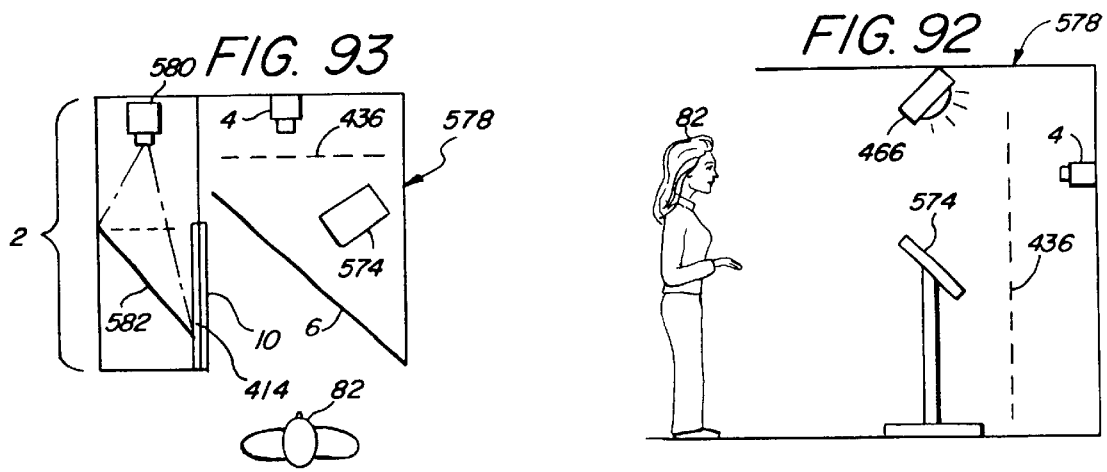
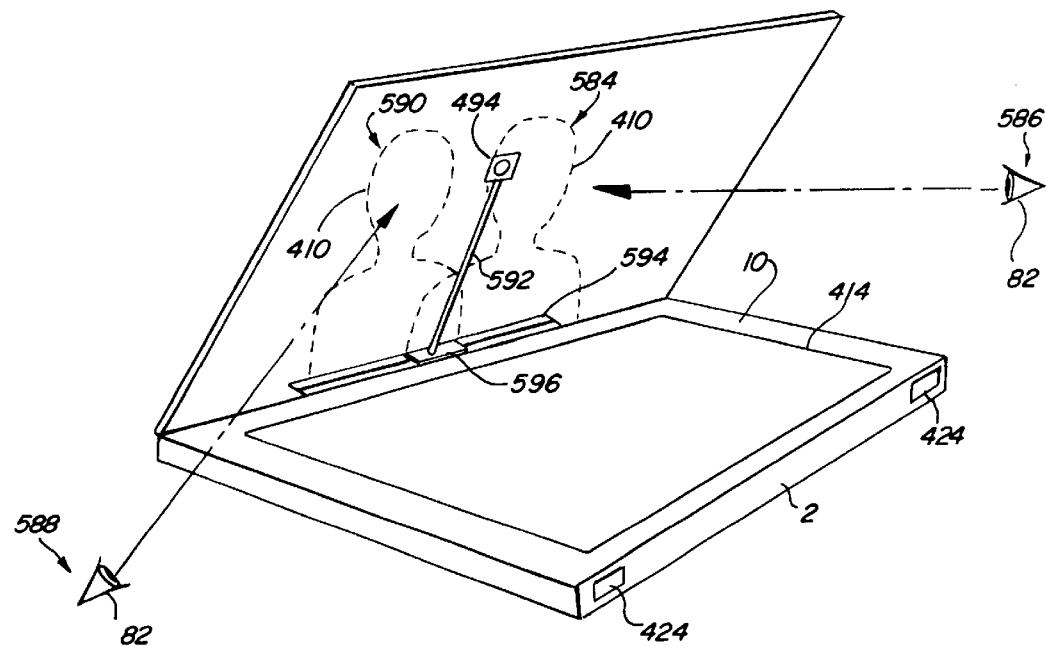

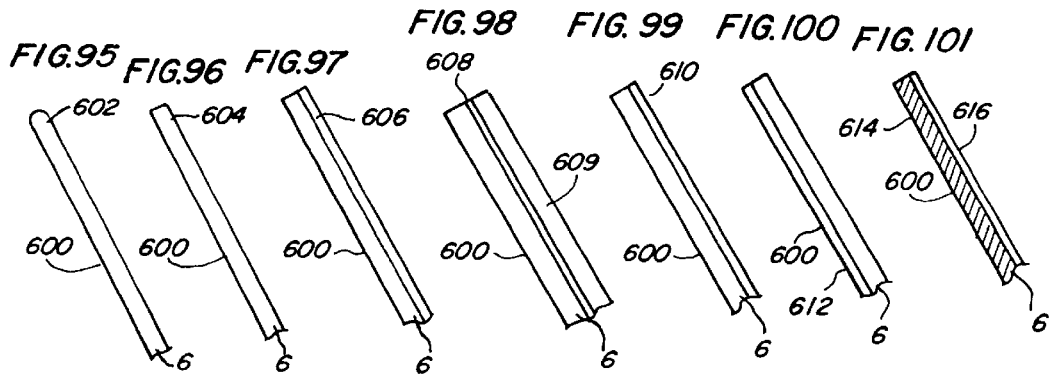
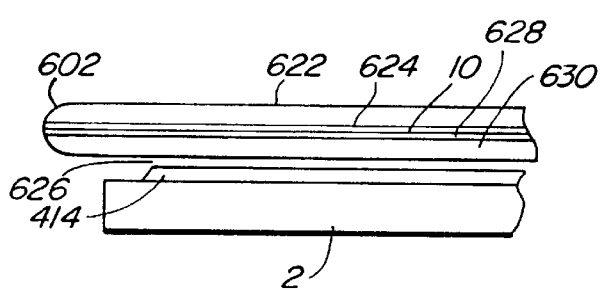
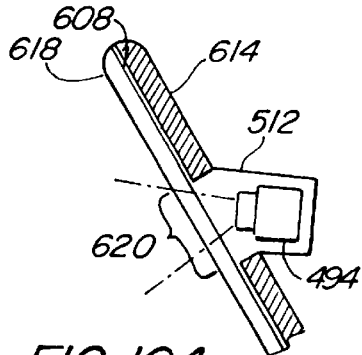
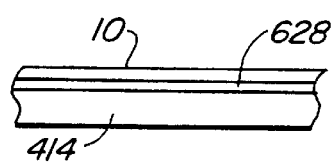
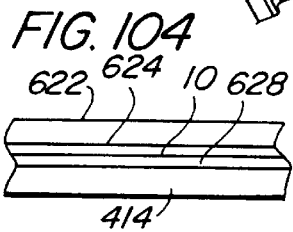
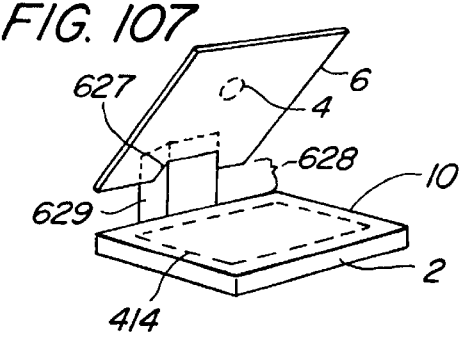
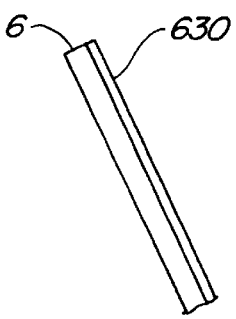

ADAPTABLE TELECONFERENCING EYE CONTACT TERMINAL

The present application is a Continuation-In-Part of application Ser. No. 09/777,145, filed on Feb. 5, 2001 now abandoned, which is a Continuation of application Ser. No. 09/262,974, filed May 17, 1999, now issued as U.S. Pat. No. 6,243,130, which is a Continuation-In-Part of application Ser. No. 09/108,476, filed Jul. 1, 1998, now issued as U.S. Pat. No. 5,953,052, which is a Continuation-In-Part of Ser. No. 08/530,880, filed on Sep. 20, 1995, and now issued as U.S. Pat. No. 5,777,665, which applications are hereby incorporated by reference into this application.

BACKGROUND OF THE INVENTION

1. Field of the Invention

The present invention concerns the area of teleconferencing and, more specifically, an improved video teleconferencing device that permits eye contact.

2. Description of Related Art

A primary concern in video-teleconferencing ergonomics is a lack of eye contact between conferees. Eye contact is not possible with common terminal configurations, because the camera is placed at the perimeter of the display that images a distant conferee, so that the camera does not interfere with a local conferee's viewing of the display. With this configuration the conferees fail to look directly into the camera, which results in the appearance of the conferees looking away and appearing disinterested in the conversation.

Although numerous technologies have been proposed to correct the eye contact problem, many of these technologies suffer from poor image capture quality, poor image display quality, excessive expense, or unacceptably increased terminal bulk. One commonly used component in eye contact systems is a beamsplitter. A beamsplitter is a semireflective transparent panel sometimes called a one way mirror or a semisilvered mirror. Although even a plain sheet of transparent material such as glass can be employed, it is more common to apply coatings to a transparent substrate to increase its reflectivity.

A common beamsplitter eye contact arrangement consists of a beamsplitter that is mounted in front of a display oriented at about 45 degrees to the display surface. The conferee using the terminal looks through the beamsplitter to view the display. A camera is disposed in front of the beamsplitter and captures an image of the conferee reflected in the semireflective beamsplitter. This technology has a number of drawbacks. First, the 45-degree angle of the beamsplitter placed in front of the display necessarily increases the bulk of the display. Second, if the beamsplitter is illuminated by ambient light, the quality of the image captured by the camera may be seriously degraded. This problem may be avoided by a hood of an opaque material extending from the display to the edge of the beamsplitter so that ambient light does not degrade the reflected image. However, an opaque hood makes the beamsplitter appear even more intrusive with the angled beamsplitter forming a visible barrier in front of the display surface. Whether the display is a computer desktop monitor or a big screen television, the awkwardness of the protruding beamsplitter and camera remain an inefficient use of space.

U.S. Pat. No. 5,117,285 to Smoot attempted to reduce the bulk of this type of terminal by applying polarizers to the display and camera, so that the beamsplitter can be angled more acutely, approximately 30 degrees, without having light from the display interfere with the reflection of the conferee. A drawback to this arrangement is the inherent loss of light caused by the polarizer which further reduces the display image brightness, which has already been reduced by the beamsplitter. Even though this technology reduces the angle of the beamsplitter, it still adds considerable bulk to the terminal and a transparent barrier still remains in front of the display. Also, terminal bulk is further increased by the camera placement, which must protrude far from the display to capture the reflection of the conferee in the 30-degree angled beamsplitter. This becomes a nuisance with desktop conferencing, because the camera is positioned in the conferee's work space where a keyboard is usually placed.

Another eye contact beamsplitter arrangement resolves, this protruding camera problem by mounting it behind the beamsplitter. In this arrangement, the display is reflected by the beamsplitter for viewing by the conferee. The light of the reflection conceals the camera behind the beamsplitter. The camera thus captures the image of the conferee through the beamsplitter. If a flat panel display is used or if a CRT display is mounted in a desk's surface and aimed upward, the bulk of this system can be reduced substantially.

However, even with these improvements this arrangement suffers from an additional significant problem: namely the conferee can simultaneously observe the displayed image both in two ways, either by directly viewing the display or by viewing the reflection of the display on the beamsplitter. That is, as the conferee looks at the reflected image, it is easy to glance at an angle and directly view the display below the beamsplitter. The dual visible images in this arrangement is a severe distraction, as the conferee's attention is divided between the light of two images. If the conferee gazes directly at the display (as opposed to the reflection of the display), eye contact will be disrupted because the camera will capture an image of the conferee that appears not to look at the face of the remote conferee.

Prior Art Beamsplitter Arrangements

FIG. 1 illustrates a prior art eye contact beamsplitter arrangement in which the image of a conferee is captured by a camera 4 by means of a reflection in a beamsplitter 6. At the same time the conferee's image is captured, that conferee is able to look through the beamsplitter 6 to view a display 2. A hood 8, usually covered with an opaque material, is typically included to shield the beamsplitter 6 from ambient light. The drawbacks to this arrangement include the increased bulk of the terminal (although a flat panel will minimize this problem), the addition of a transparent barrier in front of the display which affects viewing the display surface, the appearance of the display being recessed far into the terminal creating a tunnel effect and, lastly, the awkward positioning of the camera 4 which intrudes into the conferee's work space.

FIG. 2 is a prior art eye contact beamsplitter arrangement that attempts to reduce the protrusion of the beamsplitter 6 by adding a polarizer 9. Here when properly configured with a second polarizer 11 on the camera 4, the camera 4 can be aimed more directly toward the display 2 without picking up the image on the display 2 through the beamsplitter. Despite some reduction in the angle of the beamsplitter 6, the unit still suffers from excessive bulk, a transparent barrier between the conferee and the viewing surface of the display 2. Also, the camera 4 protrudes awkwardly from the terminal on a stand 12, invading the conferee's work space.

FIG. 3 presents a beamsplitter arrangement in which the conferee views the reflection of the display 2 by the beamsplitter 6. The camera 4 is substantially concealed from view behind the beamsplitter 6 and is aimed through the beamsplitter 6 to directly capture the image of the conferee. As is illustrated, the significant drawback of this arrangement is the fact that the light from the display 2 is visible to the conferee simultaneously at the display 2 and as the reflection of the display 2 in the beamsplitter 6 by the conferee. These two visible images compete for the conferee's attention and add distraction while conferencing, thereby reducing the quality of the conferencing experience.

OBJECTS AND SUMMARY OF THE INVENTION

It is an object of the present invention to provide a teleconferencing beam-splitter eye contact terminal that is adaptable to a variety of teleconferencing uses and products.

It is a further object of this invention to provide visual references, such as common objects, in a room environment to associate the position of an imaged conferee in the room.

It is a further object of this invention to provide methods of concealing a camera from a conferee.

It is a further object of this invention to provide a controlled room environment for image capture and image display.

It is a further object of the present invention to provide a background extraction of the image of a conferee by computer image manipulation.

It is a further object of the present to provide a laminated beamsplitter.

It is a further object of the present invention to reduce unwanted reflections on a beamsplitter.

It is a further object of the present invention to provide a laminated image blocking layer.

It is a further object of the present invention to provide a frameless beamsplitter mounting system.

It is a further object of the present invention to provide a second display in a work zone for data collaboration.

It is a further object of the present invention where a beamsplitter can serve also as a tabletop.

It is a further object of the present invention where the present invention rolls-about.

It is a further object of the present invention to provide a table/desk extension.

It is a further object of the present invention to build the eye contact display into furniture.

It is a further object of the present invention to provide a dimmable shutter.

It is a further object of the present invention to provide a multi-format display.

It is a further object of the present invention to provide height adjustability.

It is a further object of the present invention to provide a tinted beamsplitter with a non-tinted camera pass-through area.

It is a further object of the present invention to provide a means for a remote conferencing system to have its functions transferred to an eye contact terminal.

It is an object of the present invention to provide various configurations that produces the image of life-size conferees.

Lastly, it is an object of the present invention to include a highly directional ultrasonic speaker into the present invention.

The present invention enables eye contact between conferees during a teleconference using a terminal equipped with a beam-splitter for reflecting an image of a video display. The camera is positioned behind the viewing side of the beam-splitter to capture the conferee's image through the beam-splitter. The reflection of the video display appears to be positioned in a room environment with common room objects, serving to associate the position of the reflection in the room environment. The transparent quality of the beamsplitter is used not only for capturing eye contact images from one direction, but also revealing the room environment by enabling the conferee to see-through the beamsplitter. The invention can be configured to create the appearance that a life-size teleconference image of a remote conferee appears in the same room as the local conferee viewing the reflection and appears to be sitting on the other side of the desk or table—creating the experience of virtual presence with eye contact. Additional embodiments include adaptable features of the present invention which enable it to be configured into many specific types of eye contact display products with and without a see-through beamsplitter from the conferee's point-of-view.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 illustrates a prior art beamsplitter arrangement in which the conferee views the display through a beamsplitter;

FIG. 2 illustrates a prior art beamsplitter arrangement that is configured with polarizers to reduce the angle of the beamsplitter from the display;

FIG. 3 illustrates a prior art beamsplitter arrangement in which the conferee is intended to view only the reflection of the display yet can still see light emanating directly from the display;

FIG. 4 illustrates the present invention in which image blocking film is used to conceal the display from direct viewing by the conferee;

FIG. 5 illustrates an embodiment of the present invention that conceals view of the display of light from all four sides;

FIG. 6 illustrates the present invention configured with the display laying flat and aimed upwards;

FIG. 7 illustrates the present invention configured with the display aimed downward;

FIG. 8 illustrates the present invention configured as a display of a laptop computer;

FIG. 9 illustrates the present invention configured as a separate unit that can be added to a display;

FIG. 10 illustrates a display with modifications to assist in the positioning of the reflection for desired viewing;

FIG. 11 illustrates an extension arm system which permits numerous positioning options of the beamsplitter in relation to the display;

FIG. 12 illustrates opaque material placed behind the beamsplitter;

FIG. 13 illustrates a beamsplitter with image blocking film applied behind the viewing side, so that ambient light is substantially reduced;

FIG. 14 illustrates sound from a speaker bouncing off the beamsplitter;

FIG. 15 illustrates a beamsplitter that is bowed, so that a compressed image is expanded when reflected;

FIG. 16 illustrates image blocking film angled in relation to the display to prevent reflections back onto the image blocking film; and FIG. 17 illustrates an alternative beamsplitter arrangement wherein the image blocking film is used to prevent light from the display from being captured by the camera.

FIG. 26 illustrates a human interface section that can be covered by the beamsplitter when in a closed position.

FIG. 27 illustrates a detachable camera and camera storage.

FIG. 28 illustrates a camera embedded inside the housing.

FIG. 29 illustrates a baffle to block reflections upon the camera lens.

FIG. 30 illustrates a liquid crystal shutter to block unwanted reflections upon the camera lens.

FIG. 31 illustrates a terminal configuration that is mounted to a wall.

FIG. 32 illustrates methods for dust removal from terminal components.

FIG. 44 illustrates a beamsplitter with no contrast background permitting observation of another person on the other side of the desk.

FIG. 45 illustrates an LCD shutter contrast background.

FIG. 46 illustrates a fluid shutter contrast background.

FIG. 47 illustrates a solid removable contrast background.

FIG. 48 illustrates a polarizer arrangement serving as a contrast background.

FIG. 49 illustrates a polarizer arrangement with remote polarizer.

FIG. 50 illustrates a portable computer reflected eye contact configuration.

FIG. 51 illustrates a portable computer reflected eye contact configuration with separate beamsplitter.

FIG. 52 illustrates a normal view display.

FIG. 53 illustrates necessary image conversion for viewing the image upon a reflection.

FIG. 54 illustrates a physical positioning method of converting the image.

FIG. 61 illustrates an eye contact terminal with a beamsplitter that is positioned away from a keyboard area.

FIG. 62 illustrates a variation of a positionable beamsplitter.

FIG. 63 illustrates an eye contact terminal in which the display is positioned rearward so that the beamsplitter is away from a keyboard area.

FIG. 64 illustrates a side mounted display and beamsplitter arrangement.

FIG. 65 illustrates a side mounted display and beamsplitter arrangement closed and away from a keyboard area.

FIG. 66 illustrates an integrated transmissive display eye contact terminal with module port and peripheral connections for dual use as a single user terminal and group videoconferencing terminal.

FIG. 67 illustrates an integrated rear projection eye contact terminal with module port and peripheral connections for dual use as a single user terminal and group videoconferencing terminal.

FIG. 68 illustrates an integrated reflected camera-view eye contact terminal with module port and peripheral connections for dual use as a single user terminal and group videoconferencing terminal.

FIG. 83 illustrates the present invention built into a desk.

FIG. 84 illustrates the present invention built into a credenza.

FIG. 85 illustrates the present invention built into a table.

FIG. 86 illustrates multiple units of the present invention built into a table.

FIG. 87 illustrates multiple units of the present invention built into a desk.

FIG. 88 illustrates the present invention built into a coffee table.

FIG. 91 illustrates the present invention built within a controlled cabinet environment.

FIG. 92 illustrates the present invention built within a large controlled environment.

FIG. 93 illustrates a top view of FIG. 92.

FIG. 94 illustrates a camera tracking system as the conferee moves about.

FIG. 95 illustrates a polished edge beamsplitter.

FIG. 96 illustrates a very clear beamsplitter substrate.

FIG. 97 illustrates a safety layer on the beamsplitter.

FIG. 98 illustrates a laminated beamsplitter.

FIG. 99 illustrates an antireflective coated beamsplitter.

FIG. 100 illustrates a laminated reflective layer.

FIG. 101 illustrates a tinted beamsplitter.

FIG. 102 illustrates a camera hole fabricated into a laminated and tinted beamsplitter.

FIG. 103 illustrates a double clear substrate laminated image blocking layer.

FIG. 104 illustrates an image blocking layer laminated to a clear substrate and an image bearing screen.

FIG. 105 illustrates an image blocking layer laminated to an image bearing screen.

FIG. 106 illustrates a dimmable shutter.

FIG. 107 illustrates a frameless beamsplitter and a support.

DETAILED DESCRIPTION OF THE PREFERRED EMBODIMENTS

Figure 18:
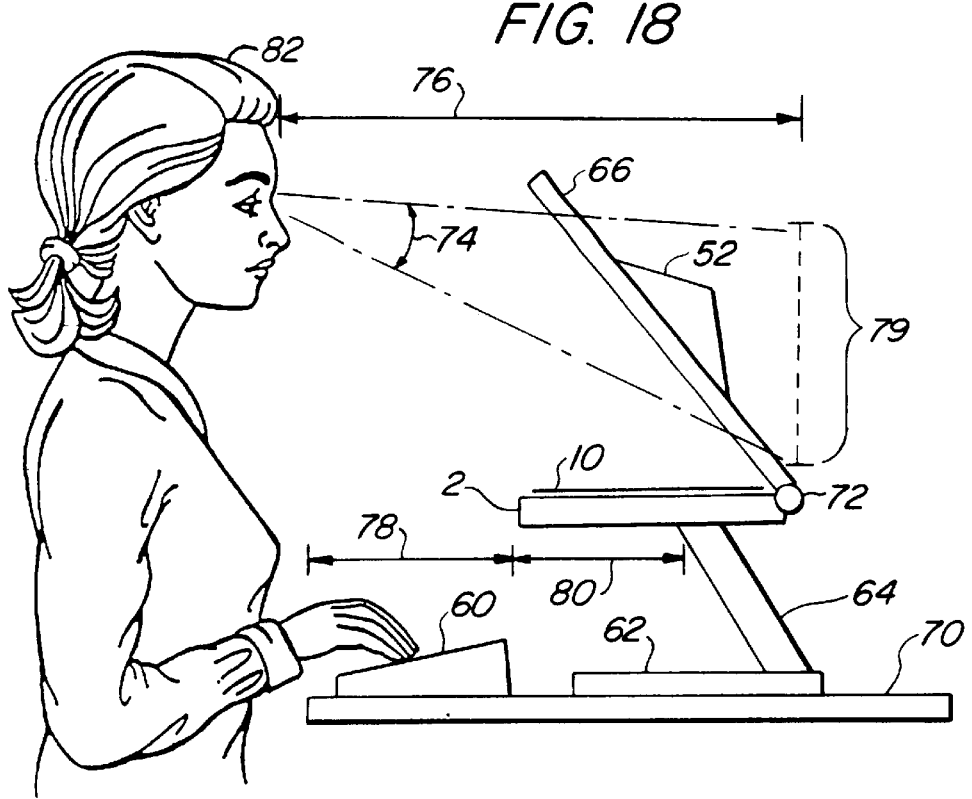
FIG. 18 illustrates a terminal configuration with the reflected display position.

The following description is provided to enable any person skilled in the art to make and use the invention and sets forth the best modes contemplated by the inventors for carrying out their invention. Various modifications, however, will remain readily apparent to those skilled in the art, since the generic principles of the present invention have been defined herein specifically to provide an improved beamsplitter-based teleconferencing device that uses image blocking film to eliminate distracting images.

Improved Reflected Display Teleconferencing Eye Contact Terminal

An eye contact beamsplitter arrangement has been invented to overcome the problem of a conferee simultaneously viewing both the display and its reflection. An image blocking film 10 permits a display 2 to be viewed from one or more directions and prevents the interference of unwanted images. As seen in FIG. 4, a conferee can view the reflection from the display 2 on a beamsplitter 6. The conferee cannot, however, see the display 2 emitted directly, because direct light is blocked by the image blocking film 10. The conferee's attention, as a result, is now focused solely on the reflection and not distracted by a view direct from the display 2. A camera 4 in this arrangement is advantageously mounted behind the beamsplitter 6 away from the conferee's work space.

FIG. 5 illustrates the use of the image blocking film 10 to block the image when viewed from a side of the display 2. The image blocking film 10 that makes the present invention possible is a material that exhibits the uncommon property of being selectively transparent depending on an angle at which the material is viewed. That is, when the gaze of an observer is normal to a surface of the image blocking film 10, the film appears to be totally transparent and any object on the opposite side of the film, such as the display 2, is readily visible. However, if the observer views the image blocking film 10 at an angle to the film's surface, the image blocking film 10 has an appearance ranging from opaque to translucent: the observer's view of any object on the opposite side of the image blocking film 10 is obscured. The image can be blocked from two, three, or all four sides, if desired. For the present invention, it is critical that the image blocking film 10 block the image from at least the angle from which the conferee is viewing the display reflection, so that the display viewing surface itself is concealed from direct view. An advantage to placing the image blocking film 10 on the right and left sides of display 2 is that the image will be blocked from the reflection on the beamsplitter 6 when the display 2 is viewed at an angle from either side. This feature adds security and privacy to a teleconference which proves useful in a busy office area, since a passersby cannot easily view the image.

The image blocking film 10 is available from several sources and can be based on various technologies. Whether the film is plastic or glass, the image blocking film as it is presented here is a material that permits transmission of light from at least one direction and reduces or eliminates light transmission from at least one other direction. Eyesaver International Inc. has an image blocking film named "Private Eye" that diffuses light from various directions. From the perspective of the conferee, when using this film, light directly from the display (as opposed to the reflected image) appears milky and diffused, eliminating the focused image. The diffused light, even though visible to the conferee, adequately conceals the image. Another image blocking film 10 is made by 3M Inc. and named "Light Control Film" and is preferred, because it can eliminate virtually all light transmission from a desired angle. This particular image blocking film 10 contains closely spaced black microlouvers and a wide selection of louver angles are available, and even more options are available by layering films. This means that the precise angle at which the image blocking film 10 "shuts off" can be selected in advance. When the image blocking film 10 "shuts off," it ceases to transmit light so that if the observer views the image blocking film 10 from an angle greater than the "shut off" angle the film appears to be opaque. When using this film the conferee sees only the black surface of the microlouvers which entirely conceals the image from the display 2 when viewed from the position of the conferee. The same effect can be produced by an array of tiny microlouvers supported, for example, by their ends. In that case the image blocker would not actually be a "film" but would fall within the bounds of the present invention.

This arrangement is preferably used with a flat panel display such as an active matrix liquid crystal or plasma display, among others. Flat panels permit the size of the terminal to be reduced and offers aesthetic design opportunities not possible with other eye contact display systems. Of course, more bulky displays such as CRT displays and rear projection screen displays may also be used with the present invention. The added size of the terminal caused by bulky displays may not be a disadvantage in some circumstances. Also, a bulky display can be hidden by being built into a table with the screen surface flush with the table surface, giving the appearance that the entire terminal consists of a floating beamsplitter. Both flat panels and more bulky displays can be built into tables and into cabinets mounted sideways and even upside down. In each configuration, image blocking film 10 is applied to the display, blocking its image from the conferee's direct view and leaving only the reflection on the beamsplitter 6 in view. Custom applications of this invention will be apparent to one of ordinary skill in the art.

FIG. 6 illustrates the present invention configured as a flat panel self-contained unit. The display 2 rests on a surface, such as a desk or computer. On top of the display viewing surface is the image blocking film 10 that functions in the manner previously described. The beamsplitter 6 is attached to the display 2 by hinges 14. The hinges 14 permit adjustment of the beamsplitter 6 in relation to the display 2. Although 45 degrees is the "critical angle" for setting the beamsplitter 6 relative to the display 2, positions between about 30 and 60 degrees are useful depending on the exact setup employed. A flexible rod 26 holds the camera 4 in place and also carries electronic signal wires to the display 2 which contains all electronic circuitry for the display and the camera 4. The flexible rod 20 is attached to the display 2 by a connector 22. The flexible rod 20 is one of many possible mechanisms that can position the camera 4 behind the beamsplitter 6. Its advantage is that it can be bent into numerous positions, allowing the camera to be adjusted both vertically and horizontally. A power line 16 supplies current to both the display 2 and the camera 4. A first port 18 allows the camera image to be cabled to the teleconferencing equipment so that the captured image may be viewed on a distant terminal. A second port 19 receives the incoming image signal, so that the distant conferee may be imaged on the display 2.

FIG. 7 illustrates a self-contained unit as seen in FIG. 6, except that the display 2 is mounted above the beamsplitter 6 with the display viewing surface aimed downward into the reflection of the beamsplitter 6. In this configuration the display 2 is connected to and supported by the one end of the beamsplitter 6 and two support legs 24 that rest on the desktop, computer, or other flat surface. This configuration's operation is identical to the configuration of FIG. 6, except that no means of adjusting the beamsplitter 6 in relation to the display 2 is provided.

The present invention may also be built into devices that have other functions besides image display and image capturing. An example of this is seen in FIG. 8, where the present invention is built as a part of a laptop computer 26 with a keyboard 28. In this configuration, the beamsplitter 6 folds down onto the image blocking film 10 with the built-in display underneath and integral with the laptop computer 26. The beamsplitter 6 has a latch hook 25 connected to it, which is received in a latch hole 27 when the beamsplitter 6 is folded down by hinges 14. The flexible rod 20 and camera 4 retracts into a slot (not shown) in the back when the device is not in use. Besides integrating the present invention into a laptop computer, it may, in addition, be built into numerous portable devices such as palmtops, personal digital assistants, teleconferencing camcorders, and wireless teleconferencing systems. Nonportable devices, as well, such as videophones, all-in-one home computers, and televisions, to name only a few, will benefit from the present invention.

FIG. 9 illustrates a configuration where the main parts of the current invention can be configured as a separate kit to be added by the consumer to upgrade the existing display 2 and provide the practicality of modularity with interchangeable elements. As illustrated, the kit would contain the image blocking film 10 which is placed on top of the viewing surface of the display 2 secured by a VELCRO™ hook-in-loop fastener (not shown), or other appropriate fastening means can be used. The beamsplitter 6 used in the kit is free-standing and held in place by stand legs 32 which are attached to the beamsplitter 6 by screws 34. The kit is completed by the camera 4 which is connected to the flexible rod 20 which, in turn, is connected to a flexible rod base 30.

Those skilled in the art will appreciate the design options made possible by the present invention. For example, the display 2 can be mounted flush with a desk surface with the image blocking film 10 seamlessly part of the desk's surface. From the conferee's perspective, the entire terminal would appear to consist of only the beamsplitter 6 and the camera 4. Also, the display 2 can be built into decorative housings and cabinetry and mounted aiming downward or sideways towards the beamsplitter 6. It is also conceivable that the image blocking film 10 can be manufactured in designer colors.

Although desktop conferencing terminals will greatly benefit from this invention, it may also be configured into big screen displays. These larger displays are important when several conferees are imaged on one display. The ergonomics of a life-size image of the conferees greatly improves the teleconferencing experience.

Those in the optical coating art will understand the vast variations possible for the beamsplitter 6 in regards to its substrate, coating, and manufactured process. Both plastic and glass substrates, as well as stretched mylar, have been used for the beamsplitter 6. The beamsplitter 6 can comprise a custom blend of optical coatings on a transparent substrate for superior reflectivity and transmission all the way down to off-the-shelf one-way mirrors with inconsistent and poor optical qualities. Also, the reflectivity and transmission, as well as other optical qualities of the beamsplitter 6, can be adjusted as needed. Despite these vast variations in the beamsplitter 6, the property of being both reflective and transparent remains the single most important constant.

The following description details the construction of one embodiment of this invention. A frame and stand for the beamsplitter 6 was constructed from acrylic plastic on which the beamsplitter 6 was mounted at about 40 degrees, so that the image is aimed slightly upward toward the face of the conferee. The beamsplitter 6 comprises a titanium coating on a float glass substrate. The coating was optically designed for approximately 40% reflectivity and 60% transmission. The plastic support frame was designed to straddle a Shard active matrix LCD panel Model QA-1750BL lying flat on a table top. The image blocking film 10 used was 3M Light Control Film (type LCF ABRO O OB90 CLR GLS 030) and was positioned on the viewing surface of the active matrix display, so that the image of the display is blocked from the conferee's direct view. Behind the beamsplitter 6 am ELMO CCD miniature camera Model TSN 402 was attached to a custom flexible rod 20 and base 30. The terminal was arranged as seen in FIG. 9 and was operated on a compressed video (MPEG) teleconferencing system.

Depending upon the angle between the beamsplitter 6 and the display 2, the reflection of the display 2 may have a trapezoidal shape. This subtle distortion is normally not a significant problem for most observers. However, if this distortion is unwanted, well-known image manipulation techniques can be used to "predistort" the image on the display 2 into a trapezoid with its longer side in a reversed position from a longer side of the trapezoid caused by the beamsplitter 6 angle. This way distortion caused by reflection will cancel out distortion imposed by image manipulation, and the reflected image will appear rectangular in shape. Also, manual controls may be provided for the conferee to choose the degree of predistortion so that the reflected image can be corrected at any angular setting of the beamsplitter 6. An automatic system can also be provided to simplify this procedure by sensing the angular relation of the beamsplitter 6 to the display 2 and automatically applying the optimum amount of predistortion to the image. Since a bezel or outer edge of the display 2 may also appear in the reflected image, it may be necessary to either provide a trapezoidal bezel or make the bezel matte black so it is not apparent in the reflection. It may also prove advantageous to manufacture display panels in a trapezoidal shape.

The reflection in beamsplitter 6 can also reflect not only the display 1, but also the surface on which the display 2 rests or is mounted, such as a desk top. If this reflection becomes an annoyance, a light-absorbing mat (not shown) extended around the display eliminates these unwanted reflections. Another method to eliminate these unwanted reflections is to put light-absorbing sides extended between the display 2 sides and the beamsplitter 6.

For greater flexibility in orienting the display 2 to the beamsplitter 6, the display 2 itself may be raised or lowered from the front or rear of the display 2. In FIG. 10 adjustable extension legs 36 are connected with stiff pivot hinges 38. The display 2 with these extension legs 36 can be raised and lowered from both the front and the rear. For even greater flexibility in positioning the beamsplitter 6 in relation to the display 2, one can allow the beamsplitter 6 to be adjusted by tilting, moving backwards and forwards, and closer and further from the display 2 (see FIG. 11). Extension arms 42 and 40 provide all of these movements through the use of connected stiff pivot hinges 44, 46, and 48. The conferee can adjust tilt, up and down and back and forth, with this positioning mechanism. Other positioning mechanisms, as well, may be integrated according to the needs of the particular configuration.

An additional amenity that can improve a free-standing eye contact terminal employing the present invention is the addition of a simple turntable beneath the unit. The turntable allows the entire unit to swivel to face the conferee. This is especially useful in the case of group teleconferences where a number of individuals want direct "one-on-one" contact with a person at a remote terminal. The turntable allows the display 2 and the camera 6 to be instantly aimed towards any participant. This can be accomplished either manually or automatically. The image blocking film 10 is selected so that no one in the group can directly view the display 2. That is, two layers of image blocking film 10 are used so that the image is blocked from all viewing angles except for a line of sight normal to the surface of the display 2.

To enhance the apparent reflectivity of the beamsplitter 6, ambient light behind the beamsplitter 6 may be reduced, depending upon the optical properties of the beamsplitter 6 and the intensity of the ambient light. FIG. 12 illustrates the use of an opaque material 50 (such as black painted plastic) covering all of a rear surface of the beamsplitter 6 except for a small area through which the camera 4 is aimed. Ambient light is completely eliminated from behind the beamsplitter 6 and, thereby, substantially improves the apparent reflectivity of many types of the beamsplitter 6. An optional camera housing 52 may be built of light absorbing material, as well. If only ambient light from a specific direction need be eliminated, then image blocking film 10 can be applied to the back side of beamsplitter 6 as seen in FIG. 13. Other ambient light reduction methods may be used, such as mounting the present invention in an enclosed cabinet or providing a removable hood for the terminal.

Because the beamsplitter 6 is mounted at an angle toward the conferee it is possible to bounce sound off the beamsplitter 6. By doing so teleconferencing audio is greatly improved, because sound will seem to originate from the center of the beamsplitter 6 where the image of the distant conferee's mouth is located. FIG. 14 illustrates a speaker 55 aimed toward the beamsplitter 6 so that sound is bounced toward the conferee. Special directional speakers may be used to enhance this effect. The speaker 55 can also be mounted on the side of the display 2 (not shown) and additional speakers 55 may be used in various placements around the display 2.

An additional embodiment of the present invention employs a bowed beamsplitter 56 of FIG. 15. This enables the display 2 to be configured more narrowly than the common aspect ratio display 2. By squeezing the visible image with well-known image manipulation techniques, this smaller compressed image can be expanded to a larger image when reflected onto the bowed beamsplitter 56. This configuration is especially useful when a large image is desired, but the desk surface which the display rests on is limited in area.

Antireflective coatings can be applied as needed to suppress unwanted reflections from any of the optical surfaces involved. On the back side of the beamsplitter 6, opposite the reflection side, an antireflection coating can serve to eliminate the ghosting effect apparent with many types of beamsplitters. Also, an antireflective coating, substrate, film textures (i.e., matte finish), light-absorbing color, or similar functioning material can be applied on top of or as a part of the image blocking film 10 when it is necessary to reduce a "back reflection," which is an image reflected from the beamsplitter 6 back onto the image blocking film 10. FIG. 16 shows another method of dealing with back reflections. When the image blocking film 10 is angled (as opposed to parallel) in relation to the display 2, the back reflections are diminished or eliminated. An angle between the image blocking film 10 and the display can range from a few degrees to a much as 30 degrees or more. At large angles the image blocking film 10 advantageously incorporate slanted microlouvers to compensate for a change in angular relationship between the conferee and the image blocking film 10.

Another embodiment of the image blocking film 10 used for teleconferencing eye contact is seen in FIG. 17. The image blocking film 10 has significantly improved the prior art beamsplitter 6 arrangement, as seen in FIG. 2. Prior art technology based on polarizers significantly reduces the brightness of the display 2 since polarizers absorb at least half of the incident light. This, combined with the further brightness reduction caused by the beamsplitter 6, creates a noticeably dim image. The image blocking film 10 has a higher transmissivity than the polarizer 9, allowing a far brighter image. Also, a single substrate image blocking film 10 applied between the display 2 and the beamsplitter 6 does not suffer from the complexity of aligning the two polarizers 9 and 11. The image blocking film 10 allows the conferee to look through a single substrate to the display 2 image behind. From the perspective of the camera 4 the image is concealed by the image blocking film 10. Because the image is blocked, the camera 4 can be aimed more directly toward the display 2, i.e. between about 20 degrees and about 40 degrees, without picking up the light of the display 2 passing through the beamsplitter 6. As a result, the beamsplitter 6 can be angled more closely to the display 2, thereby reducing the protrusion of the beamsplitter 6. FIG. 17 shows the image blocking film 10 parallel to the front surface of the display 2. The image blocking film 10 may also be located on the side of the beamsplitter 6 facing the display 2 or at any position between.

Although this terminal still suffers from a protruding camera 4 on the stand 12, this protrusion can be reduced somewhat by using a small micro video camera. Instead of the stand 12, the camera 4 can be mounted on a movable base (not shown) which rests directly on the table or desk surface. A second mirror (not shown) may be used near the camera to correct the image reversal caused by the reflection of the beamsplitter 6. The hood 8 is an optional element and may be used if ambient light is excessive. Variations in terminal design made possible by this improved beamsplitter 6 arrangement will be apparent to those skilled in the art of teleconferencing ergonomics.

Depending upon the type of the beamsplitter 6 and the degree of transmissivity used, adjustments to the light sensitivity of the camera 4 may improve image quality. Also, adjustments to the brightness of the display 2 may improve the reflectivity of some types of beamsplitters. Such light sensitivity and brightness adjustments of camera 4 and display 2 will be apparent procedures to one of ordinary skill in the art.

As is the case with all eye contact terminal technology, true eye contact cannot occur between conferees unless both conferees have an eye contact terminal. Even if only one conferee has an eye contact terminal, however, that conferee can transmit a eye contact signal for at least the other conferee to enjoy. In a multiple conferee session, portions of the screen can be designated for simultaneously displaying several incoming conferees. A more complex approach to multiple conferees is to use multiple cameras side by side in order to transmit different points of view of the conferees as if sitting around a table. Although not shown, it will be apparent as to how side-by-side cameras would be configured behind the beamsplitter 6.

Because the display is reflected on the beamsplitter 6, the image will appear to the conferee to be reversed. Image reversal techniques (either physical such as a mirror or electronic) can easily remedy this problem by appropriately reversing the image before it is displayed so that, when reflected on the beamsplitter, the image will assume its correct viewing orientation.

When viewing the reflection of the display 2 from the sides, the reflection of the display 2 will fall off the edge of the beamsplitter 6 when the beamsplitter 6 is the same size as the display 2. A simple remedy for this is to make the beamsplitter 6 as wide as necessary, so that the entire image remains reflected even when viewing from the sides.

Numerous embodiments of the present invention have been originated to overcome significant limitations of the reflected display eye contact approach. These following embodiments improve and advance this configurational approach by attending closely to the conferee relationship with the device in typical working environments. These embodiments are ideally suited for use with the image blocking film 10, but also serve to greatly advance the reflected display configuration even without the image blocking film 10.

FIG. 18 illustrates a conferee 82 seated at a desk 70 with common posture for using a keyboard interface 60. The configuration illustrated demonstrates a conferee to reflected display distance 76 of the reflected display position 79. Since all reflected display configurations reflect an image to the rear of the terminal the reflected display position may appear too far away for the conferee's 82 viewing comfort. The current terminal configuration enables the display 2 to actually slightly overhang the essential work area 78, if so desired, to bring the reflected display position 79 closer to the conferee (not shown). This ability to slightly overhang the essential work area 78 yet still allow the conferee 82 complete and unencumbered access to the keyboard interface 60 is permitted by a terminal construction with a base 62 supporting a terminal extension post 64 with display 2 positioned as a form of canopy over the desk 70. Though not shown, this terminal configuration may be adapted with a shorter terminal extension post 64 so that the terminal can rest upon a case containing personal computer hardware. Various lengths of extension posts 64 can be provided to the consumer of which then the extension post 64 will be a replaceable structural element. Fundamentally, the extension post serves to raise the entire display as a form of canopy off the desk 70 allowing access under the entire display and allows the conferee 82 to reach under the display all the way beyond to the rear side of the terminal to books and files etc. on the desk 70.

FIG. 18 also illustrates the conferee viewing radius 74 which extends through a beamsplitter terminal section 66 to the reflected image position 79. The beamsplitter terminal section 66 is a support housing for the beamsplitter 6 (not shown) and the camera 4 (not shown) inside the camera housing 52. The beamsplitter 6 (not shown) is of the approximate length of the beamsplitter terminal section 66. The following configurations, though shown with beamsplitter terminal section 66, may, as well, be configured solely of the beamsplitter 6 and various adaptations of beamsplitter 6 including configurations described and illustrated previously. The conferee viewing radius 74 intersects nearly all the beamsplitter terminal section 66. It is apparent that if beamsplitter section 66 was shorter in length the reflected display position 79 would be partly cut off from view by the conferee 82. Hence, the beamsplitter terminal section 66 is a mandatory length in order to allow the conferee to view the entire reflected display position 79.

A stiff hinge 72 permits manual angular adjustment of the beamsplitter terminal section 66 which both adjusts the camera position and the reflected image position. For example, if the beamsplitter terminal section 66 was tilted towards the conferee 82 the reflected display position 79 would also appear to tilt forward and likewise appear backwards if the beamsplitter terminal section 66 was tilted backwards. Obviously the conferee 82 may easily selectively choose the tilt most comfortable for viewing. However, most typically, the tilt selected for the reflected display position 79 is parallel to the face of the conferee 82. With this basic understanding of the conferee 82 postured at desk 70 and viewing the reflected display position 79 the beamsplitter terminal section 66 requires the minimum length illustrated in FIG. 18.

Considerable advancement in flat panel display technology and the reduction of the cost of these displays makes flat panels a prime candidate to replace the bulky cathode ray tube monitor on the desktop. Small cubicles, offices, and work spaces can greatly improve in efficiency with the added desktop space made available by a flat panel. By adding the additional component of the beamsplitter 6 for eye contact videoconferencing the minimum space requirements for the flat panel display will increase in size due to its angular relationship to the beamsplitter 6. The present invention presents many embodiments to overcome the added terminal bulk of a beamsplitter 6 to maintain the space efficiency inherent to flat panels on the desk 70.

A significant embodiment of the present invention is the construction of the terminal as illustrated in FIG. 18 to permit desktop space-saving by utilizing display 2 as a form of canopy over the desk 70. Desktop space-saving is especially dramatic when the terminal base 62 is constructed with a thin profile. The utilitarian spacesavings of the desk 70 under the canopy of display 2 improves work efficiency by allowing ready access to books, files, computer software, computer hardware, and so on. While display 2 in FIG. 18 is supported by terminal extension post 64, other structural methods to support display 2 as a form of canopy over the desktop 70 may be utilized as well.

Figure 19:
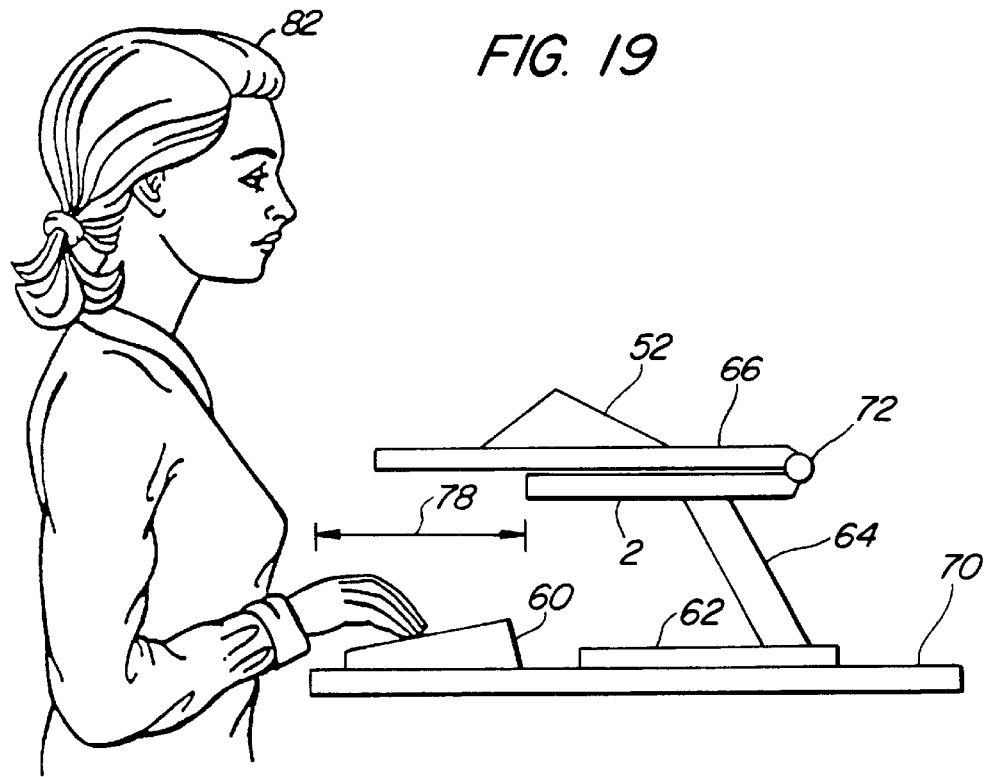
FIG. 19 illustrates a terminal configuration where the beamsplitter closed upon the display.

A fundamental configuration aspect of reflected image displays is the fact that the beamsplitter 6 is relatively thin and likewise the beamsplitter terminal section 66 can be constructed with a thin profile. This thin profile is ideal for permitting the beamsplitter 6 and the beamsplitter terminal section 66 to fold upon the display 2 by a manner similar to that allowed by stiff hinge 72. However, as described above, the beamsplitter terminal section 66 requires a minimum length for the conferee 82 to view the entire reflected display position 79. This length is considerably longer than the length of the display 2. As illustrated in FIG. 19 the beamsplitter terminal section 66 substantially protrudes, almost completely overhanging the essential work area 78, rendering for the conferee 82 a useless work area due to the protrusion. The essential work area 78, with the keyboard removed, could otherwise be used for handwriting letters, reading manuals, and so on.

Figure 20:
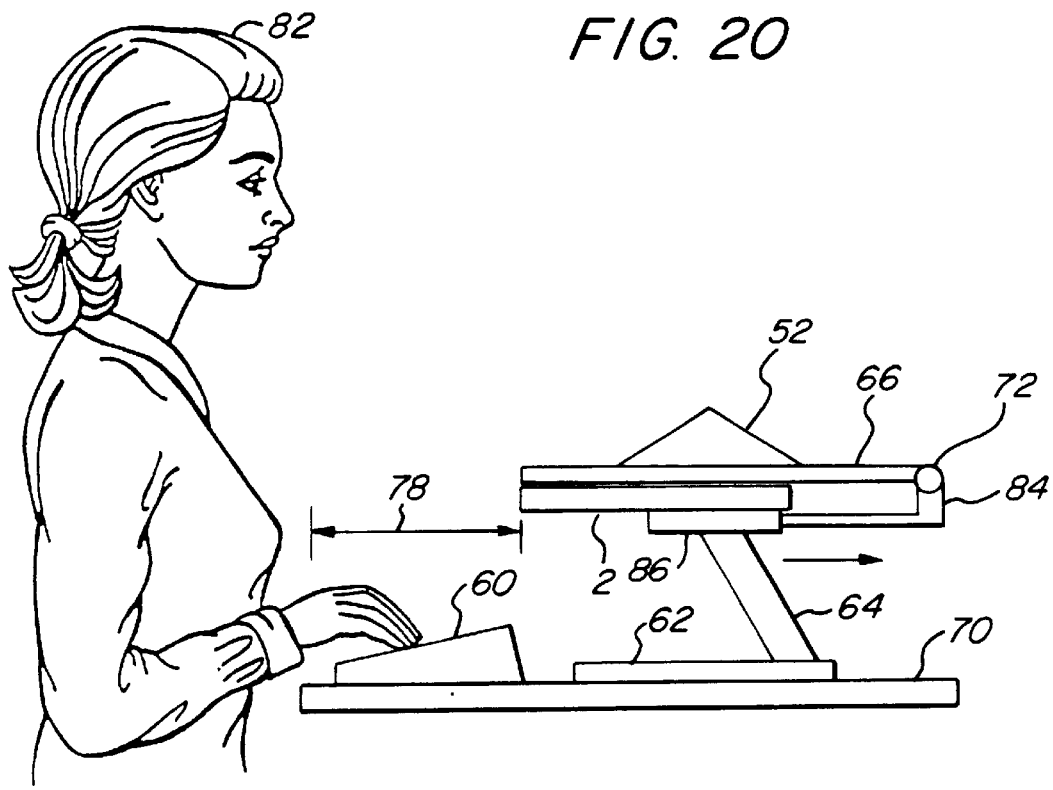
FIG. 20 illustrates a beamsplitter positioned out of an essential work area.
Figure 21:
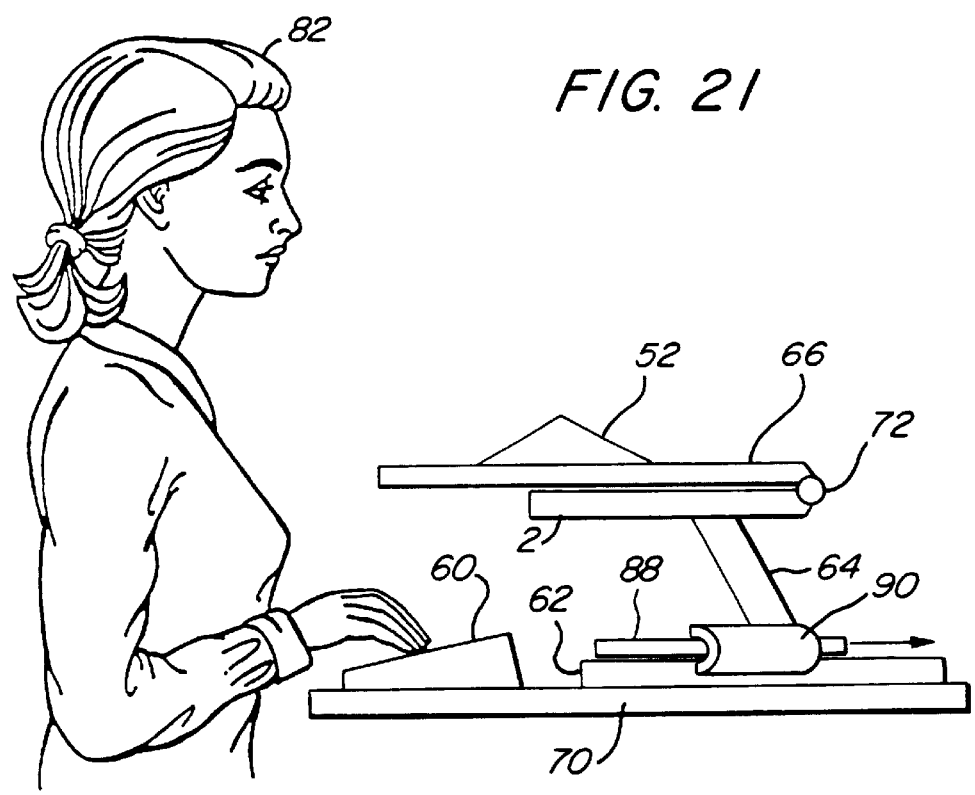
FIG. 21 illustrates a terminal configuration positioned out of an essential work area.

A significant embodiment of the present invention is illustrated in FIG. 20 which eliminates the protruding overhang into the essential work area 78 of the beamsplitter terminal section 66 when closed upon the display 2. In this configuration the beamsplitter terminal section 66 not only closes upon the display 2, but also shifts backwards away from the conferee by eliminating the protruding overhang into the essential work area 78. In this configuration the stiff hinge 72 is attached to a slide extension arm 84 which slides within sleeve 86. The embodiment of FIG. 21 shifts not only the beamsplitter terminal section 66 backwards, but also the display 2 a slide track in a bearing sleeve 90 attached to base 62. Other mechanical methods (not shown) may be utilized to shift at least the beamsplitter terminal section 66 and possibly other terminal components including the entire terminal backwards away from the conferee 82 without the nuisance of physically and strainfully lifting the entire terminal up, and then reposition to the back of desk 70. The apparent advantages of the beamsplitter terminal section 66 closed upon display 2 are the protection of the beamsplitter 6 and the display 2 from accidental damage and, most importantly, the conferee 82 can converse with others on the opposite side of the desk.

Figure 22:
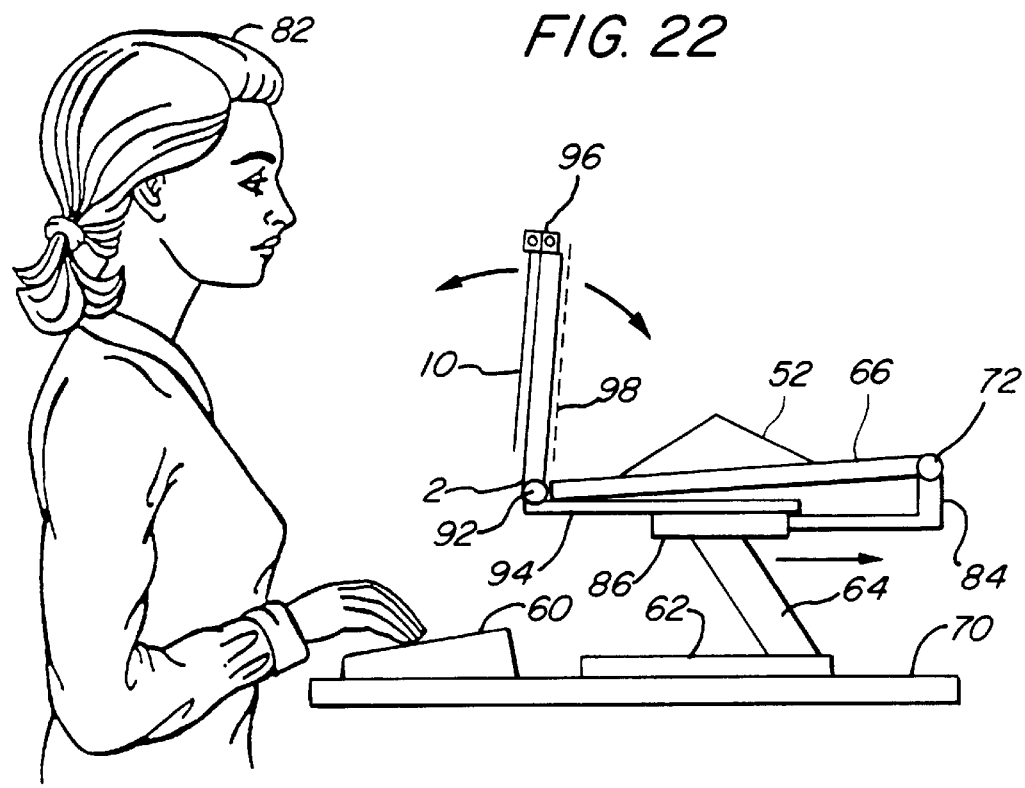
FIG. 22 illustrates a terminal configuration that has a reflected view mode and a direct view mode.

Another embodiment of the present invention as seen in FIG. 22 permits the conferee 82 to select between viewing the reflected display position 79 (as illustrated in FIG. 18) and viewing directly the display 2. Some consumers may require direct access to the display 2 for touch screen applications as well as other applications. A display stiff hinge 92 attached to a display support section 94 permits the display 2 to be positioned into various angles for comfortable viewing. The display 2 can be viewed through the image blocking film 10 or the image blocking film 10 can be folded by a double hinge 96 to an image blocking rear position 98. Likewise the image blocking film 10 can be removably attached to the display 2. Features described for FIG. 20 are applicable to the configuration of FIG. 22. The dual use modes and the possible configurations of an integral terminal may be applied as well to notebook computers and other portable consumer electronic devices.

Figure 23:
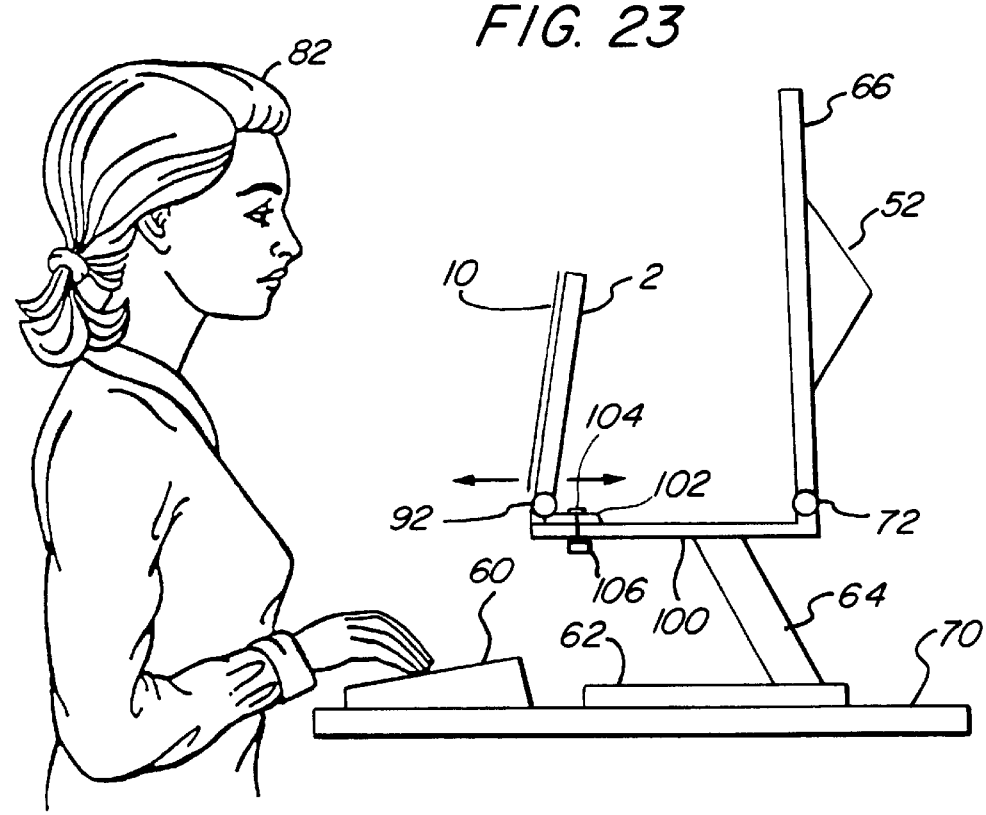
FIG. 23 illustrates a positionable display integral to a terminal.

FIG. 23 illustrates an additional embodiment where the display 2 can be manually positioned at various distances from the conferee 82. The display stiff hinge 92 is attached to a display short base 102 which rests upon a terminal platform 100. The display short base 102 is locked in place by a bolt 104 and a knob 106 to the terminal platform 100. Cut into the terminal platform 100 is an elongated track (not shown) the width of the bolt 104 so that the display short base 102 can be tightened down in various distances from the conferee 82. Though not shown, the embodiment of FIG. 23 can include the functional elements as described for FIGS. 20, 21, and 22. Most significantly the display 2 can be positioned away from the conferee by positioning the entire terminal back on the desk in a manner described for FIG. 21.

Reflected displays require the image source to produce a compensated image for accurate reflection viewing. Otherwise a reverse/inverted image will be seen at the reflected display position 79 (FIG. 18). The embodiments of FIGS. 22 and 23 permit a direct view of display 2. Hence, the consumer will need to select between a direct view mode and reflection view mode of which the image source will produce a standard or compensated image. Reverse/invert image techniques can be inherent as to the display 2 driver electronics or separate from the display and originate from, for example, software from a personal computer. Reverse/invert controls can be manually selected by buttons located in an easy to reach place anywhere on the terminal. Also, reversing/inverting of the image source can occur automatically by, for example, triggering a switch when the display 2 is manually tilted up and down on the stiff display hinge 92.

Figure 24:
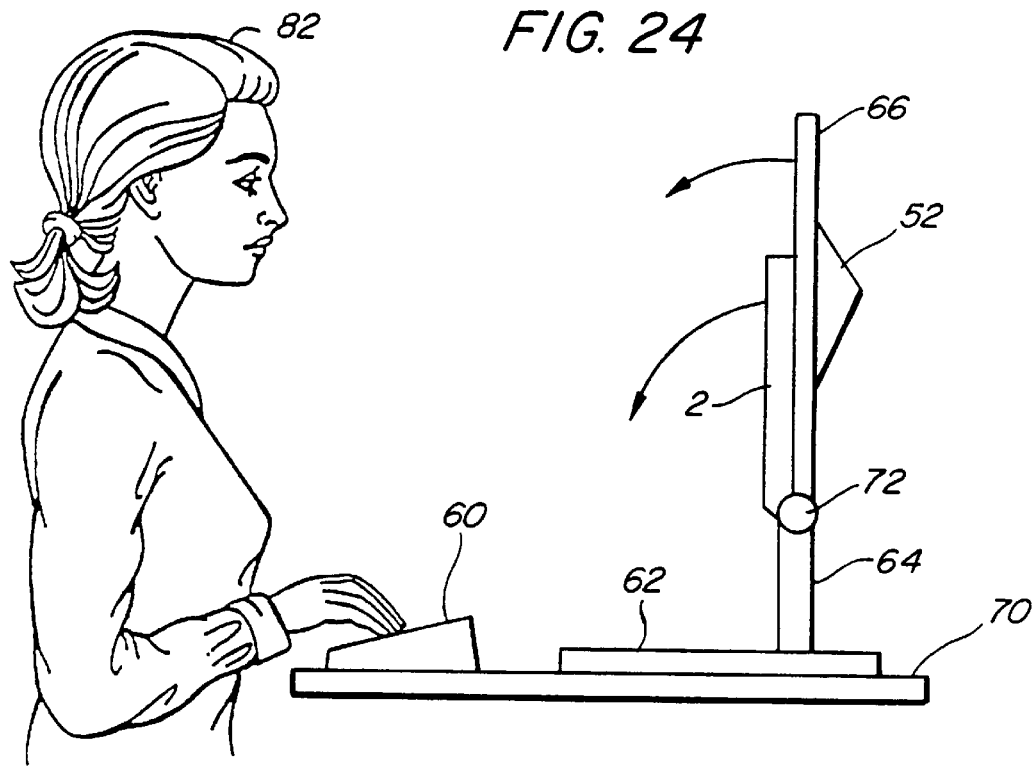
FIG. 24 illustrates a terminal configuration that allows both the display and the beamsplitter to be positioned for maximum desktop usage.

FIG. 24 illustrates another embodiment of the present invention which connects the stiff hinge 72 to the terminal extension post 64. In this embodiment, both the display 2 and the beamsplitter terminal section 66 are attached to the stiff hinge 72 so that both can be folded and aimed upwards freeing the entire desk 70 which can be utilized as a large and efficient work area. Functional elements as described for the embodiments for FIGS. 18–23 can be readily adapted to the embodiment of FIG. 24 to create a highly versatile desktop terminal.

Figure 25:
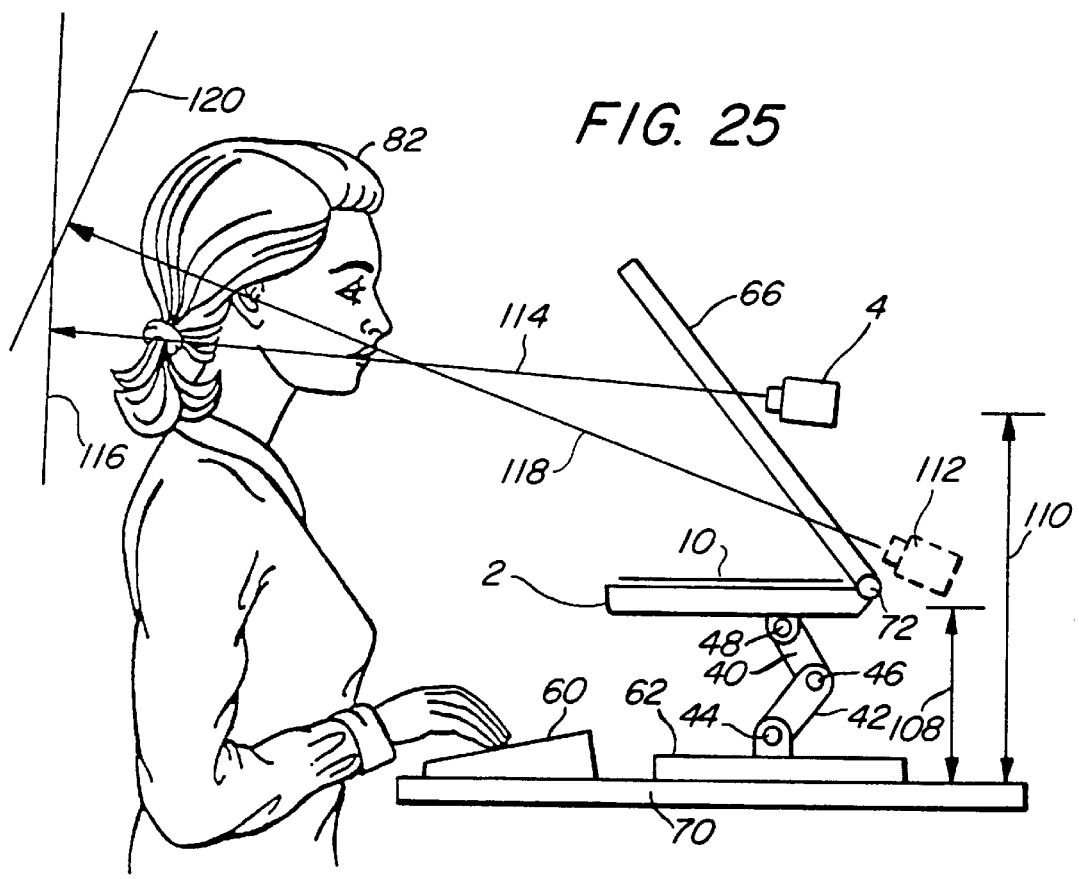
FIG. 25 illustrates height adjustments of the terminal configuration and its effects on camera aiming.

Still another significant embodiment of the present invention is seen in FIG. 25 where the display 2 and the beamsplitter terminal section 66 are supported by stiff pivot hinges 44, 46, and 48 connected to extension arms 40 and 42, permitting manual adjustments of the height of the display 2 relative to the desk 70. This relative height of display 2 to the desk 70 is illustrated by a dimension line 108. A primary concern for image capturing by the camera 4 is assuring horizontal aiming toward the conferee 82 as seen in aiming line 114. The result is capturing an image of a background perspective 116 that is parallel to the posture of the conferee 82. An inferior method of capturing an image of the conferee 82 is positioning the camera in camera position 112. The result is a angled aiming line 118 and an angled background perspective 120 showing in the captured image a background of the ceiling (not shown). Such camera positioning is fundamental to the art of audio and visual production and the horizontal aiming line 114 is typically used for news broadcasts. The stiff pivot hinges 44, 46, and 48 connected to extension arms 40 and 42 allows greater flexibility for conferee 82 selection of the camera 4 height position relative to the desk 70 as illustrated by a camera to desk dimension line 110.

Variations and modifications of the configurations 18–25 will be apparent to those skilled in the art when supplied the fundamental configurations of the present invention. Additionally, pivot and swivel mechanisms for pan/tilt functionality can aid in even greater versatility in the positioning of the display 2.

FIG. 26 illustrates a human interface section 122 built adjacent and integral to the display 2 represented by area 124. The human interface section 122 is covered by the overhang protrusion of the beamsplitter terminal section 66. Contained in the human interface section 122 can contain an integral data interface (not shown) such as the keyboard 28 similar to that seen in FIG. 8. Hence, a compact terminal for portable computing, such as a battery operated notebook computer, can have all its key elements including the display 2, the beamsplitter 6, and the keyboard 28 protected from accidental damage and ease of portability by having all these elements closed upon one another by stiff hinge 72. Also, the human interface section 122 can contain a phone dial and a hand held phone receiver with microphone and speaker (not shown) so that this terminal can function as a stationary and portable videophone. Another configuration not shown enables the portable configuration described above to have adjustable extension legs that fold out from the bottom of display 2 raising the camera 4 above desk 70 to a height for near horizontal aiming as previously described for FIG. 25. Still another embodiment not shown would allow the human interface section 122 to detach from the display 2 and allow the human interface area 122 to be placed on a desk in a similar position as the keyboard interface 60 in FIGS. 18–25.

Another embodiment of the present invention is illustrated in a cutaway FIG. 27 where a removable camera housing 126 detaches from the beamsplitter terminal section 66 and may be optionally stored for portability in a slot 144 to the side of display 2. The slot 144 can be accessed through a slot door 148 connected to the display 2 by slot hinge 146 and a lock latch (not shown). Camera 4 is seen with an optional camera electronic board 130, camera ribbon cable 132, and exposed contacts 134 assembly contained with in the removable camera housing 126. Power and video are passed to a contact receptacle 136 on the beamsplitter terminal section 66. The removable camera housing 126 is attached to the beamsplitter terminal by a hook latch 127 and magnetic connections 138 and 140. A camera lens 128 is aimed through a hole 142 in the beamsplitter terminal section 66 to capture images through the beamsplitter 6. Various adaptations to remove the camera 4 will be apparent to one of ordinary skill in the art. Despite the possible variations, when the camera housing 126 is removed the beamsplitter should be protected from accidental damage on the camera side. Small shutter doors (not shown) may serve to cover up holes in the back of the beamsplitter terminal section 66.

Another embodiment of the present invention is seen in a cutaway FIG. 28. Instead of having the removable camera housing 126, the camera 4 can be built between the beamsplitter 6 and the rear wall 155 of the beamsplitter terminal section 66. As camera technology improves and miniaturizes this would certainly be preferred placement of the camera 4 for it would provide an aesthetically pleasing thin profile to the beamsplitter terminal section 66 and improve portability due to increased compactness.

Still another embodiment of the present invention seeks to remedy the problem of the camera 4 lens 128 being visible to the conferee while using the display. Reflections upon lens 128 can be minimized by selecting a lens of a given size and curvature that is not prone to forming reflections. Often antireflective coatings are applied to the various optics that comprise a lens and these coatings can be adjusted, as well, to minimize reflections on the lens 128. An antireflective layer can be disposed in front of lens 128 on a separate substrate as well (not shown). A mechanical method of reducing and even eliminating the lens reflection uses a manual slide baffle 154 with a finger lever 156 (FIG. 29). Another form of baffle can use two polarizers in front of camera 4 that can be adjusted in relation to one another permitting a transparent mode and a baffle mode. Also, a shutter or baffle can be integral to the lens 128. Of course manual methodology can be replaced by an automatic function controlled by a touch of a button. Such modifications will be apparent to one of ordinary skill in the art. A non-mechanical approach utilizes a liquid crystal or similar operating shutter which can alternate from a transparent mode to a diffused or even opaque mode. FIG. 30 illustrates a liquid crystal shutter 150 with an electrical connection 152 which, depending upon a controllable electrical current, can be selected for either a transparent mode of, which camera 4 can be aimed through or an opaque mode which conceals the lens 128 from the conferee's view. These baffle and shutter methods described will not permit an image to be captured of the conferee 82 while they are concealing the lens 128. So the baffles and shutters are engaged when the display 2 is utilized for non-videoconferencing modes.

Another embodiment is illustrated in FIG. 31 where the present invention is designed in the manner of a hang-on-the-wall videophone or hang-on-the-wall computer phone. The stiff hinge 72 is connected to a wall mount 158 which is attached to a wall 162 by screws 160. Both the beamsplitter terminal section 66 and the display 2 are attached to the stiff hinge 72 permitting them to fold out and away from the wall from a closed position (not shown) to an open position as seen in FIG. 31. A hand-held phone receiver including microphone and speaker and phone button interface, and the phone communication electronics, and any supporting computer can be adapted into or next to this primary configuration as desired by one of ordinary skill in the art Another embodiment is a dust removal system which does not require the cleaning energies of the conferee to maintain ideal operating efficiency of the terminal components. The collection of dust on either the viewing surface of display 2 and both sides of the beamsplitter 6 will effect optimum performance of the camera 4 image capturing and the viewing the display 2 reflection on the beamsplitter 6. FIG. 32 illustrates the use of a fan 174 with an air intake 174 supplying a stream of air through an air filter 168. The fan system is deployed on both sides of the beamsplitter 6 and air flow can pass from behind through an air outtake 176. Also, the same type of fan arrangement from a fan section 170 can pass air over the display 2, the image blocking layer 10, and an optional conductive layer 172. The conductive layer 172 can also be applied to one or both sides of the beamsplitter 6. The conductive layer is typically grounded, removing static electricity that can attract dust. The air flow from fans 174 can also, be treated by deionizing techniques and other air treatment techniques commonly used in clean rooms. Also anti-static and dust repelling materials can be utilized in the entire construction of the terminal. Of the options provided, one or more can be utilized and in any combination. Lastly, the area between the back side of the beamsplitter 6 and the rear wall 155 can be sealed air-tight so that no dust can enter and thereby no dust can be deposited on the back side of the beamsplitter 6 (not shown).

Figure 33:
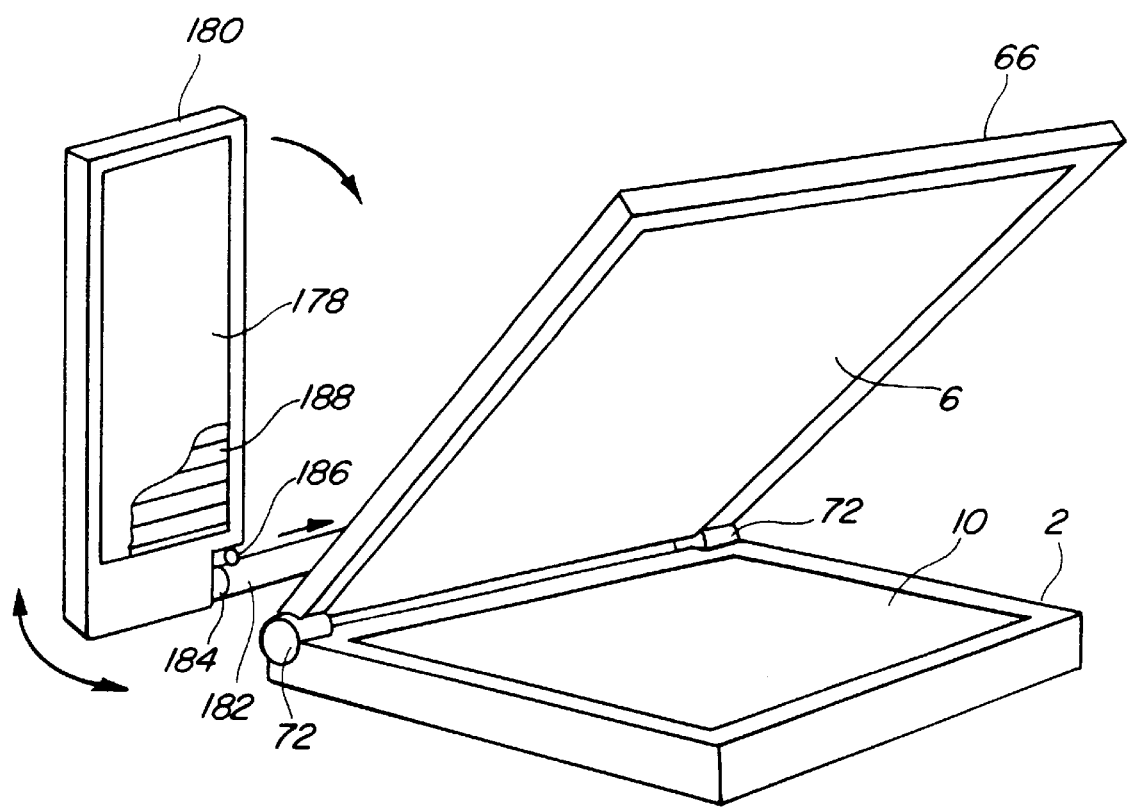
FIG. 33 illustrates an adjustable light source as a part of the terminal configuration.

Another embodiment provides illumination of the conferee 82 by an adjustable light system that is fixedly attached to the various configurations of the present invention. A light 178 in light housing 180 is fixedly attached to the back of the beamsplitter terminal section 66 by a retracting light stem 182 which retracts into a housing section (not shown) designed to hold the light stem 182 in a closed or pulled out mode as seen in FIG. 33. In the closed position, the light 178 rests upon the back of the beamsplitter terminal section and is locked in place by a latch for portable use (all not shown). A light pivot 184 permits the light housing 180 to tilt forward and backward and a light swivel 186 permits the light housing 180 to pan right and left. A full degree of adjustable direction will permit the light to be aimed by the conferee for optimum illumination. An additional retracting light on the right and above the beamsplitter terminal section 66, with same degree of tilt and pan, will add even more illumination choices for conferee 82. Likewise retractable lighting systems can be attached to the display 2 or the base 62 or the terminal extension post 64 as seen in FIG. 18 (not shown). Lighting is preferably a dimable and color corrected florescent source. Florescent is preferred because it emits a minimal amount of heat and the light is contained in a wider area than a spotlight. This is important because a spotlight can cause a great deal of visual irritation and distraction when looking at the reflection of display 2 on the beamsplitter 6. A soft bank of light, such as that of light 178, on the other hand, will not cause the same visual irritation and distraction. A directable light louver 188, of any type, may be added to the front of the light 180 to focus the light upon the conferee and prevent light from washing out the display 2. Other filters, such as diffusion filters and holographic filters, may, as well, improve overall illumination options and performance.

Figure 34:
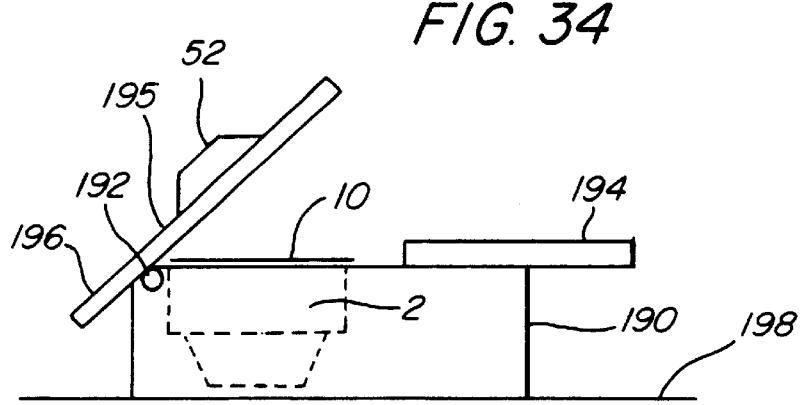
FIG. 34 illustrates a conference table incorporating the present invention.

Another unique embodiment of the present invention is to utilize on actual table or desk serving two modes of use. The first mode is as a common working surface 195. The second is as a eye contact teleconferencing device where the common working surface 195 is tilted upward with a beamsplitter attached to opposite side and exposing the display 2. FIG. 34 illustrates a tiltable conference table top 196 when in a closed position seamlessly integrates with a permanent conference table top 194. On the opposite side of the tiltable conference table top 196 is attached the beamsplitter 6 (not shown). The tiltable conference table top 196 is tilted by a stiff spring hinge 192 holding it in the desired angle. The entire table is supported by a support structure 190 which also conceals display 2 and rests on a floor 198. With this configuration many conferees can be seated at one end of the conference table and all interact with the reflected display 2 on the beamsplitter 6. Camera housing 52 is optional and the current configuration can include camera options discussed in this specification as well as any other mounting methods.

Figure 35:
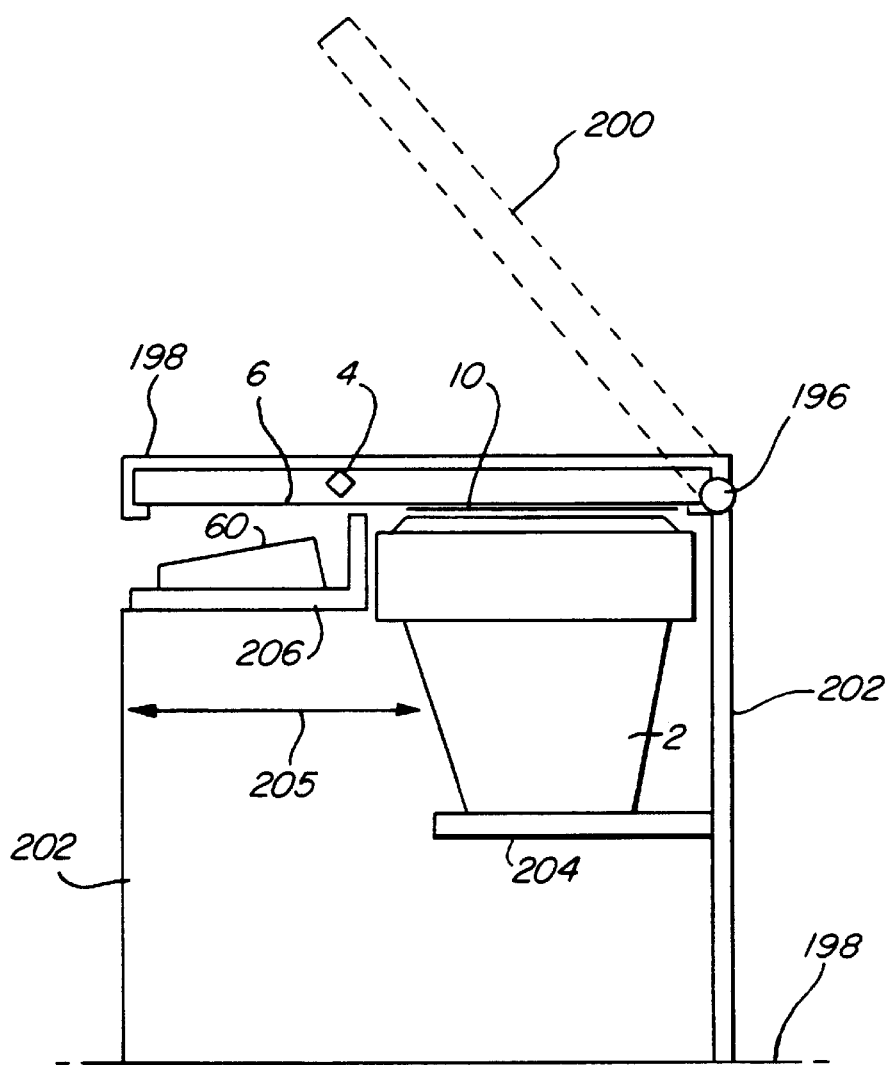
FIG. 35 illustrates a desk incorporating the present invention.

FIG. 35 illustrates a cutaway view of a further embodiment of the present invention in a common desk. A desk wall construction 202 supports display 2 on a display ledge 204 and keyboard ledge 206. A desk top section 198 serves as a common working surface but when tilted up to a position 200 exposes camera 4, beamsplitter 6, display 2 and the keyboard interface 60. A designated leg room area 205 permits the display 2 to be a typical bulky CRT or rear projection device.

Figure 36:
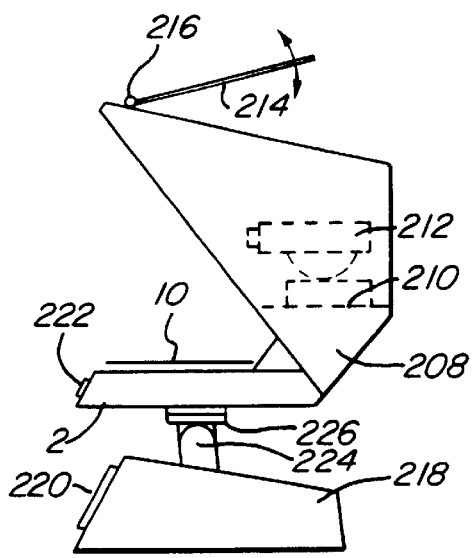
FIG. 36 illustrates a terminal configuration with a versatile camera housing.

Another embodiment of the present invention includes the incorporation into a single terminal, various support components for enabling a complete videoconferencing experience. FIG. 36 illustrates a terminal base 218 which includes speakers (not shown), speaker grill, and enough room for system electronics including transformers. Attached to the base is a component pivot 224 and a component swivel 226 which permits the display above to pan and tilt with a wide selection of positioning choices. A microphone 222 is built into the front face of display 2. Also attached to display 2 is a versatile camera housing holding the beamsplitter 6 in the appropriate angle (not shown). The versatile camera housing 208 includes camera mounting ledge 210. A camera access door 214 is attached by a camera door hinge 216 to the versatile camera housing 208. A remote controlled pan/tilt camera 212 is mounted upon the ledge 210, but numerous other consumer and professional video cameras with both digital and analog outputs can be mounted onto the camera mounting ledge 210.

Figure 37:
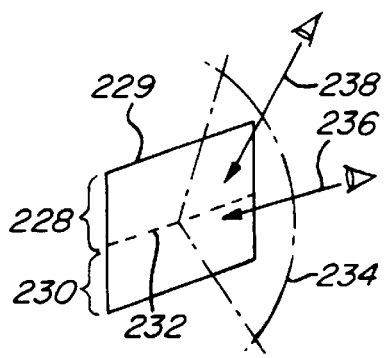
FIG. 37 illustrates the preferred vertical viewing angle of a display as it relates to the present invention.

FIG. 37 illustrates the vertical viewing angle of a sample image display 229 the sample image display 229 is divided into two parts forming a top section 228 and a bottom section 230 dividing the sample image display 229 with a top and bottom division line 232. The top section 228 is that portion of the sample image display 229 closest to the conferee 82 (for visual reference nearest the microphone 222 of FIG. 36). The sample image display 229 will permit a view of its image when a user is parallel to the display looking straight on at it as illustrated by a straight on viewing line 236. However, when viewed from an oblique angle from the top side, defined here as an oblique top side angle 238, the sample image display will be obscured from viewing. As described and illustrated, image blocking film can consist of several materials that either diffuses the visible luminous image or nearly or completely "shuts off" the image from the an oblique top side angle 238 and thereby eliminate the distraction of seeing the two images simultaneously.

Figure 38:
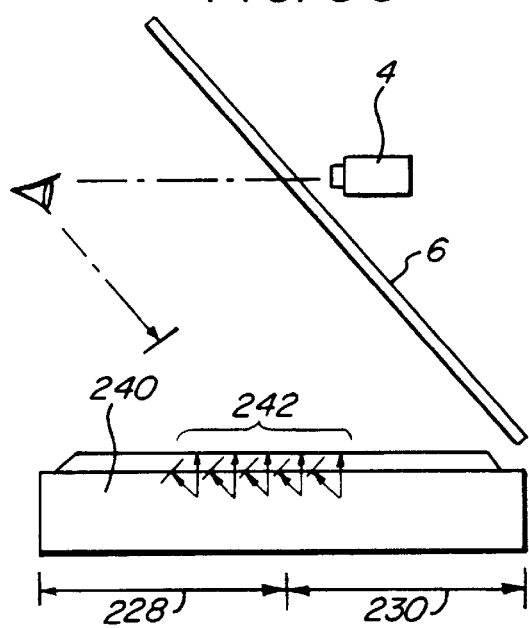
FIG. 38 illustrates a display which is constructed to image block when viewed from an oblique angle.

FIG. 38 illustrates a further embodiment of the present invention of which an image blocking property is integrally constructed into the display technology. An image blocking display 240 is integrally constructed with a specified image blocking property as seen in example section 242. The luminous image is reflected by the beamsplitter 6, yet from the oblique top side angle 238 the luminous image has become obscured either by the appearance of becoming diffused or eliminating nearly all the luminous image. Liquid crystal structures are typically designed with criteria for the maximum horizontal and vertical viewing angle. A specific liquid crystal display construction will permit the required image obscuring from the oblique top side angle 238. Those skilled in the art will understand the peculiar image blocking requirement of the present invention and can adjust display construction techniques, whether it be liquid crystal or some other form of display, to satisfy that requirement.

Figure 39:
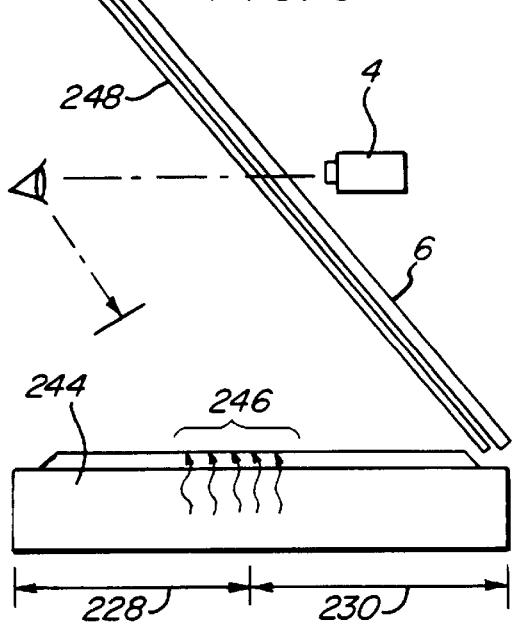
FIG. 39 illustrates a display that requires a remote polarizer to form a completed image.

FIG. 39 illustrates an alternate embodiment of which an incomplete polarization of a liquid crystal display is utilized creating an incomplete image display 244. An example, portion 246 shows an incomplete image formed by the incomplete image display 244. The incomplete image display will appear luminous yet with a subtle ghost image that may not be considered a distraction while utilizing the reflected image on beamsplitter 6. A remote polarizer 248 is positioned either in front or in back of the beamsplitter 6 or can be integral to the optical coating on the beamsplitter 6. The introduction of the remote polarizer 248 completes the image formation process. Hence, the beamsplitter 6, or at least a layer in front of beamsplitter 6, serves as an extension of the display with the addition of the remote polarizer.

The beamsplitter 6, even when constructed for typical consumer use is much safer than a cathode ray tube under vacuum pressure. As with all display and electronic products, care should be given to preserve all the components. A very unusual requirement to "ruggedized" the beamsplitter 6 for military use can be achieved either through the methods of heat tempering and/or chemical strengthening processes. Remote camera zooming systems, as well, are necessary if the consumer desires not to reach behind the beamsplitter 6 to manually change the zoom on the camera 4. Remote pan/tilt and zoom may all be conducted by the conferee at the distant site for such applications as medical conferencing. The display 2 may, in all the embodiments and configurations of the present invention, be a 3-D display. The beamsplitter 6 is constructed out of any material including plastics.

Figure 40:
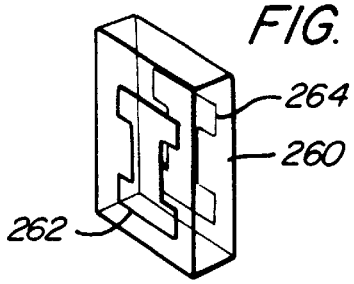
FIG. 40 illustrates a beamsplitter with an undesirable double image.
Figure 41:
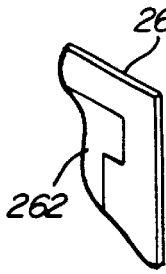
FIG. 41 illustrates a beamsplitter that has been chemically hardened to reduce the thickness of the beamsplitter and thereby reduce the double image.

It is a further embodiment of the present invention to custom fabricate the beamsplitter 6 so that it will substantially reduce a reflected double image on the back side of the beamsplitter opposite the image display 2. FIG. 40 illustrates a common beamsplitter 260 with a sample reflected icon 262 reflected from the image display 2. A reflected double image 264 is seen on the opposite side of the common beamsplitter 260. The reflected double image 264 becomes more apparent as the common beamsplitter 260 glass substrate increases in thickness. For example, the reflected double image 264 would be more noticeable with ¼ inch thick glass than with ⅛ inch thick glass. This reflected double image 264 is a great irritant when viewing an image on beamsplitter 260 for close up computer use such as word processing or industrial graphic design. Even with highly sophisticated antireflective coatings applied to the common beamsplitter 260 the reflected double image 264 may still be apparent to the viewer. FIG. 41 illustrates the use of a chemically hardened glass beamsplitter 266. Through the processes of chemically hardening a glass substrate a beamsplitter can be reduced in its thickness substantially and thereby substantially reduce and even eliminate the reflected double image 264. For example, the strength of a ¼ inch thick piece of glass could be approximately equal in strength to a 1/16 inch thick chemically hardened piece of glass. This technology, when deployed in all embodiments and configurations of the present invention, substantially eliminates the irritant of seeing the reflected double image 264.

Figure 42:
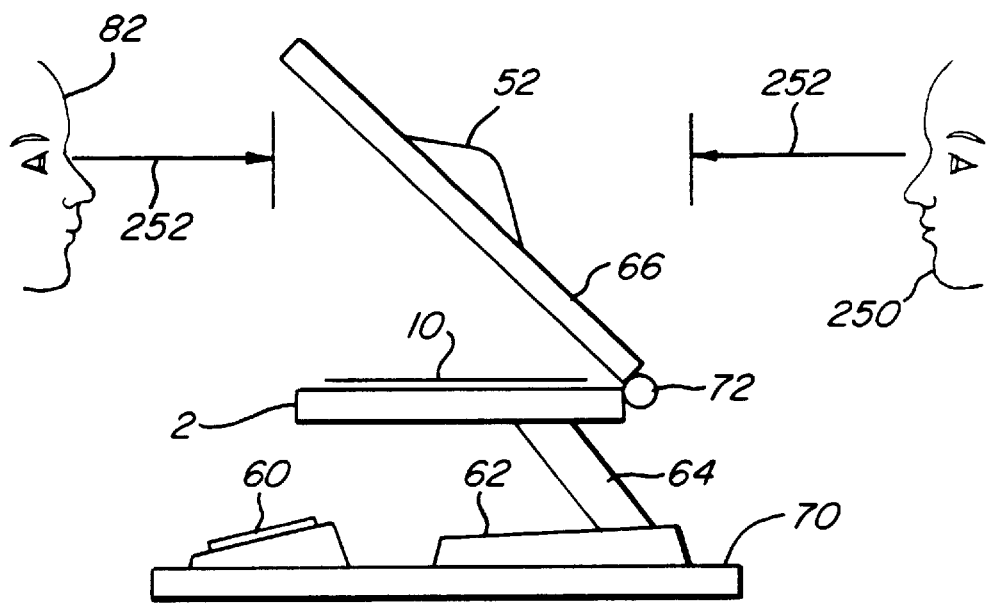
FIG. 42 illustrates the inability to converse with a person seated at the opposite side of the desk.
Figure 43:
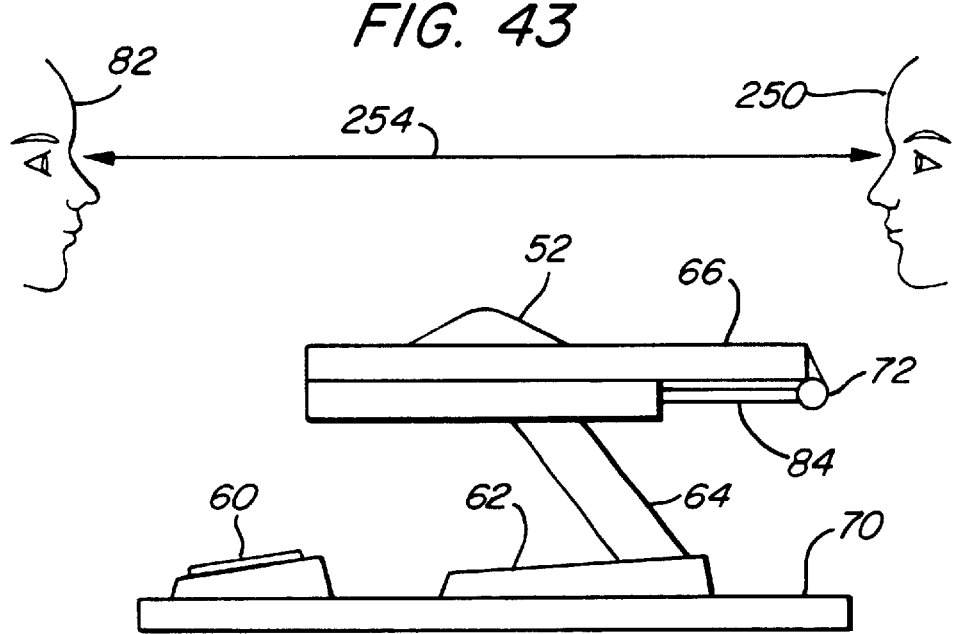
FIG. 43 illustrates the present invention with a foldable section to permit conversation from one side of the desk to the other.

FIG. 42 illustrates the present invention open in use by the conferee 82. While ideal for eye contact videoconferencing the conferee cannot see through to other side of desk to converse to others who may be present. An obstructed sight line 252 is experienced by both the conferee 82 and an office guest 250. Certainly the embodiments of the present invention resolve this problem by enabling the beamsplitter terminal section 66 to fold down upon the display 2. FIG. 43 illustrates the beamsplitter terminal section 66 folded down permitting the conferee 82 and the guest 250 to have a sight line 254 of each other. Alternatively or in conjunction with this fold down feature, the present invention is intended, as well, to allow the conferee 82 to look through and beyond the beamsplitter 6 to the guest 250 maintaining the sight line 254 as seen in FIG. 44. Unfortunately, contrast of the image reflected by the beamsplitter 6 is minimal since there is not an opaque black background.

A shuttering system is preferred for many applications so that the conferee need not go through the physical movement of lowering the beamsplitter 6 and the beamsplitter terminal section 66. FIG. 45 illustrates an LCD shutter or similar electrical responsive material that can, at the touch of a button, switch from a clear mode to an opaque mode. Electrical source 258 applies necessary voltage to a responsive substrate 256 for mode selection. FIG. 46 illustrates a fluid shutter which utilizes non-mixing fluids in which a fluid 262 is clear and a fluid 260 is opaque. The fluids are wedged between the beamsplitter 6 and a clear substrate 264. A fluid chamber 270 contains an opaque fluid section 276 and a clear fluid section 278. The sections are separated by a movable baffle 274 connected to thumb slide 272. By moving the thumb slide 272 either the opaque fluid 260 retracts or regains forming a contrast background. Tubes 266 and 268 deliver the fluids from the fluid chamber 270.

A solid opaque substrate 280 as seen in FIG. 47 can as well be deployed in numerous methods. For example black material can roll up on a spindle 282 and repositioned by a push knob 284. Venetian type blinds can be utilized or the solid opaque substrate 280 can simply snap on and off. An arrangement of polarizers can as well be utilized for a switchable clear and opaque mode. FIG. 48 illustrates a contrast polarizer 283 and a second contrast polarizer 281 which can be spun from a clear mode to an opaque mode. Circular polarizers or lenticular polarizers can be utilized as well to achieve the same functional outcome. A hole 279 in FIGS. 47 and 48 is provided so that the camera has an unobstructed view through the beamsplitter 6. FIG. 49 illustrates an embodiment of the present invention similar to that seen in FIG. 39. Here the remote polarizer 248 is actually separate from the beamsplitter 6 and can be worn by the conferee as glasses. An incomplete image display 244 with a removed polarizer from an LCD panel, for example, will not form an image. It is well known in the art that polarized glasses will form a picture and have been used as a privacy filter for computer displays. It is completely unique to this invention that the actual image is transparent and see-through unless polarized glasses are used. The application of this invention extends far beyond eye contact videoconferencing and can be used as a unique display system without a camera. For example, such a display system of FIG. 49 could be used as a control panel visible only to the operator of a vehicle and not to passengers even though both are looking through the same vehicle window.

FIG. 50 illustrates another embodiment of the present invention in which a beamsplitter terminal section 66 or at minimum the beamsplitter 6 can be stored opposite the portable display 270 in a compartment 285 by a slide post 287. The portable display 270 connects to the portable keyboard section 272 by a portable computer hinge 274.

Other storing methods may be utilized as well as a part or separate from the portable computer. FIG. 51 illustrates a separate beamsplitter 6 or likewise beamsplitter terminal section 66 (not shown) so that a portable computer can be used in a reflected mode for eye contact videoconferencing. Hence the desktop device may remain on the desk while the consumer can use a the portable computer in other environments. The camera 4 contained in camera housing 52 may detach and store or connect directly to the portable computer (not shown). The separate beamsplitter 6 in FIG. 51 is connected by a first pivoting hinge 282, a second pivoting hinge 278 a height arm and thin stand 276. In concert, they can position the beamsplitter 6 at various heights and enable various tilting angles. Portable display 270 can as well be detached and elevated to an adjustable canopy position 284.

FIGS. 50 an 51 are utilized in the same direct view mode and reflected view mode as described for FIGS. 22 and 23. Image compensation as described is essentially converting the image for either direct viewing or reflected viewing. The portable computer in FIG. 52 is equipped for videoconferencing including the speaker 55 and a microphone 273. The a direct view image 288 is standard in all consumer display products. The present invention requires an additional image display capability as seen in FIG. 53. Here the conferee has selected with a image switch 286 a converted image 290 for viewing upon the reflection on the beamsplitter 6 as seen in FIGS. 50 and 51. Instead of the image switch 286, the image conversion can occur automatically when tilting the portable display 270 backward or image conversion can be engaged through software. Any method for image conversion is applicable to the present invention including manipulation of the image signal by software, hardware, including a video/graphics board, or any combination thereof. Also image conversion can be achieved by changing signal wires and changing a display's circuitry. Image conversion as well can be achieved by using a second mirror in an optical arrangement so that the reflected image on the beamsplitter 6 can be viewed correctly. Another novel method of image converting can be seen FIG. 54 where a transmissive display 292, such as an AMLCD, can be removed from a backlight 271 and flipped over setting back on top of the backlight 271. A flipping support arm 294 and flip pivot hinges 296 are used optionally to support the transmissive display 292 as it is turned over.

Figure 55:
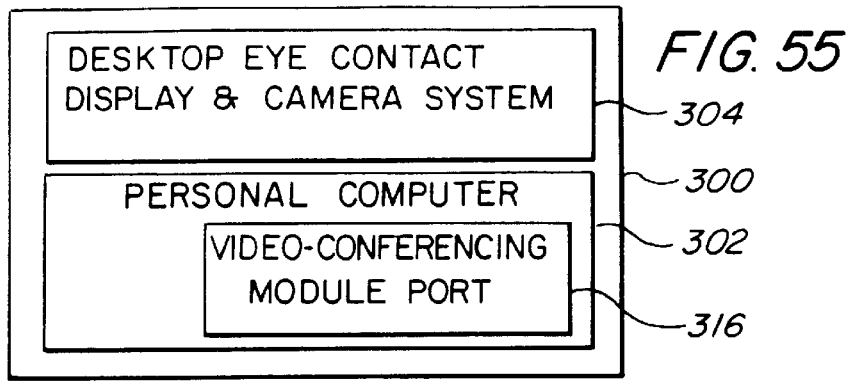
FIG. 55 illustrates a block diagram of an integrated eye contact computer with a module port.

A primary embodiment of the present invention is a creation of a single desktop system designed around the parameters of high quality video production for effective communication which includes eye contact and computer system flexible enough to adapt to changing transmission systems. Videoconferencing is as good as the bandwidth pipe and compression it utilizes. Ideally videoconferencing is experienced real-time with no lag between audio and video and the image looks as good as television. The consumer is wary of an investment in a technology that may be obsolete within a year. FIG. 55 illustrates a block diagram of the present invention of an integrated eye contact computer 300 which functionally incorporates a personal computer 302 with a videoconferencing module port 316 and a desktop eye contact display and camera system 304. The module port 316 permits quick replacement of the videoconferencing system by the consumer.

Figure 56:
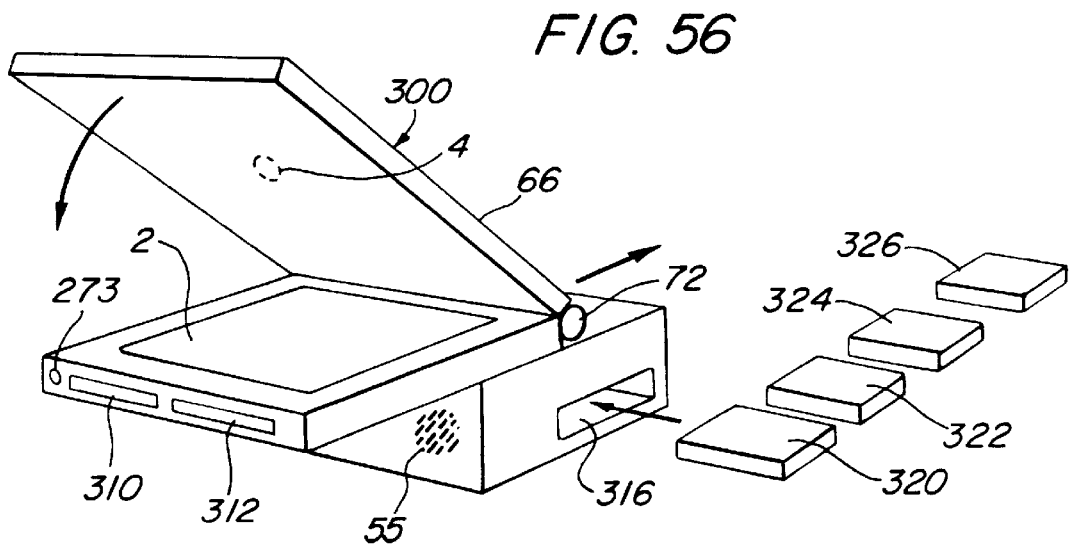
FIG. 56 illustrates an integrated eye contact computer with replaceable modules.

FIG. 56 illustrates an integrated eye contact computer 300 that incorporates a fully functioning personal computer for processing, storing, and transferring data, and a display 2 with beamsplitter terminal section 66 for eye contact videoconferencing. The integrated eye contact computer as well includes the videoconferencing module port 316 so that the consumer can utilize the latest transmission system and readily exchange a "LAN module" 320, for a "128 module" 322, or a "384 module" 324, or a "T1 module" 326. The modules described are for specific transmission systems, however a single module may contain one or more compression and/or connection methods which include any and all proprietary and public videoconferencing transmission systems including data and analog systems. It may include as well an accelerator for a software based videoconferencing system such as Microsoft Corporation's Net Meeting™.

Figure 57:
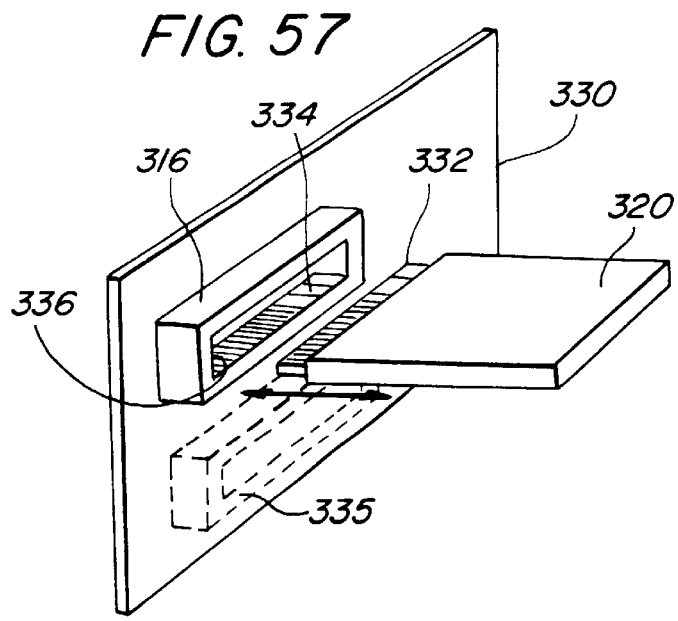
FIG. 57 illustrates a back plane with a fabricated module port.

The videoconferencing module port 316 permits the integrated eye contact computer to be flexible enough to adapt to new videoconferencing systems including wireless. Also, the videoconferencing module port 316 permits the consumer to quickly exchange modules for different types of connections. The videoconferencing module port 316 is attached to a back plane 330 and includes contact connections 334 which receive the LAN module 320 contact connections as seen in FIG. 57. Of course a module of any specific videoconferencing system is applicable. While PCI or ISA slots accessible from inside an integrated eye contact computer housing 308 may suffice, it is specifically illustrated that the videoconferencing module port 316 be accessible from the exterior of the integrated eye contact computer housing 308 for ease of use by the consumer. Preferably the modules are compact in size and encased in a plastic shell for ease of portability. An additional videoconferencing module port 335 may also be included so that each module may have dedicated functions such as one module used for multiplexing phone lines while another for data/image compression.

Figure 58:
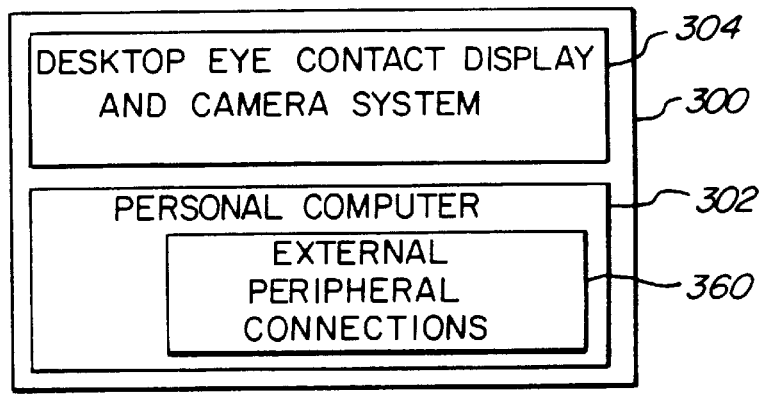
FIG. 58 illustrates a block diagram of an integrated eye contact computer that serves both as a single user desktop system and as a group conferencing system.

The integrated eye contact computer 300 is configured specifically to enable the highest quality single user videoconferencing experience in a single fully integrated device. The unique features of this device including the folding beamsplitter section 66 and the inclusion of computer for videoconferencing applications also enables this single device to be used for group conferencing. For example, a consumer may utilize the integrated eye contact computer 300 as his sole desktop computer but may also desire, at times, to conduct group videoconferencing. Instead of the consumer being forced to acquire two complete systems, the present invention is essentially two systems in one. The display 2 is generally too small to conduct such group sessions. A block diagram seen in FIG. 58 illustrates this multi-applicational device explained here as the integrated eye contact computer 300 which includes a desktop eye contact display and camera system 304, a fully functional personal computer 302 and a peripheral connections 360.

Figure 59:
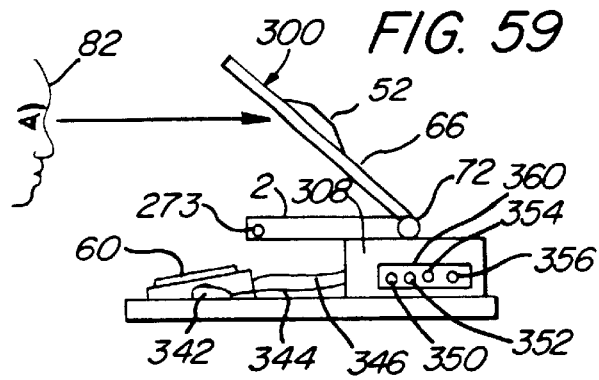
FIG. 59 illustrates an integrated eye contact computer with peripheral connection used in a single user mode.

FIG. 59 illustrates the present invention in a typical single user form factor and includes the peripheral connections 360. A mouse 342 and the keyboard 60 are connected to the integrated eye contact computer 300 by a mouse line 344 and a keyboard line 346. The inclusion of the peripheral connections 360 with an external microphone connection 352, an external speaker connection 356, an external camera connection 354, and an external monitor connection 350 all permit group conferencing with peripheral components. The integrated eye contact computer 300 is small enough to be portable so that the consumer can quickly remove it from a desk space and set up in a group space. A battery pack can also be included for additional portability.

Figure 60:
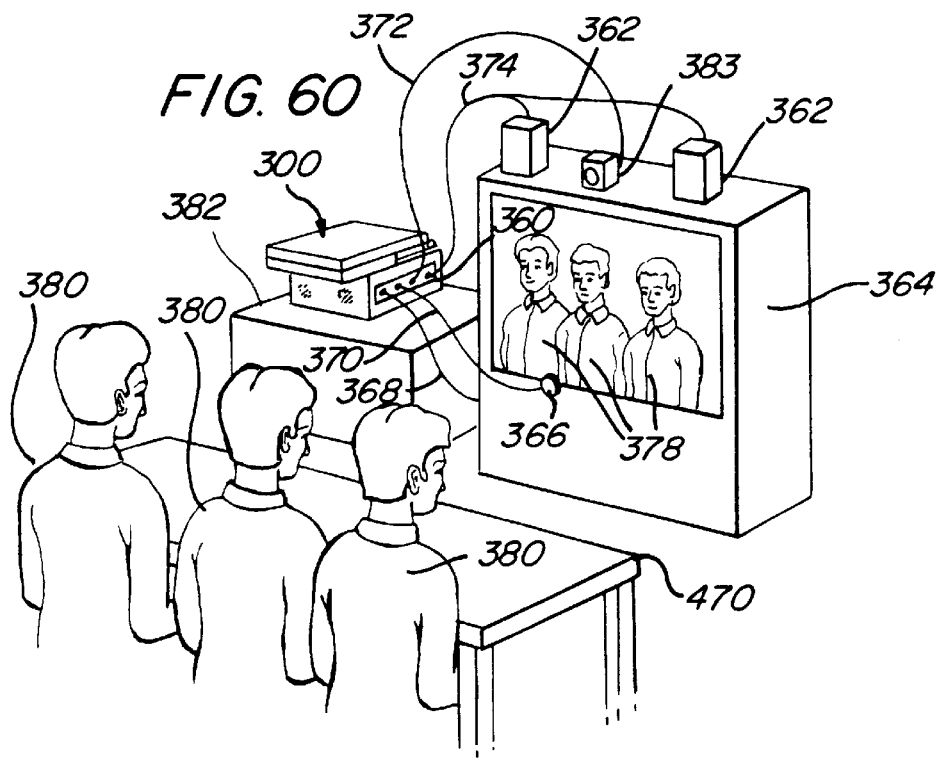
FIG. 60 illustrates an integrated eye contact computer with peripheral connections used for group videoconferencing.

FIG. 60 illustrates the integrated eye contact computer 300 with the peripheral connections 360 utilized in group conferencing mode. Local conference participants 380 observe distant conference participants 378 on a large screen display 364. An external microphone 366, an external speakers 362, and an external camera 383, and the large screen 364 are all connected to the integrated eye contact computer 300 for operation during the videoconference. The distant participants may as well have the same computer or may have a traditional group system. A speaker line 374, a camera line 372, a monitor line 368, and a microphone line 370 connect the peripherals with the integrated eye contact computer 300. The integrated eye contact computer 300 is shown resting on a side table 382 but may be on the group table 470 and used during the group conference to control aspects of the conference such as document sharing or multipoint applications. In such a case the display 2 may display an image different than what is seen on the large screen display 364. The peripheral connection 360 may also be in part or entirely wireless to avoid laying out cable.

FIG. 61 illustrates the same positional function as described in FIG. 20 which is incorporated into the integrated eye contact computer 300. FIG. 62 illustrates an alternate positioning system that deploys a horizontal track 384 which permits the display 2 to slide back along with the beamsplitter terminal section 66 so that neither overhang the keyboard 60 and the essential work area 78 as seen in FIG. 63. The beamsplitter terminal section 66 and the display 2 when integrated into variations of the integrated eye contact computer 300 can slide back as seen in FIG. 64. FIG. 65 is essentially the same as FIG. 24 and further illustrates the display 2 and the beamsplitter terminal section 66 folded upon one another and parallel to the conferee opening up the essential work area 78. In this embodiment the display 2 and the beamsplitter terminal section are on a vertical track 386 so they can be lowered.

A significant aspect of the present invention is to create in one device a complete production studio on the desktop in the same space commonly utilized by the consumer for a personal computer. The integrated eye contact computer 300 is also applicable to other inferior, yet still relevant, eye contact display systems. These display systems as well benefit from an integrated approach that incorporates a personal computer with, as it relates to the present invention, a module port 316 for receiving videoconferencing modules as described and also configured with peripheral connections so that the terminal can be used for two modes: 1) A self contained single user mode, and 2) a group conferencing mode requiring additional components including an external microphone 366, external speakers 362, and a large screen display 364, and an external camera 383.

FIG. 66 illustrates the present invention of an integrated eye contact computer 300 with an eye contact transmissive display 390 in which an eye contact image is captured through the display 390 by the camera 4. Refinements to this fundamental eye contact system are all applicable. FIG. 67 illustrates a rear projection eye contact system of which a projection screen 394 is both transmissive for capturing eye contact images and also diffused for dispersing a projected image from a projector 392. This rear projection system can be configured as a consumer rear projection TV that is both analog and digital. FIG. 68 illustrates a camera view reflection eye contact arrangement with an ambient light shield 396 and a second ambient light shield 398. These fundamental eye contact technologies and their various refinements of FIGS. 66, 67, and 68, as well as other eye contact technologies, such as animating the direction of the eyes in real-time, benefits from the present inventions embodiments. This includes the videoconferencing module port 316 as well as the dual mode configuration as a single user terminal and a group videoconferencing system utilizing peripheral connections 340.

Figure 69:
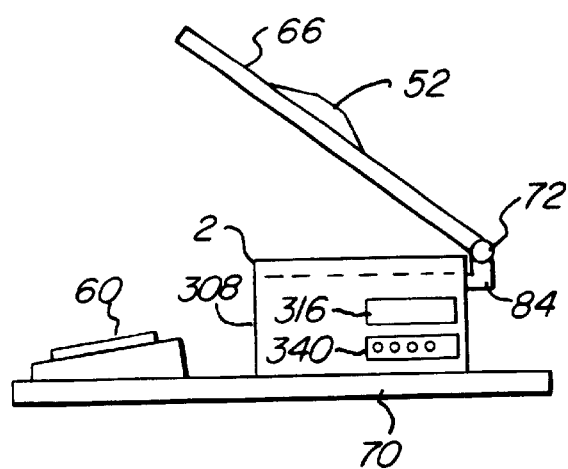
FIG. 69 illustrates a display built as a part of a personal computer and not forming a canopy over the desktop.
Figure 70:
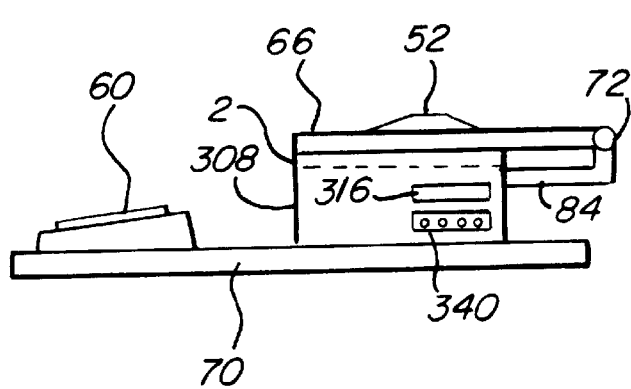
FIG. 70 illustrates a beamsplitter positioned away from a keyboard area when closed.
Figure 72:
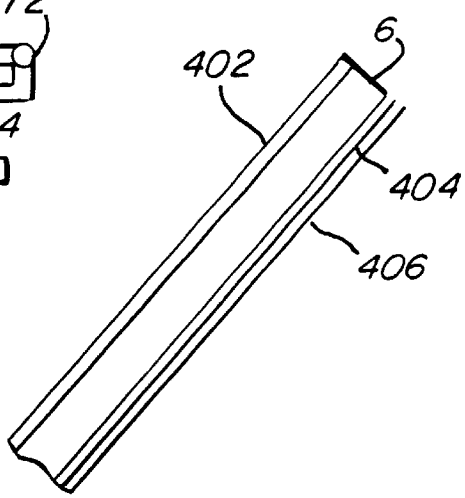
FIG. 72 illustrates an antireflective coating and a hard coat to protect the reflective coating.

FIG. 69 illustrates another configuration of the present invention where the display 2 is built into the integrated eye contact computer housing 300. In this configuration, the display 2 faces upward but it does not form a canopy over the desktop. The beamsplitter terminal section 66 when folded down will still cover the keyboard 60. FIG. 70 illustrates the embodiment of FIG. 69 where the beamsplitter terminal section 66 is positioned rearward as described for FIG. 20.

Figure 71:
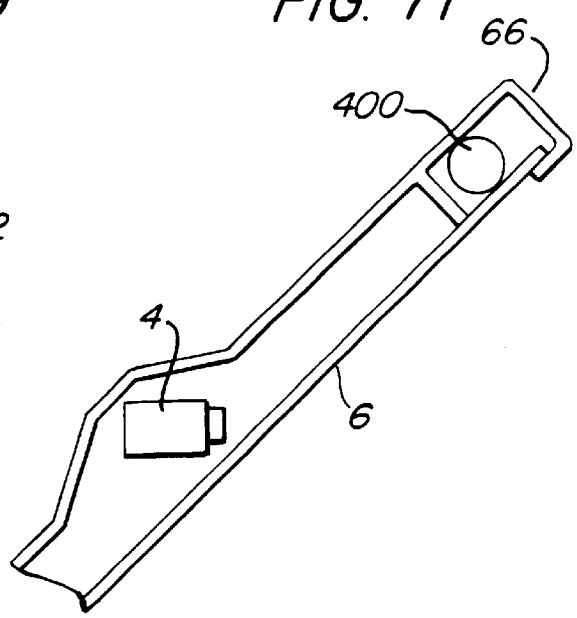
FIG. 71 illustrates a light concealed behind the beamsplitter.

FIG. 71 illustrates a concealed light behind the beamsplitter 6. Thin tube light 400 is preferably a dimmable color corrected florescent tube for illuminating the conferee. Certainly as consumers become accustomed to an integrated eye contact computer 300 additional video production elements can be included such as blue screens and other real-time visual effects.

A further embodiment of the present invention is the addition of a hard coat 406, such as clear polymer that is coated directly over the beamsplitter coating 404. In consumer applications, the durability of the beamsplitter coating 404 is of great importance. Many high-quality metallic coatings cannot withstand rubbing and scratch tests. The hard coat 406 assures extended life of the beamsplitter 6. On the rear side of the beamsplitter 6, an anti-reflective coating may be optionally deployed to reduce unwanted reflections. Likewise, the hard coat 406 can be layered on top of the antireflective coating 402 for protection (not shown).

Often while document sharing during a videoconference, the window displaying the remote conferee is reduced in size and moved to a corner of the image. Repositioning manually the camera into preselected sections in a supporting housing will serve adequately to maintain eye contact. Also elaborate camera movement systems can be used to relocate the camera to various positions behind the beamsplitter.

Various mechanisms have been explored for camera positioning and camera aiming. Motorized positioning and aiming systems have been developed to allow remote control of the camera. Also, autotracking systems permit the camera to follow the conferee as he or she moves about. The camera 4 can also be attached directly to the beamsplitter 6. When mounting the camera 4 to the beamsplitter 6 as seen in FIG. 12, the camera 4 aiming direction can operate independent of the positioning of the beamsplitter 6 such as in FIG. 11. Camera 4 can also be mounted in a position not directly behind the beamsplitter 6. In such a case mirrors or an image conduit can redirect the image passing through the beamsplitter 6 to the camera 4.

Additional teleconferencing components may be included as desired in terminals configured with the present invention. The camera 4 can be configured as a small detachable camcorder and thereby add the economy of serving multiple purposes. The camera 4 may, as well, be configured with remote controls. Lights can also be added as desired to enhance image capture quality. Lights may also be placed behind the beamsplitter 6 so long as they do not interfere with the display 2 image reflection. Microphones can be integrated into various terminal configurations with the present invention. Like the speakers 55 the microphones can advantageously aimed so that sound bounces off the beamsplitter 6. The addition of optical coatings, such as CRT radiation reduction filters, color filters and contrasts, and glare guard technologies, may be added as well. Also, 3-D displays and fresnel lenses that expand the size of the display image will readily integrate with this invention. Other modifications will be apparent as new teleconferencing, video camera, computer, and display technology transforms during this time of global telecommunication transition.

Of course, the teleconferencing terminal used as part of the current invention can be, and preferably is, a multipurpose personal computer running graphical interface program such as Windows 95®. Therefore, the graphical interface can be used to place calls, select views, etc. That is, if a conference call is undertaken between several conferees, the various conferees can be displayed in separate windows on the screen. One particular conferee can be selected to occupy the entire display 2 by choosing the conferee's window using a keyboard, a mouse, a touch screen, or similar user input means.

Figures 73, 74:
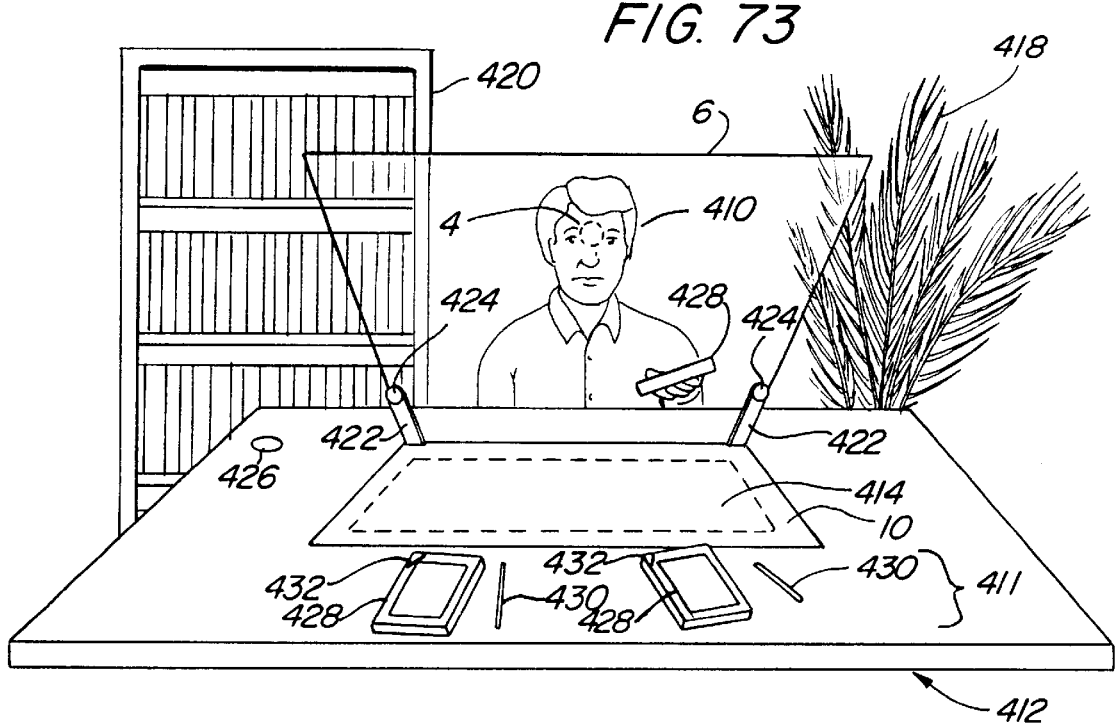
FIG. 73 illustrates the present invention built into a table surface and in a room environment.
FIG. 74 illustrates a roll-about variation of the present invention in a room environment.

FIG. 73 illustrates the present invention demonstrating the appearance of a imaged conferee 410 seen as a reflection of an image bearing screen 414 of display 2 (display 2 not shown since it is embedded in a constructed table 412). The eye contact camera 4 is mounted behind the beamsplitter 6 for capturing eye contact images as described previously. The beamsplitter 6 is supported by a pair of angle supports 422. As described in the original parent U.S. Pat. No. 5,777,665 of this continuation-in-part, the eye contact display is built into a piece of furniture (Col. 5 lines 44–50) and creating the appearance of a floating beamsplitter (Col. 5 lines 44–47). The entire terminal appears to be a clear piece of glass (beamsplitter 6) that is see-through. An advantage of this see-through property is that the environment behind the beamsplitter 6 can be seen, such as a bookshelf 420 and a plant 418. Also, a back edge 416 of the table 412 can be seen through the beamsplitter 6. The back edge 416 and other objects in the environment serves to assist as visual references so that an imaged conferee 410 can be clearly placed and associated within the environment. The impression originally created with the present invention is that of true "virtual presence" where a person can appear to sit on the other side of the desk in the same environment, such as a group conferencing room or office. Likewise, the same effect is observable with this invention when people are sitting around a meeting table. Ultimately, virtual presence simulates natural conversational arrangements involving two or more remotely located people that appear to be sharing the actual space of each conferee. Typical conversational arrangements are, most usually, around a table or over a desk. Other conversational arrangements, such as two or more people conversing while standing, can be simulated in virtual presence using the present invention. Virtual presence requires, to be effective, the see-through aspect of the present invention and consideration of eye contact, cultural distance while conversing, and life-size imaged conferees. Also sound the seems to be generated directly from the imaged conferee's 410 mouth helps in creating this experience of presence (see FIG. 14).

Common to teleconferencing is the use of two displays in which one is used for video and the other for data collaboration, powerpoint presentations, recorded video and other media content. Commonly these displays are placed next to each other so the conferees are confused when watching the imaged conferee 410 and other imaged conferees (not shown) because they are uncertain if the imaged conferee 410 is looking at their conferencing screen or at the other media screen. FIG. 73 teaches the use of a novel system that uses a media displays 428 in a working zone 411 so that each conferee may look down at the media displays 428 then look up to make eye contact while conferencing by looking into camera 4. The experience is as if conferees are sitting at a table and naturally look down at notes then up to make interpersonal connection with eye contact. The media displays 428 can be interactive with a stylus 430 or any other data input technology. The media displays 428 (as seen in FIG. 73) are configured as potable handheld tablet PCs—one for each local conferee (conferees not shown) and the imaged conferee 410. The media displays 428 have an optional wireless emitter 432 and a second emitter 426 located on the table which is then connected to related computer, media and/or teleconferencing equipment. Optionally other displays, such as notebook and PDA displays, can be used as the media display 428 or in concert with the media display 428. These other displays would then be outfitted with sensors and collaborative software.

Another aspect of virtual presence is that the imaged conferee 410 can be seen life-size which aids further in eliminating distracting elements that are unnatural to everyday conversation, such as speaking to images of people that are, for example, 50% smaller-than-life. In the parent U.S. Pat. No. 5,777,665 life-size imaged conferees is presented as an option that enhances the conferencing experience (Col. 6 lines 60–65) and large displays to produce life-size conferees are also presented (Col. 5 lines 39–43). Of course, any aspect of the present invention can be designed to image smaller-than-life and larger-than-life conferees. For example, a see-though display may be constructed with a 15" flat panel which will image a smaller-than-life person. For many applications, such as PC monitors and videophones, a large display may not be practical. However, the see-through aspect of the present invention will afford a much greater sense of virtual presence than a common display. Also, smaller terminals can be configured to display the imaged conferee 410 within and among visual references of the environment as if the person (though smaller-than-life) is sitting on the other side of the desk and amongst common room objects for associating the placement of the image of the imaged conferee 410. Variations in terminal designs of the see-through aspect of the present invention can be seen in the FIGS. 6–9 of the parent U.S. Pat. No. 5,777,665 and also in the original text.

The constructed table 412 may be any type of common furniture from. desks, side tables, boardroom tables, any shaped table and desks, folding tables and desks, cubical systems, credenzas, and the like and kiosks. The present invention can be built in or placed on top of any appropriate furniture. The present invention can also be in its own roll-about housing or other custom made housing. The present invention can, as well, have its various components, such as the display 2 and the beamsplitter 6, custom fitted into a room or a room can be designed specifically around the present invention with separated components.

Sensors 422 (FIG. 73) are optionally included to serve a variety of functions. The sensors can be used to track the movement of the conferee and the camera adjusts to the movement real-time. The sensors 422 can also create an invisible data grid (not shown) so that the conferee 82 (not shown) can point her hand is a specific locale in air in front of the beamsplitter 6 and operate, for example, a graphical user interface. Various technologies, such as microwave and pattern recognition, can create an invisible data grid.

The image blocking film 10, as seen in FIG. 73, is optionally laid upon the image bearing screen 414 and may rest in place simply by gravity. The image blocking film 10 can have a protective piece of covering glass (not shown) above it that can be the size of the image bearing screen 414 or the entire constructed table 412 (not shown). Likewise the image blocking film 10 can be the size of the entire constructed table 412 (not shown). Antireflective coatings can be added to the covering glass to reduce unwanted reflections. As described later for FIG. 74 the beamsplitter 6 can fold down and be used as a table surface. The image blocking film 10 would block the View the display 2 improving the appearance of the, beamsplitter 6 table surface. Likewise, as seen in FIG. 13, image blocking film 10 mounted to the back of the beamsplitter 6, when closed upon the image display 2, would block the display 2 from the conferee 82.

FIG. 74 illustrates the present invention among a room 434. An additional common object that can serve as a visual reference is a chair 438. The chair 438 is optional and is not needed to simulate a person sitting on the other side of the constructed table 412. The visual reference of the back edge 416 of the constructed table 412 along with other common room objects such as the plant 418 serves quite well in establishing the location of an image reflection position 436. The chair 438 is optional since commonly people do not see the chair when someone is sitting in it anyway. Ultimately the present invention is ideally configured to be used in a common room environment in which the random objects in the room all aid in creating visual references. Even objects on the conferee's 82 side of the beamsplitter 6 serves as a visual reference (i.e., the front edge of the table, desk, etc.). Likewise, in a retail environment the present invention can be configured as a kiosk that has common products and advertising displays in the environment serving as visual references.

FIG. 74 illustrates one possible configuration and that is a roll-about table on a wheels 454. The wheels 454 may be simple casters for manual pushing or can be motorized controlled. The beamsplitter 6 folds down toward the image bearing screen 414 making a compact roll-about with a low center of gravity. The side of the beamsplitter 6, opposite the image bearing screen 414, serves as a glass table top when in the closed position. The beamsplitter closes by means of a main hinge 448 and opens smoothly by gas shock spring 450. An extension table ledge 444 hinged by a ledge hinge 446 permits a working surface to be lifted into use and then closed so that the entire terminal can fit through doorways. The extension table ledge 444 also may be detachable and store separate, upon or inside the eye contact terminal. The conferee 82 is illustrated sitting in a chair 440 and seeing-through the beamsplitter 6 to the image reflection position 436 (imaging the imaged conferee 410) positioned on the other side of the constructed table 412. The camera 4 is aligned to capture an image of the conferee 82 through the beamsplitter 6. As shown in the parent U.S. Pat. No. 5,777,665 FIG. 9 the camera 4 can be a completely separate component which permits it to be placed at any distance from the beamsplitter 6 by the consumer or professional installer. The camera 4, though remote, can be attached to a positioning system 468 so that it can be raised, lowered and moved left and right so that accurate eye contact alignment is achieved. Also, the camera 4 can include pan/tilt/zoom features and autotracking. The PTZ functionality, as well as the positioning system, can be configured with a remote control operation so that any of the conferees can control the image capturing of camera 4.

FIG. 74 also illustrates the present invention with an optional motorized display positioning mechanism 452 that can raise and lower the display 2 affixed to a front hinge 449. The front hinge 449 can also be moved up and down for further display 2 positioning options (not shown). The mechanism 452 can be attached to the gas shock spring 450 and work in tandem or separate. Those skilled in the art will appreciate the various motorized and non-motorized methods of adjusting the beamsplitter 6 and the display 2 so that the image reflection position 436 can be placed in the desired location. Also, additional movement that can be motorized is the raising and lowering of the beamsplitter 6 and its placement front to back in relation to the display 2 (see FIG. 11 as originally illustrated and described in parent U.S. Pat. No. 5,777,665, Col. 7 lines 64–67 and Col. 8 lines 1–6). If the display 2 in FIG.74 is slanted away from the conferee 82 and thereby blocking a direct view of the image bearing screen 414 then the image blocking film 10 can be optionally removed.

FIG. 74 illustrates a built-in media display 442 located in front of the conferee 82. The built-in media display 442 is affixed to the extension table ledge 444. An optional shield can cover the built-in media display 442 (not shown). All the previous descriptions related to the media display 428 of FIG. 73 is applied to the built-media display 442.

As illustrated in parent U.S. Pat. No. 5,777,665 the transparent see-through aspect of the present invention was originally illustrated in FIGS. 6–9 as fully configured see-through eye contact products. The sizes of the display 2 in FIGS. 6, 7, and 9 can be of any size ranging from 5" diagonal to 50" diagonal or more. Ideally a 40" plasma panel would be used so that the consumer could purchase the eye contact display and install it themselves and enjoy a virtual presence teleconferencing terminal that is see-through, has eye contact, and images life-size conferees (see Col. 5 lines 35–36 of U.S. Pat. No. 5,777,665 for reference use of a plasma panel). The see-through aspect of the present invention was discussed at some length in the parent U.S. Pat. No. 5,777,665 in regards to the effects of light behind the beamsplitter 6 and how it affects the reflectivity of the beamsplitter 6. Opaque material 50, as seen in FIG. 12, is presented as an option. FIG. 13 presents a method of adding image blocking film to the rear of the beamsplitter 6 to control ambient light and thereby maintain the see-through property of the present invention. To enhance the see-through property of the present invention the parent U.S. Pat. No. 5,777,665 teaches adjusting the optical properties of the beamsplitter (Col. 7 lines 6–9), reducing the amount of light behind the beamsplitter 6 and thereby increasing the luminance of the reflected image (Col. 8 lines 20–24), and by adding lights to illuminate and highlight the area behind the beamsplitter 6 so long as it does not interfere with the reflectivity of the beamsplitter 6 (Col. 10 lines 32–35). FIG.74 illustrates a room light 466 that serves the very purpose of highlighting the environment behind the beamsplitter 6 so that it is readily apparent through the beamsplitter 6 yet does not interfere with the image reflected on the beamsplitter 6. Ultimately, the art is all about the competition of light which when executed well will clearly show the imaged conferee 410 among the common objects serving as visual references in a common setting, such as a group conferencing room or office, behind the beamsplitter 6. Those skilled in the art will appreciate the obvious potential of elaborate lighting arrangements in fully designed and controlled lit rooms serving as dedicated teleconferencing spaces.

The room 434 of FIG. 74 is preferably a common group teleconferencing space or office rather than a highly controlled environment. The colors of walls, such as a back wall 458, and a ceiling 460, as well as windows (not shown), all can affect the transmission/reflectivity of the beamsplitter 6 for the positive and the negative. Rather than completely changing a room environment in its décor, adjustments to the beamsplitter 6 contrast tint value is preferred. Adjustable and changeable contrast tints of beamsplitter 6 have been deployed in many applications of the present invention with a great deal of success which has maintained the see-through property while simultaneously maintaining a bright reflection on the beamsplitter 6 from the image bearing screen 414. Also, antireflective coatings applied to the back side of the beamsplitter 6 (see parent U.S. Pat. No. 5,777,665 Col. 8 lines 57–60) greatly reduces unwanted reflections that may be captured by the camera 4.

To further enhance the reflectivity of the beamsplitter 6 is by optionally controlling the room 434 environment with a first sheet polarizer 476 and a second sheet polarizer 480 between the conferee 82 and the back wall 458 (FIG. 74). From the conferee's 82 perspective the polarizers can be adjusted to add variable contrast to the reflection of the image bearing screen 414 upon the beamsplitter 6. When standing or looking around the beamsplitter 6 the conferee 82 views only the second sheet polarizer 480. Hence, the environment has not been darkened and the room 434 can retain its original decor with light colored walls. The first sheet polarizer 476 can be adhered to the beamsplitter 6, separate from beamsplitter 6, between the conferee 82 and the beamsplitter 6 (not shown) and can even be worn as glasses by the conferee 82 (not shown). Also a third sheet polarizer 482 can be added to any room lights, such as the room light 466, and windows (not shown). Hence, from the conferee's 82 perspective the combination of the first sheet polarizer 476 and the third sheet polarizer 482 the room light 466, and any other light sources treated similarly, can be partially or completely blocked from view. Also, all the polarizers can be of differing tint values and polarizing properties.

It will be apparent to one of ordinary skill in the art that the present invention may use a variety of techniques to isolate the local conferee 410 from the background, such as a side wall 456 and other room objects such as chair 440 (FIG. 74). For example, only the imaged conferee 410 in FIG. 73 is seen in the reflection on the beamsplitter 6 from the image bearing screen 414 and not the imaged conferee's 410 native environment at his/her distant location. Our original constructions and on-going uses of the present invention have utilized a variety of techniques to isolate the conferee from the background. Of course, chromakey techniques can be used as well as painting the side wall 456 a dark color. Also, 3-D mapping cameras with realtime processing capabilities can be used as well as image processing software.

Image processing software, such as taught in U.S. Pat. No. 5,764,306, has the advantage of not requiring adjustments to the room's 434 decorative style. An optional wireless cabling system is seen with a camera emitter 470 and wireless video signal receiver 472 (FIG. 74). The video signal (analog or digital) from the camera 4 is seen entering via a video line 473 into an image processor 474 which may be a common personal computer with video processing hardware and or software which will perform real-time background extraction of one or all the video signals (analog or digital) utilized in the teleconference. Another advantage of real-time background extraction is that the local conferee can adjust the image of the imaged conferee 410 to ideally suit his see-through eye contact display. While the see-through nature of the present invention is enhanced by these common isolating techniques the present invention does not require it. Ultimately, it is the consumers' choice of how they will use and deploy the present invention with a see-through transparent image display.

Another optional method of controlling the background behind the local conferee 82 is with the combined use of the first sheet polarizer 476 and the fourth sheet polarizer 478. A side wall 456 can now be any color and can even have a window (not shown). The combination of the sheet polarizers 476 and 478, the camera 4 can capture any degree of "dark" according to the adjustment between the polarizers. The first sheet polarizer 476 can placed as shown in FIG. 74 or can be closer to the camera 4, affixed to the camera 4 or on the conferee's 82 side of the beamsplitter. The room 434 may also be a clear glass or plastic cubical or videophone booth. All descriptions for the room 434 and the use of polarizers in controlling the environment are applicable to a transparent room and transparent kiosk structures. The polarizers can be arranged so that the public can see the conferee 82 and not see the image of the imaged conferee for a certain degree of conference privacy. Also dimmable electronic shutters, such as polarized suspended particle shutters, can be used as the transparent walls to select the degree of privacy of these rooms from the outside public.

While it is preferred that present invention be built into self-contained products it may be advantageous with very large displays to mount the display 2 above the beamsplitter 6 with the image bearing screen 414 facing downward (see FIG. 7 for one possible configuration). FIG. 74 illustrates one possible placement of display 2 with the image bearing screen 414 facing down as seen in downward screen position 462. Of course, the beamsplitter 6 would be adjusted to accommodate the downward screen position 462 so that the image reflection position 436 is properly placed. The downward screen position 462 can be angled so that the conferee cannot view directly the image bearing screen 414. Also, image blocking film can be added to block the image bearing screen 414 when in the downward screen position 462 (not shown).

Typically the beamsplitter 6, in relation to the display 2, is angled roughly between 30 to 60 degrees to one another. Unusual configurations that are less than 30 degrees or more than 60 degrees are, as well, applicable to all the relevant embodiments and claims of the present invention. Whether the display 2 is in the position as seen in FIG. 74 or in the downward screen position 462 (also seen in FIG. 74) it may be advantageous to tilt the display 2 so that the beamsplitter 6 is more perpendicular to the conferee 82. One advantage is that the beamsplitter 6 would appear to be less slanted. Another advantage is that the area on the camera 4 side of the beamsplitter 6 that is reflected can be minimized and more highly controlled. These unwanted reflections may interfere with camera 4 image capturing. The ceiling 460 and other parts of the environment may need to be altered to reduce the source of the unwanted reflection. Additional uses of sheet polarizers (not shown) can reduce the source of the unwanted reflection as well darkening the source of the unwanted reflection by adjusting lights, painting, adding and removing decorative coverings and so on. Though this may be feasible for some uses of the present invention, out-of-the-box consumer versions will require more sophisticated solutions for reducing unwanted reflections, all of which will be discussed in the forth coming illustrations and description.

Also seen in FIG. 74 is an optional front projector 464 that projects images onto the back wall 458. Instead of projecting onto the back wall 458 a transparent screen, such as a common transparent holographic screen, as well as other common front projection screens can be used. Other displays as well can be used that are not front projection, such as plasma panels. Since the beamsplitter 6 is transparent additional displays seen through the beamsplitter 6 by the local conferee 82 may offer additional productivity such as viewing simultaneously a data collaboration image or simply a video or still that might create a desired environment. Also, the layering of images can create the appearance that the imaged conferee 410 is actually in another setting.

Figure 75:
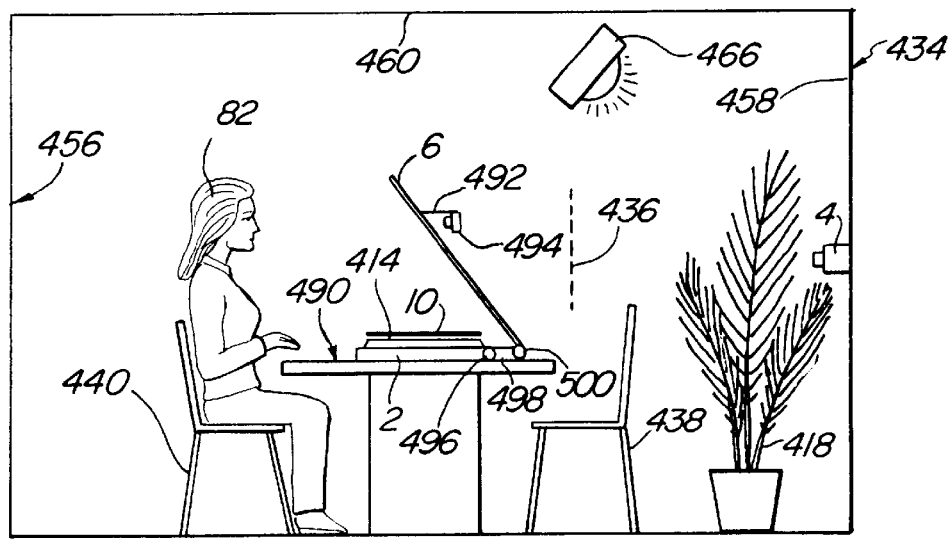
FIG. 75 illustrates a tabletop variation of the present invention in a room environment.
Figure 76:
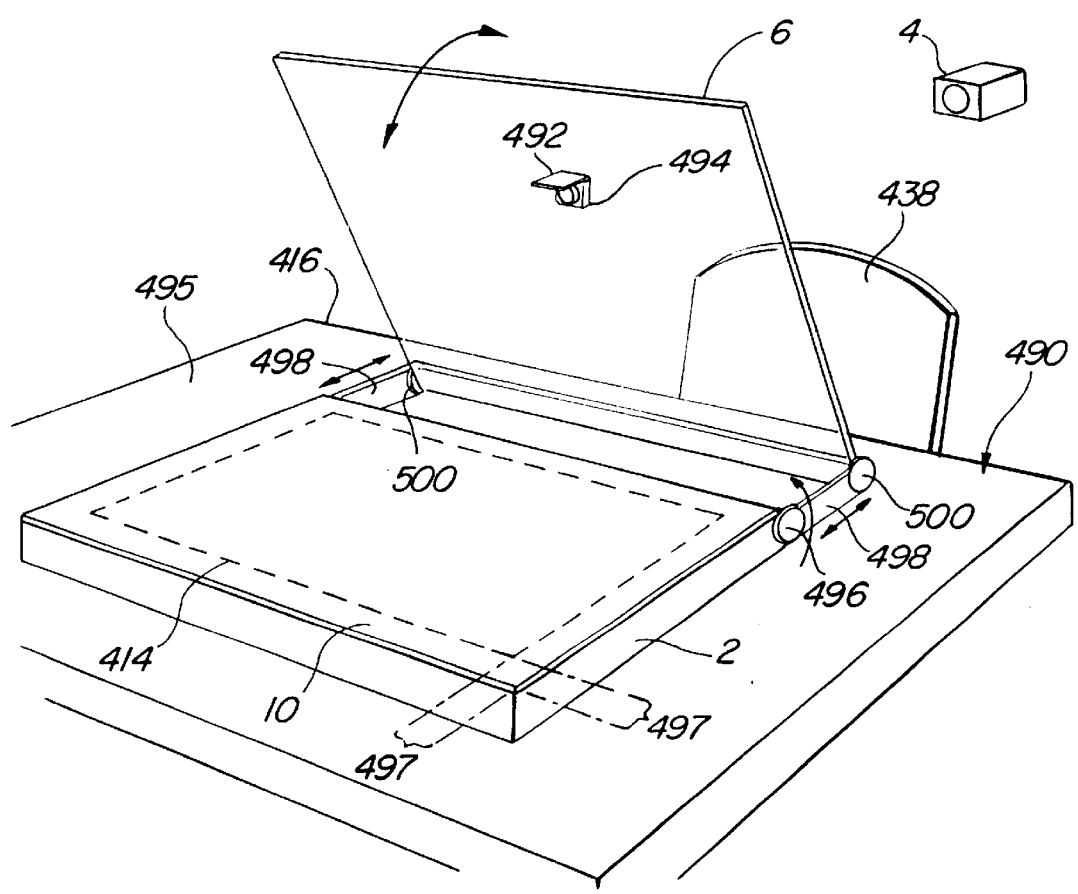
FIG. 76 illustrates a perspective view of FIG. 75.

FIGS. 75 and 76 illustrates a self contained see-through virtual presence display that can be simply placed on a common desk or table 490 that is a variant of the configuration as seen in FIG. 6. Here the display 2 is large enough to display a life-size image and incorporates a swivel first hinge 496 and second swivel hinge 500 connected by rear extensions 498. The rear extensions 498 are extendable allowing for a back and forth adjustment permitting a wide range of beamsplitter 6 positioning. The hinges 496 and 500 permit the beamsplitter 6 to be positioned above and away from the display 2 so that the image reflection position can be positioned as desired among the visual references, such as back edge 416 of the common desk or table 490. Complete positioning of the beamsplitter 6 and the display 2, and consequently the adjustment to the image reflection position, is illustrated in FIGS. 10 and 11 of the parent U.S. Pat. No. 5,777,665. The beamsplitter 6 is also detachable and replaceable with a larger beamsplitter 6 so that more conferees can view the image in the image reflection position 436.

FIGS. 75 and 76 also illustrates the use of a micro camera 494 used instead of camera 4. Micro camera 494 is affixed to the backside of the beamsplitter 6, but can be self supporting and separate from the beamsplitter 6 by a variety methods such as transparent wires. A micro shield 492 blocks unwanted light that may reflect from the camera 4 side of the beamsplitter 6 and affect image capturing by the micro camera 494. The micro camera 494 and the camera 4 are interchangeable as it relates to their features and uses as described in the complete text and all illustrations herein.

Image blocking film 10, though optional, is ideally suited to the configuration as presented in FIGS. 75 and 76. The image blocking film 10 can rest (by gravity or lamination) on the image bearing screen 414. The image blocking film 10 can also be laminated to various clear substrates and may include antireflective coatings. A bezel area 497 on one or more sides of the display 2 are ideally the same color as the common desk or table surface 490. The reflection of not only the image bearing screen 414 is seen but also the bezel 497 and the surface 495. Ideally the bezel is dark and preferably black in color to match the color of black image blocking film, thereby creating the appearance to the conferee's 82 perspective of little visual difference between the image bearing screen 414 and the bezel 497. To further enhance seamlessly combining the image bearing screen 414 and the bezel 497 is to position the image blocking film 10 over the bezel 497 as seen in FIG. 76. To the conferee's 82 perspective both the image bearing screen 414 and the bezel 497 are blocked from view. Not only does this enhance design possibilities and improve aesthetics, but also fully conceals the view of the display 2. The conferee 2, unless informed, may not even be aware that there is an image bearing screen 414. The common desk or table surface 495 is also preferably dark in color or the display 2 can rest on a dark colored mat (not shown). The bezel 497 can also be constructed oversize to reduce the reflection of the surface 495. Likewise, retractable wings can be adjusted from the sides of the display to reduce the reflection of the surface 495 (not shown). Another method to reduce the reflection of the common desk or table surface 495 is to shape the beamsplitter to the minimum desired size and that shape may be trapezoidal or any other desired shape. All of these solutions presented are readily integrated into all the configurations of the present invention such as the canopy display configuration illustrated in FIG. 18.

Figure 78:
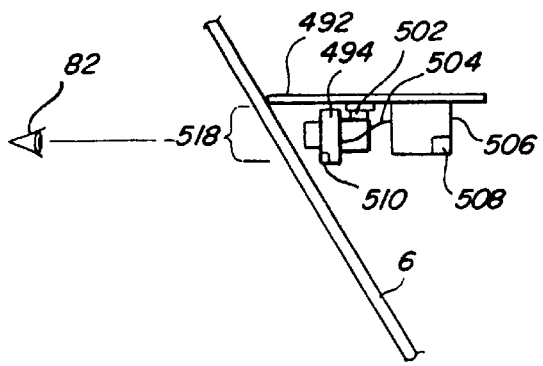
FIG. 78 illustrates a side view of FIG. 77.
Figure 77:
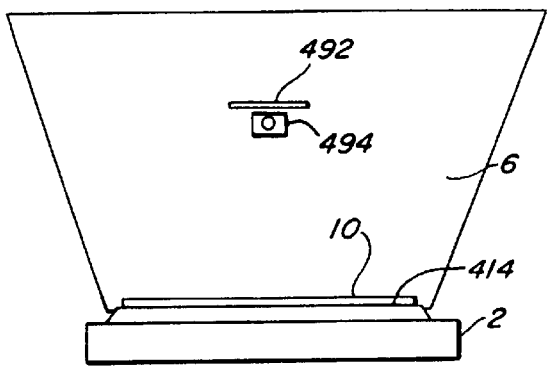
FIG. 77 illustrates a micro camera and a micro shield.

FIG. 77 illustrates a local conferee's 82 point-of-view where the micro shield 492 and the micro camera 494 are visually minimized so as not to greatly affect the see-through aspect of the present invention. FIG. 78 aligns various components so they remain out of view from the local conferee's 82 point-of-view. A micro pan/tilt device 502 and a wireless video transmitter 506 are aligned behind the micro camera 494 so they are not seen from the vantage point of the local conferee 82. A video line 504 cables the video signal from the micro camera 494 to the wireless video transmitter 506. Video emitter 508 transmits the video signal to a receiving unit (not shown). The micro pan/tilt device 502 is operated remotely by controls (not shown) and received by an infrared receiver 510. Any of the conferees involved in the teleconference can control the functions of the micro camera 494 and zoom lens (not shown), the pan/tilt device 502 and the video transmitter 506. Many methods of wireless transmission are possible, such as microwave, and the signal transmitted may be an analog or digital signal. A battery supply (not shown) can power the micro camera 494 and other components located with the micro camera 494. Ultimately, the goal is minimizing the obstruction of the see-through beamsplitter 6. It is also feasible to embed micro wires (not shown) in, onto or between (laminated layers) of the beamsplitter 6.

An optical transmission area 518 of the beamsplitter 6 is that portion of the beamsplitter that the camera is aimed through (FIG. 77). That optical transmission area 518 may have optical properties different than the rest of the beamsplitter 6. For example, the beamsplitter 6 may be contrast tinted (not shown) ,by polarization or common tinting, to enhance the reflection of the image bearing screen 414. The contrast tint may affect the image capturing of the micro camera 494 or camera 4. Hence, the optical transmission area 518 would not include contrast tint. The transition of differing optical characteristics in regions on the same beamsplitter 6 can be disguised by, for example, feathering techniques.

Figure 80:
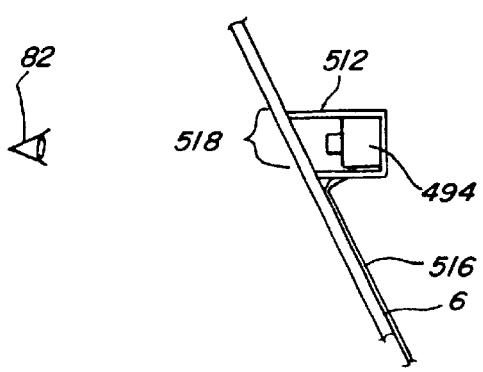
FIG. 80 illustrates a side view of FIG. 79
Figure 79:
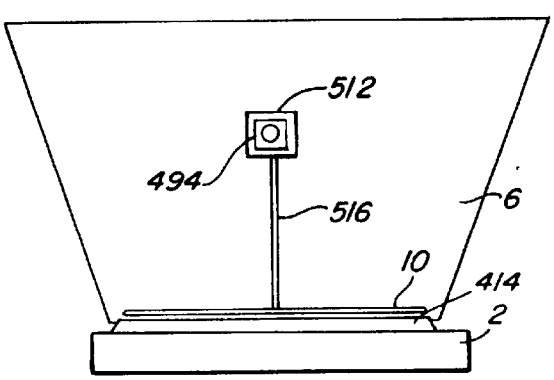
FIG. 79 illustrates a micro camera housing.

FIGS. 79 and 80 illustrates the use of a micro camera hood 512 that contains the micro camera 494. It may be desired to completely enclose the micro camera 494 so that it is not seen inside the micro hood 512 which may have black colored inside walls. The micro hood 512 assists in concealing the camera and removes the intrusion of ambient light from nearly all sides. Optionally, a micro cable bundle 516 supplies power to the micro camera 494 and transmits the video signal.

Figure 81:
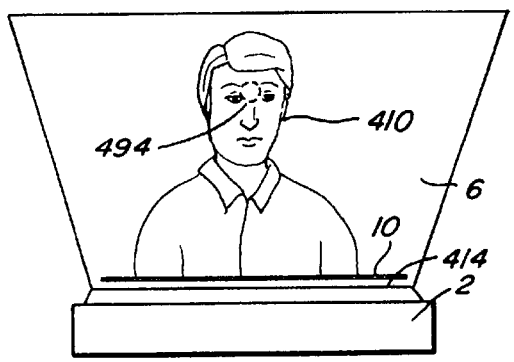
FIG. 81 illustrates a luminance intensity of a reflection of the remote conferee concealing a micro camera.

FIG. 81 illustrates the near complete concealment of the micro camera 494 (or camera 4), the micro shield 492, the micro hood 512, the micro cable bundle 516, and any other components by the luminance reflection of the imaged conferee 410 on the beamsplitter 6. The reflection of the imaged conferee 410 is sufficiently bright enough to block a good portion of the room 434 and cameras 494 and 4 from the conferee's point-of-view. While a conference occurs, the cameras 494 and 4 are concealed when the imaged conferee 410 is seen and the cameras 494 and 4 are exposed when no image is reflected upon the beamsplitter 6.

Figure 82:
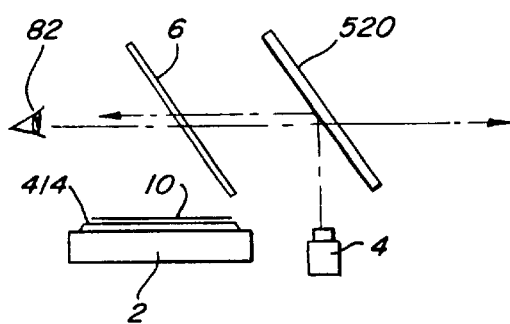
FIG. 82 illustrates a second beamsplitter for concealing a camera.

Camera 4 and 494 in any configuration of the present invention can be concealed by other methods as well. For example camera 4 and 494 can be painted to match the environment or given a non-reflective coating or shape. Antireflective coatings can be added to the lens of the camera 4 and 494 to minimize noticeable reflections (not shown). Also the camera 4 and 494 can be hidden in the environment, such as inside a clock or other spy camera techniques. In the parent U.S. Pat. No. 5,777,665 (Col. 10 lines 23–25) the use of additional mirrors to remove the camera 4 from the line of sight is taught. FIG. 82 illustrates the use of a second beamsplitter 520 so that the reflection of the local conferee can be captured while simultaneously the camera 4 is completely removed from the line of sight of the local conferee 72.

As described in parent U.S. Pat. No. 5,777,665 (Col. 10 line 39) 3-D displays may be incorporated into the present invention. In fact, display 2 may be any kind, of display including auto-stereoscopic and stereoscopic and pseudo 3-D, such as computerized and optical depth enhancement. Display 2 can, as well, be a 3-D front or rear projection system common 3-D supporting screen technologies. If in the case that a front projection beam may interfere with camera capturing of camera 4, polarizers or shutters can be included into the optical pathways. 3-D display technologies are numerous. Preferably the 3-D display is self-contained and does not require passive or active special eye wear (although such technologies have been configured with the present invention). 3-D content can be generated by either image processing of by specific 3-D camera technology and combinations of them both. In such circumstances, image processing hardware and software and 3-D camera technology can be included to the eye contact terminal of the present invention. Hence, it should be expressly understood that camera 4 and micro camera 494 may alternatively be a 3-D camera capturing system. Connection between various terminals of the present invention may include both 2-D and 3-D. For example, one terminal captures 3-D images but does not display 3-D images while the distant and connected terminal displays 3-D images and does not capture 3-D images. All the 3-D displays described thus far are substantially planar in that the image bearing screen 414 is not a dimensional 3-D display formed with concave and convex shapes. While the curved screen of a CRT screen is substantially planar unique 3-D displays may use screens that are highly dimensional forming representations of objects or persons. These unique dimensional 3-D screen displays are readily integrated into the embodiments of the present invention.

As originally described in parent U.S. Pat. No. 5,777,665 the present invention can be built into desks, tables and other furniture (Col. 5 lines 40–50). Logically desks, counters and cabinets built into furniture for retail applications such as kiosks are included. FIG. 83 illustrates the present invention as an eye contact terminal 522 built into a typical desk 528 and constructed for viewing from the location of the conferee chair 440 by the conferee 82. The typical desk 528 may be any kind and shape of desk and can be built into the desk surface of an office cubical. FIG. 84 illustrates a typical credenza 526 with the eye contact terminal 522 built in. The credenza is ideal for group conferences where the conferees sits at another table to view the terminal. The credenza is also ideally suited to be built with wheels so that it can be easily moved to various meeting rooms and offices. FIG. 85 illustrates the eye contact terminal built into a typical table 530 allowing one or more conferees to enjoy eye contact videoconferencing. FIG. 86 is a typical multi-seat table 532 in which each conferee can enjoy their own built-in individual eye contact terminals 522. The use of multiple cameras and dynamic switching can greatly improve the conferencing experience when numerous participants are involved. FIG. 87 illustrates the typical desk 528 which has built in the eye contact terminal 522 and a second eye contact terminal 524. The terminals can be angled to suit comfortable viewing by the conferee 82 and additional conferees. Two terminals can be used to show multiple imaged conferees with eye contact aligned cameras. Also, the second eye contact terminal can be used as a common data collaboration monitor and show other media as well. Two or more displays can be built into any of the furniture illustrated among FIGS. 83–88. FIG. 88 illustrates the eye contact terminal 522 built into a coffee table 534. The conferees relax on a sofa 536 for viewing the eye contact terminal 522. Wheels, for ease of rolling and moving, can be built into any of the furniture illustrated in FIGS. 83–88. The present invention, as well, can be built into a common consumer media cabinet.

Figure 89:
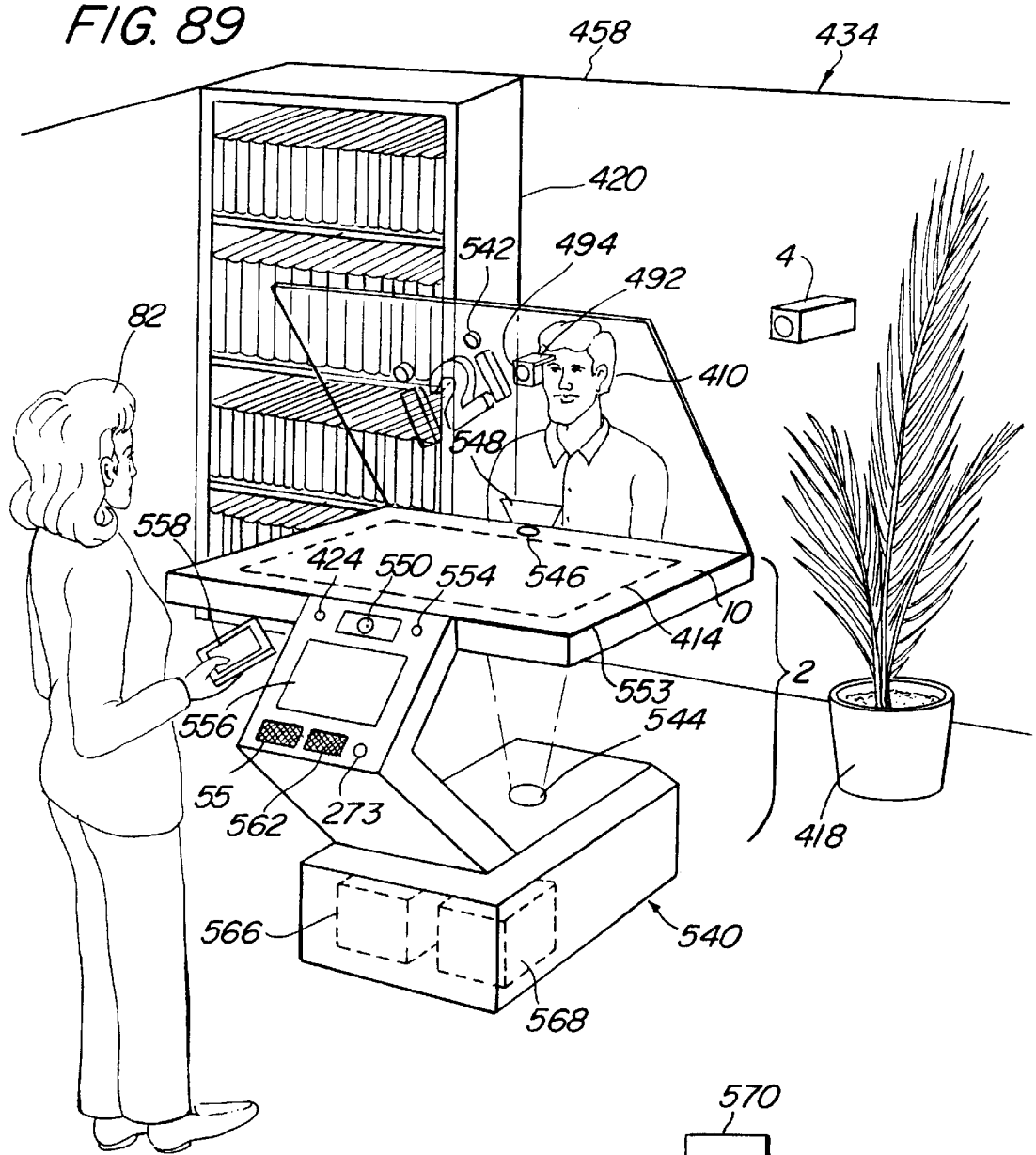
FIG. 89 illustrates the present invention constructed as a podium.

FIG. 89 illustrates the present invention configured as a podium 540. The podium 540 can be used to replace a speaker in front of an audience or it can be used as an interactive kiosk, such as a banking terminal with a video-conferenced teller. Interactivity can be achieved by numerous means which include an input touch screen 556 which can also serve the functions described for the media displays 428 (FIG. 73) and the built-in media display 442 (see FIG. 74). Also, interactivity has been utilized with a personal digital assistant 558 or other remote wireless capable device that uses a common wireless emitter/receiver 554. The podium 540 can use the camera 4 for eye contact or the micro camera 494 for eye contact. The applications of each as previously described are transferable to the podium 540. Additional conferencing components are included, such as the speaker 55, a microphone 273, sensor 424, generic conferencing system 566, and a computer 568. The podium 540 is ideally a fully self-contained videoconferencing terminal, it may, however, only contain a minimum number of components with other necessary components remotely located. The beamsplitter 6 can be replaceable with a larger beamsplitter 6 so many conferees can enjoy viewing the conference.

Display 2 as seen in FIG. 89 is uniquely combined inside the podium 540, the projector (not shown) is hidden from view under the projection hole opening 544. The projection beam passes through the projection hole opening 544 and forms an image upon a rear projection screen 553 forming the image bearing screen 414. As illustrated, the podium itself comprises the display 2 and permits the projection beam to pass unencumbered by a bulky housing. The podium 540 as illustrated creates a very sleek and thin profile display system. Of course common CRT displays can be used in the podium 540. A housing that encases the CRT would improve the appearance of CRT based podium (not shown). Also, the image bearing screen 414 can be slanted away as seen in FIG. 74. The very configuration as seen and described for FIG. 74 can be used as a podium if elevated from the floor 18 inches to 24 inches approximately. Hence, the features described for FIG. 74 such as a positionable display 2, a folding beamsplitter 6, roll-about and so on are all applicable to variations of the podium 540. Also, other features such as described for FIG. 11 for positioning the beamsplitter 6 in any direction in relation to the display 2 and thereby adjusting the location of the image reflection position 436 will be readily integrated into the podium 540.

The rear projection screen 553 can be fabricated to have a very narrow vertical viewing angle and thus serve to image block from the perspective of the conferee. Fabricated screens for image blocking are described for FIG. 38. The fabrication and selection of an image blocking rear projection screen often includes light directing optics such as, but not limited to, fresnel lenses, lenticular lenses, holographic substrates and micro prismatic substrates. One advantage to an image blocking rear projection screen is that these screens often have image brightness increases as the vertical viewing angle decreases. Image blocking film 10 is an optional feature with use of the podium 540.

FIG. 89 illustrates the present invention used in the room 434 among common objects such as the book shelf 420 and the plant 418 serving to associate the location of the image reflection position 436. All of the descriptions given for FIGS. 73 and 74 are transferable to the room 434 with podium 540. The teachings of the control of the room environment and modifications to walls, ceilings, lights, room polarization to enhance the image seen and the image captured, various techniques for replacing background, and so on are applicable and extensions of the terminal of the podium 540.

FIG. 89 also illustrates the use of an optional camera 546 that captures a reflection of the local conferee 82 from the beamsplitter 6. An optional angled contrast shield 548 will aid in the reflectivity of the beamsplitter 6 and is sized to match the area where image is captured in the reflection so as to not obscure the see-through quality of the beamsplitter 6. The contrast shield 548 can be feathered into the beamsplitter 6 so there is not a distinct line noticed by the conferee 82. Seen in the front of the podium 540 is a pan/tilt/zoom camera 550 that is optionally in lieu of or in conjunction with camera 4. Both optional camera 546 and the pan/tilt/zoom camera 550 are used when the podium is used in a one to many application where the eye contact aligned camera 4 and/or micro camera 494 is insufficient to capture the line of sight of, for example, a hundred viewers dispersed in a large room. Of course, when the conferee 82 stands close to the podium 540 the cameras 494 and 4 are ideally used.

FIG. 89 illustrates the optional use of a video content 542 that can be viewed in conjunction with or without the imaged conferee 410. Original constructions of the present invention in the form of furniture, desktop displays, and podiums for events and tradeshows utilized a variety of video productions, computer animations, and real-time interactive computer images that created the appearance that videographed objects and animations were floating. A simple black background and reflections, shading, and motion of videographed objects and animations contained in the video content 542 enhanced the floating effect. A common screen saver that adds dimension and a metallic appearance to a typed in word has created the floating appearance of animated content on the present invention in its earliest constructions. A black background has, as well, been commonly used in many applications of videoconferencing to improve the quality of the picture of the conferee 410 since the compression algorithms can work less on developing a background and be focused more on the image of the imaged conferee 410. It is obvious to one of ordinary skill in the video production and computer animation arts on how to create content for the present invention.

Figure 90:
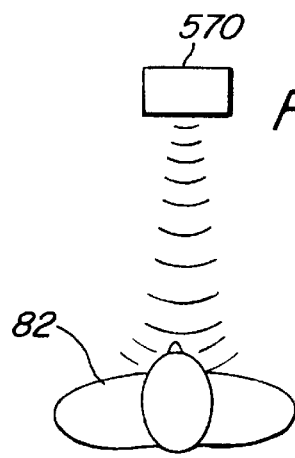
FIG. 90 illustrates a highly directional speaker integrated into the present invention.

FIG. 89 also illustrates the use of a highly directional ultrasonic speaker 562. As seen in FIG. 90 a self-contained highly directional ultrasonic speaker 570 can create an audio beam that when intersected by the conferee 82 produces the sensation of audio being generated only inches away and even the sensation of hearing audio with headphones. The extremely narrow audio beam is especially useful during eye contact videoconferences where one or all of the eye contact terminals are in public spaces and audio privacy is needed. For example, in use with eye contact desktop systems a call center or office cubical where others can listen in on the audio portion of the videoconference, this speaker technology will add privacy without the need to hold a phone receiver or wear a mini headphone. In the podium 540 the highly directional ultrasonic speaker 562 enables a privacy mode for conducting, for example, financial transactions with a videoconferenced bank teller in a public space. In group videoconferencing the ultrasonic speaker technology can be used with individual beams on each conferee creating their own personal audio hearing zone. It is likely the technology will be used together with common speakers creating a general audio conference for all to hear and simultaneously a private audio conference. For example, it is possible to create the natural experience of leaning over to whisper something to the person next to you during a meeting with many people.

FIG. 91 illustrates the present invention in which a controlled environment is seen inside a cabinet 576. Here the conferee 82 looks into the cabinet 576 with visual references, such as the back edge 416 of the cabinet table 572. The parent U.S. Pat. No. 5,777,665 (Col. 5 lines 47–49) teaches the use of incorporating the present invention inside a cabinet and also sideways. A sideways placement can be seen in a virtual presence cabinet 578 (FIG. 92) imaging a standing life-size person (not shown) in the image reflection position 436. A birds eye view of the virtual presence cabinet 578 is seen in FIG. 93. Display 2 is optionally a large rear projection system consisting of an image projector 580 and a projection mirror 582. Included inside the cabinet 578 is a visual reference object console 574. It is possible that the imaged conferee 410 (not shown) can appear to interact with the console 574 or other objects.

Whether the display 2 is sideways, above or below, the present invention can be configured into rather large systems that image into entire room areas. Beamsplitter 6 can be configured in excess of 20 feet diagonal to achieve this end. The imaged conferee 410 and other imaged conferees can appear to walk around inside the virtual presence room (not shown). Also, conferees from several remote locations can appear inside the virtual presence room. One configuration is that several conferees from differing remote locations all appear to be sitting around the same table in the virtual presence room. Rather than a single large beamsplitter 6 many smaller beamsplitters 6 can be configured to reflect from a single display 2 or many displays 2 to create the appearance that several remotely located conferees are sharing the same physical space in a virtual presence room (perhaps seated around a table). Close attention to camera placement behind the beamsplitter(s) 6 and multiple cameras 4 may be needed to ensure a natural sense of eye contact within a group conversational dynamic. Much effort in the art has gone into configuring group conferencing with multiple displays. The present invention improves upon these efforts by the addition of one or more see-through eye contact virtual presence systems as described herein.

FIG. 94 illustrates the use of a motorized horizontal track 594 to position the micro camera 494 left or right by a clear support rod 592 attached to a slide plate 596. As the conferee 82 moves from a viewing position 586, the micro camera 494 is no longer behind the imaged conferee 410 in the reflected place 584. As the conferee 82 moves into a new view location 588 the imaged conferee 410 appears to be in a new reflected place 590. Hence, the micro camera 494 should move left or right to match the movements of the conferee 82 and maintain correct micro camera 494 placement for eye contact. The system can be configured as an auto-tracking system so that the movement of the conferee 82 is matched by the movement of micro camera 494 left or right. A more elaborate system can move the micro camera 494 up and down if the conferee should move up and down (not shown). Also, the micro camera 494 can have a micro pan, tilt, and zoom to adjust for the conferee's 82 movements as well (not shown). Another advantage is that the micro camera 494 is always concealed from the conferee 82 behind the bright image of the imaged conferee 410

FIGS. 95–101 present a variety of options to enhance the beamsplitter 6. A reflective/transparent optical coating 600 is applied to the display 2 side of the beamsplitter 6. To assist in concealing the edge of the beamsplitter 6 a curved edge 602 removes hard edges which are more noticeable (FIG. 95). Also, the edge of the beamsplitter 6 can be reduced in its appearance by the use of clear glass rather than soda lime glass with a green hue (FIG. 96). A safety film or coat 606 can be added or adhered to the beamsplitter 6 to protect installers and users from broken glass and it adds strength to the beamsplitter 6 (FIG. 97). Safety film or other laminating material 608 common to the optical laminating art can be used to adhere the beamsplitter 6 to a second clear substrate 609 (FIG. 98). Original constructions of the present invention used a variety of laminated substrates to the beamsplitter 6 including clear glass and plastic, tinted glass and plastic, opaque black plastic (FIG. 12), and image blocking film (FIG. 13). A rear antireflective coating or film 610 can be added or adhered to the camera 4 side of the beamsplitter 6 to aid in eliminating unwanted reflections that may affect image capturing by the camera 4 (FIG. 99). A clear film material 612 may comprise the reflective/transparent optical coating 600 (FIG. 100). A contrast tinted clear substrate 614 and/or a contrast tinted clear layer (coating or film) 616 may be added to the beamsplitter 6 to add contrast and increase the reflectivity of the beamsplitter 6 (FIG. 101). Combinations and modifications of the beamsplitter 6 will be apparent to those skilled in the art and each installation of the present invention may benefit from a selection of beamsplitter 6 options.

FIG. 102 illustrates a laminated beamsplitter constructed with the contrast tinted beamsplitter 614 and an ultra-thin chemically hardened beamsplitter 618 similar to the chemically hardened glass beamsplitter 266 as seen in FIG. 41. The beamsplitter 618 is used in the same manner as the beamsplitter 6 in all the embodiments of the present invention. The chemically hardened beamsplitter 618 may also be heat tempered hardened as well. The ultra-thin substrate substantially reduces double images as described in FIG. 40 making it ideal for reflecting very high resolution displays. The beamsplitter 618, since it is so thin, is slightly bendable which will affect the quality of reflecting the display 2. Laminating the beamsplitter 618 to a rigid clear substrate, tinted substrate or dark colored substrate will add the needed support to prevent bending. When laminating to a contrast tinted substrate 614 or an opaque substrate (not shown) a pass-through camera hole 620 is needed (unless the tint value is so low it does not affect image capture by camera 494). Also, this laminated beamsplitter construction is ideal for use in eye contact displays, both large and small, due to the increase in strength for frameless mounting as described later for FIG. 107. Improvements upon the embodiment of FIG. 102 include any of the described variations for FIGS. 95–101.

It may be advantageous to laminate the image blocking film 10 to add a protective layer, to add antireflective coatings and to reduce reflections and increase contrast of the image bearing screen 414. FIG. 103 illustrates the image blocking film 10 laminated to a first adhesion layer 628 to a first clear substrate 630 and a second adhesion layer 624 to a second clear substrate 622. To improve contrast and reduce reflection, the first clear substrate 630 is optionally mounted by an optional adhesion layer applied in area 626 to the image bearing screen 414. FIG. 104 illustrates the image blocking film 10 laminated to the image bearing screen 414 by the first adhesion layer 628 and. laminated to the second clear substrate 622 to the second adhesion layer 624. FIG. 105 illustrates the image blocking layer 10 laminated to the image bearing screen 414 by the first adhesion layer 268. The clear substrates 630 and 622 can be plastic or glass, flexible or rigid, and can included tinting within or upon the substrates and antireflective coatings to any sides.

As originally stated in parent U.S. Pat. No. 5,777,665 (Col. 5 lines 5–35) the image blocking film 10 can be any material that performs the image blocking objectives of the present invention. As advancements in the art and new materials become available they will readily serve as image blocking film 10. There are several new image blocking technologies in development and the inventors are assisting these firms in the specifications of these technologies. For example "Black Shelf Film" available from Tomen America Inc., New York, N.Y., has great promise for use with small and large displays. The image blocking is embedded into a lenticular prisms with "black shelves." The unusual medium has a slight magnification effect which, if it is applied close to the image bearing screen 414, enhances the depth of the image. As new technologies for image blocking film 10 become available they will be readily integrated into the present invention as taught and is covered within the scope of the present invention. Minor adjustments, such as placing lenticulations and louvers at a slight bias to avoid image distortions with, for example, LCD screen pixel rows, will be apparent to one of ordinary skill in the art.

As seen in FIG. 106 is a dimmable contrast layer 630 that upon an electrical charge can shift from a clear state to an opaque state and degrees between. The use of suspended particles, such as polarized particles, can be used to adjust degrees of tint. FIG. 48 presents the use of polarizers that can be physically adjusted between a clear state to a dark state. Those in the optical art no full well that while adjusting from clear to dark two polarizers there are gradations of tint between. Such application with the present invention is certainly desirable in selecting the degree of tint of the beamsplitter 6 and thereby increasing the reflectivity of the beamsplitter 6 to match a given room 434 environment. The use of an electronically initiated dimmable contrast layer 630 is a further enhancement since physically adjusting polarizers is not needed.

A self supporting beamsplitter 6 is illustrated in FIG. 107. A housing beamsplitter mount 629 assists in creating the appearance of a floating beamsplitter as originally taught in the parent U.S. Pat. No. 5,777,665 (col. 5 lines 45–47). The beamsplitter mount 629 has been used in the present invention configured as videophones, PC monitors and in large group conferencing systems. The beamsplitter 6 is of adequate strength to support an angled position. Lamination of other rigid opaque or transparent substrates to the beamsplitter 6 have also been used in our original constructions to improve strength, safety, and reducing bowing. Also, laminating transparent safety film to the beamsplitter 6 has proved to be highly effective in providing strength and reducing bowing. Many constructions of the present invention have supported a 0.025 inch thick beamsplitter 6 from one edge of the beamsplitter 6. These applications often used 0.025 inch thick glass with the overall dimensions of 6 feet by 4 feet. The present invention can support the beamsplitter 6 from a portion of one edge, a portion of two edges or a portion of three edges (these variations originally illustrated in FIGS. 6, 8 and 9 of parent U.S. Pat. No. 5,777,665). By mounting the beamsplitter 6 directly to one to three sides has greatly improved the overall functionality of the present invention since a surrounding support frame (not shown) has not been used to support the beamsplitter 6. A surrounding support frame would lose the effect of a floating beamsplitter and a surrounding support frame would serve as a visual distraction when viewing the image reflection position 436 located beyond the surrounding support frame. Another method to support the beamsplitter 6 without a support frame is by hanging it with thin wires. To further enhance the appearance of a floating beamsplitter is to include a separation space 628 which is an open space between the bottom of the beamsplitter 6 and the image display 2.

Figure 108:
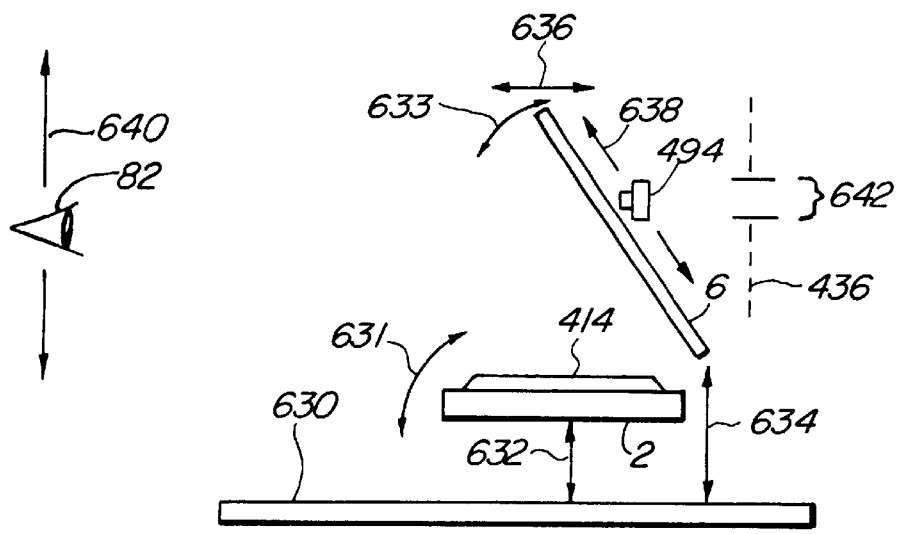
FIG. 108 illustrates various positioning methods to align the camera with the reflection from the conferee's point of view.

FIG. 108 illustrates the present invention with adjustability to accommodate the height of the conferee 82. A generic surface 630 can be the floor, a table or any surface. As the conferee 82 moves up and down or conferee 82 is symbolically represented by many conferees of various heights the position of the conferee 82 can vary (a conferee direction 640). As the conferee 82 is higher or lower to the camera 494, the camera 494 can shift out of an ideal eye contact zone 642 within the image reflection position 436. To resolve this issue the display 2 can be raised or lowered a first direction 632, the display can be tilted by an first arc direction 631, the beamsplitter 6 can be raised or lowered by a second direction 634, the beamsplitter can be tilted by a second arc direction 633, the camera can be raised or lowered up and down by a direction 638 (direction along the angle of the beamsplitter 6 or simply straight up and down), and the beamsplitter can be moved back and forth by a direction 636. Two or more of the adjustments can work in concert to resolve the issue or each can work independently and each be the sole solution. Also, motorized systems can operate one or more of the directions 632, 634, 638, and 636, as well, as the angle of the beamsplitter.

Figure 109:
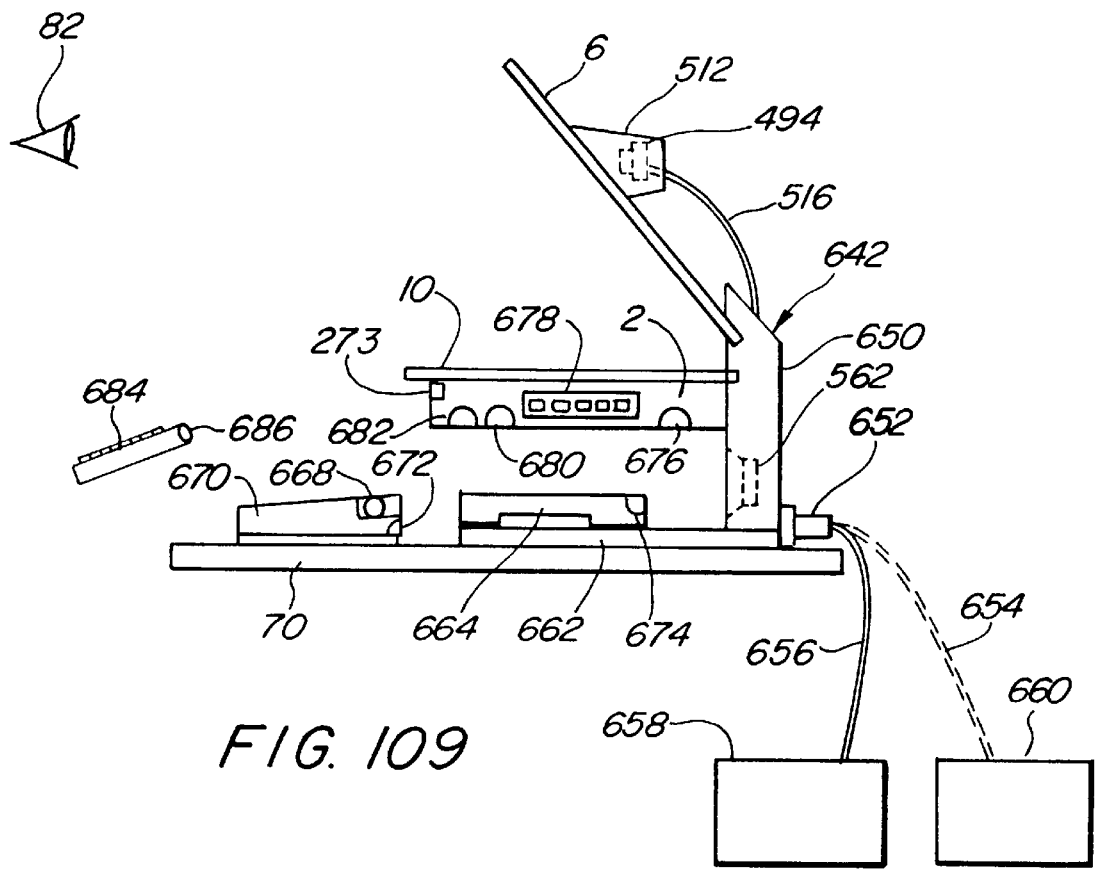
FIG. 109 illustrates an integrated eye contact terminal with a remote PC and videoconferencing appliance.

FIG. 109 illustrates a cable management system of the present invention in which a remote videoconferencing appliance 658 and or a remote PC 660 (with or without videoconferencing capability) is slaved to a sample eye contact terminal configuration 642. Various functionality inherent to the appliance 658 and the PC 660 are transferred to and through the terminal 642. An appliance cable bundle 656 and a PC cable bundle 654 can be integrated into a custom cable with custom connections, a simple bundle of many cables or the connectivity to the sample eye contact terminal configuration 642 can be a wireless connection (not shown). Functions such as a control pad 678 that would be typically mounted to the appliance 658 or the PC 660 is located on the terminal 642. Other components that would typically be located on the appliance 658 or the PC 660 are a wireless keyboard and mouse emitter 676 wirelessly connected to a keyboard emitter 672 of a wireless keyboard 670, a wireless phone emitter 680 that is wirelessly connected to a phone receiver emitter 674 of a handheld receiver 664, and a remote control emitter 682 wirelessly connected to the remote control emitter 686 of a remote control 684. Other components such as the microphone 273, ultrasonic speaker 562, and the camera 494 can be wirelessly connected to the terminal 642 (not shown). All the above mentioned components can be hard-wired connected, as well, to the terminal 642. Ultimately, the terminal 642 serves as a slave device to the remotely located appliance 658 and/or the remotely located PC 660 possessing critical components that would otherwise be located with the appliance 658 and PC 660. The terminal 642 serving as a slave device also serves as a "bridge" between the appliance 658 and the PC 660 to other components such as the wireless keyboard 670. The on/off control of the appliance 658 and the PC 660 may, as well, be cabled to and through the terminal 642. The described cable management system of FIG. 109 greatly reduces the mess of cables on a desktop and in a group conferencing room when the terminal 642 is constructed as a larger eye contact display. Also, the solutions described integrate readily with off-the-shelf videoconferencing appliances and PCs. Also, shown in FIG. 109 is a keyboard conferencing light 668, a sample terminal base 662 and a sample terminal stem 650. Of course the present invention can be constructed with a videoconferencing appliance and/or videoconferencing PC built in. The added space required, however, may affect the sleek appearance of several desktop designs of the present invention due to the added component bulk.

Figure 110:
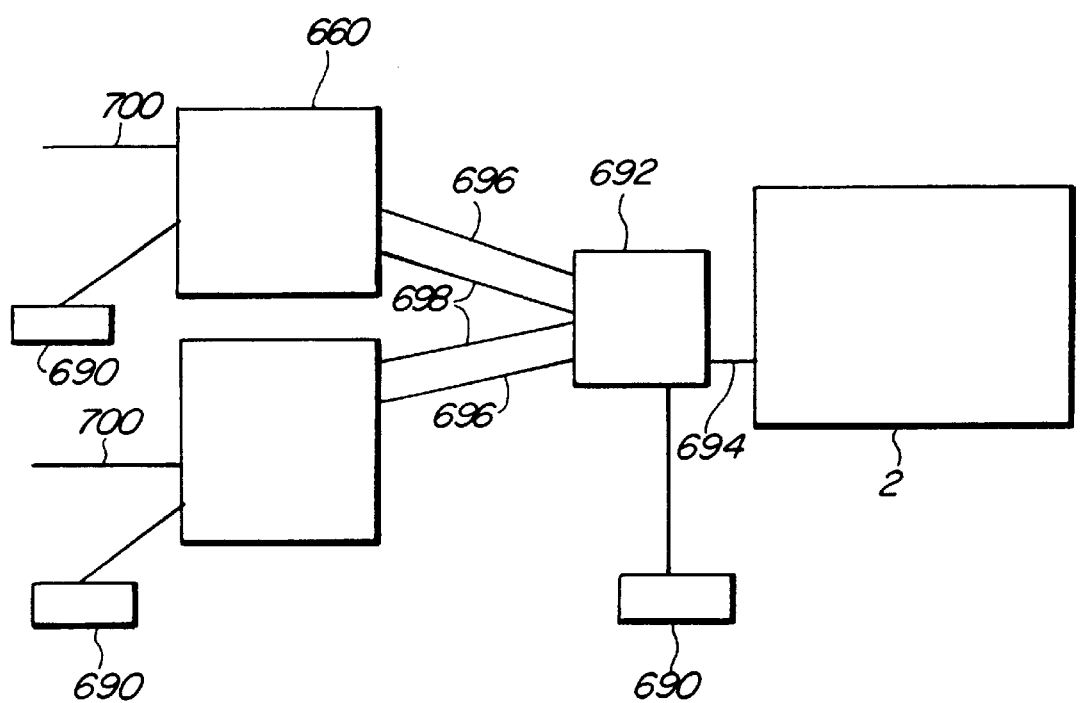
FIG. 110 illustrates the present invention with a multi-format display screen that can display a television image and a computer image.

FIG. 110 illustrates the use of the display as a multi-format display that can display both television video (NTSC, PAL, SECAM, HDTV, and so on) and computer video (VGA, XGA, SXGA, UXGA, and so on). A display electronics 692 is capable of producing both a computer video signal and a television video signal for the particular type of display 2. Enhanced electronics, such as deinterlacers, will greatly improve the quality of television video scaled to be shown on the display 2 with native pixels to show computer video. The display electronics is connected to the display by a signal cable 694. The display electronics 692 receives a television video signal 696 and a computer video signal 698 from either the remote videoconferencing appliance 658 or the remote videoconferencing PC 660. The appliance 658 and PC 660 can be remote or located inside a housing with the display 2 (not shown) and are connected to a common videoconferencing connection via a connection line 700. The display electronics 692 may be located with the display 2 or the appliance 658 or the PC 660. The television and computer video signals 696 and 698 can be digital or analog. Switching between television and computer video modes is initiated by a generic switch 690 connected to one or more of the appliance 658, the PC 660, and the display electronics 692. Switching can be manual, audio initiated and automatically programmed. The generic switch 690 may be wireless and embedded in to functions on a keyboard, remote control, PDA, and so on. The advantage of the dual video display are many. In conferencing the conferee can switch between a television signal videoconference and then view the data collaboration image in its native resolution. Also, consumers are wary of having two displays on their desktops. Hence, the present invention can be configured as a television signal videophone and then switch to serve as the desktop computer monitor. Common videoconferencing uses so little resolution that scaling to high resolution video screens creates significant artifacts. The present invention will afford the use of customized and new generation video display electronics to reach the highest possible quality of low resolution video shown on high resolution displays.

As seen in FIG. 18 of the present invention a notebook computer can be used in a variety ways with the canopy formed by display 2 over the table 70. The notebook's screen can fold all the way back and be inserted under the canopy. The notebook display signal can be routed to the display 2 for viewing any type of video imagery including, of course, videoconferencing. The consumer will appreciate that as software coders improve the videoconferencing system may be entirely performed by a notebook. The notebook can, as well, not be inserted under the canopy but simply placed in front of the display 2. Now the conferee 82 can view both the eye contact image and the notebook screen for data collaboration. The notebook can create both video signals or a separate videoconferencing PC or an appliance can produce the videoconference seen on the display 2. The camera, as well, might be removable and used both with the eye contact display and the notebook display. Other components can be interchangeable, as well.

As illustrated in FIG. 12 opaque material 50 can be applied to the back of the beamsplitter 6 to enhance the reflectivity of the beamsplitter 6. Preferably this opaque material 50 is a simple black plastic panel that can be removed if the conferee 82 so desires. Also, a black colored light absorbing felt can be added or removed as desired. The opaque material 50 can be used with any of the configurations and embodiments described and illustrated.

All the configurations of the present invention are to be construed as a terminal. Whether the terminal has all components integral in an out-of-the-box product or an elaborate room arrangement where all the components are installed separately and many feet way from one another, they are all eye contact terminals. FIG. 9 illustrates separate components so that the consumer can place components in relation to one another as desired. For example, the camera 4 can be placed a few inches or many feet away. The terminal configurations of the present invention can vary from fully integrated to fully separate.

The present invention may also be used without the camera 4 creating an eye contact image of the local conferee 82 to be transmitted to the distant conferee at a remotely located terminal. Camera 4 may be placed in other non-eye contact areas behind the beamsplitter 6, anywhere in room 434 or within or on the invention's components, furniture, and housings in order to capture an image of the local conferee 82. In this case the present invention can be practiced with all the teachings described including live videoconferencing images being reflected upon the beamsplitter 6 and placing the image reflection position 436 among the room environment with visual references for associating that exact position.

Ideally all conferencing participants at their locations would have one of the described videoconferencing terminals as presented here. It may be, however, that only one or a few in a conference will enjoy the features of the present invention. As the digital revolution continues the present invention will readily integrate with new digital cameras, digital displays and digital networks.

The terminal of the present invention can be used as a public access videoconferencing terminal. The great-great-grandparent U.S. Pat. No. 5,777,665 teaches that the present invention can be configured into numerous types of endpoint terminals including videophones (Col. 6, lines 31–37). Just as the common phone is central to a phone booth, so the present invention, as originally devised, is intended to serve within a videophone booth and other types of public access videoconferencing terminals and kiosks. Until such time that the cost of equipment is low enough for mass consumer saturation, individuals may desire to access a public videoconferencing eye contact terminal for temporary rental. Connected to public or private networks, such eye contact terminals can be readily available in common public areas, such as retail stores and airports. A monetary transaction system integrated with the present invention would enable quick access to other videoconferencing terminals. A monetary transaction system (not shown) can include one or more of a money receptacle, credit card swipe, data entry screen or pad for inputting financial information and verbal methods of input directly to a microphone connected to an audio interpretation device or a live operator.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An eye contact teleconferencing terminal for allowing a first conferee to maintain eye contact with a second conferee imaged by the teleconferencing terminal, the teleconferencing terminal comprising:

an image display with an image bearing surface;

a semireflective transparent panel forming an angle of between about 30 and 60 degrees with the image display for viewing by the first conferee a reflection of the image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel; and a positioning mechanism means so that the reflection of the image bearing surface is adjustable in a location it resides; and a room environment with common objects, providing visual reference to the residing location of the reflection within the room environment, the room environment viewed by the first conferee through the semireflective transparent panel.

2. The teleconferencing terminal of claim 1 wherein the positioning mechanism means alters the placement of at least one of the image display and the semireflective transparent panel.

3. The teleconferencing terminal of claim 1 wherein the positioning mechanism means operates by a motorized control altering the placement of least one of the image display and the semireflective transparent panel.

4. An eye contact teleconferencing terminal for allowing a first conferee to maintain eye contact with a second conferee imaged by the teleconferencing terminal, the teleconferencing terminal comprising:

an image display with an image bearing surface;

a semireflective transparent panel forming an angle of between about 30 and 60 degrees with the image display for viewing by the first conferee a reflection of the image bearing surface of the image display on the semireflective transparent panel;

a second conferee image isolated in a black background displayed on the image bearing surface;

a video camera disposed on a side of the semireflective transparent panel opposite the image display, the video camera capturing, through the semireflective transparent panel, an image of the first conferee who is disposed on the image display-side of the semireflective transparent panel; and a room environment with common objects providing visual reference to a residing location of the reflection within the room environment when the room environment is viewed by the first conferee through the semireflective transparent panel and its reflection of the black background.

5. An improved teleconferencing terminal for allowing a first conferee to maintain visual contact with a second conferee imaged by the teleconferencing terminal, the teleconferencing terminal comprising:

an image display;

a semireflective transparent panel forming an angle of between about 30 and 60 degrees with the image display for viewing by the first conferee a reflection of an image bearing surface of the image display on the semireflective transparent panel;

a video camera for capturing an image of the first conferee who is disposed on the image display-side of the semireflective transparent panel; and a room environment with common objects providing visual reference to a residing location of the reflection within the room environment when the room environment is viewed by the first conferee through the semireflective transparent panel and its reflection of the black background.

6. An eye contact teleconferencing terminal for allowing a first conferee to maintain eye contact with a second conferee imaged by the teleconferencing terminal, the teleconferencing terminal comprising:

an image display with an image bearing surface;

a semireflective transparent panel forming an angle of between about 30 and 60 degrees with the image display for viewing by the first conferee a reflection of the image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel; and a video camera concealment system so that the video camera is substantially prevented from being viewed by the first conferee by at least one of a reduction of the size of the camera, a painted bezel of the camera to blend with the room environment, an increase in the luminance of the image display, a second semireflective transparent panel for capturing the image of the first conferee, an anti-reflective layer disposed to a lens of the video camera, and a blending of the camera in with common objects in the room environment so that it is not readily associated as a video camera.

7. An eye contact teleconferencing terminal for allowing a first conferee to maintain eye contact with a second conferee imaged by the teleconferencing terminal, the teleconferencing terminal comprising:

an image display with an image bearing surface;

a semireflective transparent panel forming an angle of between about 30 and 60 degrees with the image display for viewing by the first conferee a reflection of the image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel; and a controlled room environment for controlling the effects of the room environment on video camera capturing, the controlling from at least one of adjusting the luminance a room lighting, a direction of a room lighting, a positioning of common objects in the room environment, a color of the room environment, a polarization of the room environment in conjunction with a second polarizer between the first conferee and the camera.

8. An eye contact teleconferencing terminal for allowing a first conferee to maintain eye contact with a second conferee imaged by the teleconferencing terminal, the teleconferencing terminal comprising:

an image display with an image bearing surface;

a semireflective transparent panel forming an angle of between about 30 and 60 degrees with the image display for viewing by the first conferee a reflection of the image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel; and a controlled room environment for controlling the effects of the room environment on viewing the reflection by the first conferee, the controlling selected from at least one of adjusting the luminance of a room lighting, a direction of a room lighting, a positioning of common objects in the room environment, a color of the room environment, and a polarization of the room environment in conjunction with a second polarizer between the reflection and the first conferee.

9. An eye contact teleconferencing terminal for allowing a first conferee to maintain eye contact with a second conferee imaged by the teleconferencing terminal, the teleconferencing terminal comprising:

an image display with an image bearing surface;

a semireflective transparent panel forming an angle of between about 30 and 60 degrees with the image display for viewing by the first conferee a reflection of the image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel; and a computerized image manipulating system for image manipulating to black a background of a video image of at least one of the first and the second conferees captured by at least one of the camera and a camera capturing an image of the second conferee for production upon the image bearing surface, the black background permitting the first conferee to view a room environment with common objects through the semireflective transparent panel.

10. An eye contact teleconferencing terminal for allowing a first conferee to maintain eye contact with a second conferee imaged by the teleconferencing terminal, the teleconferencing terminal comprising:

an image display with an image bearing surface;

a semireflective transparent panel forming an angle of between about 30 and 60 degrees with the image display for viewing by the first conferee a reflection of the image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel; and an adhesion means for attaching the semireflective transparent panel to a substrate.

11. The teleconferencing terminal of claim 10 wherein the substrate is transparent.

12. The teleconferencing terminal of claim 10 wherein a antireflective layer is disposed on the side of the substrate to reduce an undesirable reflection captured by the camera.

13. The teleconferencing terminal of claim 10 wherein the semireflective transparent panel is chemically hardened.

14. An eye contact teleconferencing terminal for allowing a first conferee to maintain eye contact with a second conferee imaged by the teleconferencing terminal, the teleconferencing terminal comprising:

an image display with an image bearing surface;

a semireflective transparent panel forming an angle of between about 30 and 60 degrees with the image display for viewing by the first conferee a reflection of the image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel; and a reflection reduction means for reducing an undesirable reflection captured by the camera upon the side of the semireflective transparent panel opposite the fist conferee by at least one of an antireflective layer disposed to the camera side of the semireflective transparent panel, a shield to block the undesirable reflection, a camera housing to block the undesirable reflection, an adjustment of the angle of the semireflective transparent panel, an adjustment to the color of a reflection source, an adjustment to the luminance intensity of the reflection source, and a first and a second polarizer in conjunction reduces the reflection.

15. An eye contact teleconferencing terminal for allowing a first conferee to maintain eye contact with a second conferee imaged by the teleconferencing terminal, the teleconferencing terminal comprising:

an image display with an image bearing surface;

a semireflective transparent panel forming an angle of between about 30 and 60 degrees with the image display for viewing by the first conferee a reflection of the image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel;

a layer of image blocking film disposed between the image bearing surface and the semireflective transparent panel allowing the image of the second conferee to pass through and reflect from the semireflective panel while blocking a direct view of the image display from the first conferee; and lamination adhesion layer for laminating the image blocking film to at least one of the image bearing surface, a antireflective layer adhered to a side of the image blocking film facing the image bearing surface, a antireflective layer adhered to a side of the image blocking film facing the semireflective transparent panel, a rigid transparent substrate facing the image bearing surface, a rigid transparent substrate facing the semireflective transparent panel, an antireflective coated rigid transparent substrate facing the image bearing surface and an antireflective coated rigid transparent substrate facing the semireflective transparent panel.

16. An eye contact teleconferencing terminal for allowing a first conferee to maintain eye contact with a second conferee imaged by the teleconferencing terminal, the teleconferencing terminal comprising:

an image display with an image bearing surface;

a semireflective transparent panel forming an angle of between about 30 and 60 degrees with the image display for viewing by the first conferee a reflection of the image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel; and a mounting bracket system for attaching to a first edge side of the semireflective panel, the panel being rigid and self-supporting without a surrounding frame.

17. The teleconferencing terminal of claim 16 wherein the system supports a second edge side of the semireflective transparent panel.

18. The teleconferencing terminal of claim 16 wherein the system supports a third edge side of the semireflective transparent panel.

19. The teleconferencing system of claim 16 wherein the system has a quick detach mechanism for removing the semireflective transparent panel.

20. An eye contact teleconferencing terminal for allowing a first conferee to maintain eye contact with a second conferee imaged by the teleconferencing terminal, the teleconferencing terminal comprising:

an image display with an image bearing surface;

a semireflective transparent panel forming an angle of between about 30 and 60 degrees with the image display for viewing by the first conferee a reflection of the image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel; and a second display observed by the local conferee for collaborating data, the second display positioned between the local conferee and the semireflective transparent panel and positioned so as to not obstruct the first conferee from viewing the reflection of the image bearing surface.

21. The teleconferencing terminal of claim 20 wherein the second display includes interactive input means.

22. The teleconferencing terminal of claim 20 wherein the second display is wireless in at least one of a image signal and a interactive communication means.

23. The teleconferencing terminal of claim 20 wherein the second display includes a computer.

24. The teleconferencing terminal of claim 20 wherein the second display is built into a structure that includes the image display.

25. An eye contact teleconferencing terminal for allowing a first conferee to maintain eye contact with a second conferee imaged by the teleconferencing terminal, the teleconferencing terminal comprising:

an image display with an image bearing surface;

a semireflective transparent panel forming an angle of between about 30 and 60 degrees with the image display for viewing by the first conferee a reflection of the image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel; and a connecting mechanism means so that the semireflective transparent panel closes toward the image bearing surface revealing the camera-side of the semireflective transparent panel facing upward and serves as a usable working surface.

26. The teleconferencing terminal of claim 25 wherein on the camera-side of the semireflective transparent panel is laminated a rigid transparent substrate.

27. The teleconferencing terminal of claim 25 wherein the camera is mounted separate of the semireflective transparent panel.

28. The teleconferencing terminal of claim 25 in which at least one of the image display, the semireflective transparent panel and the camera are constructed into a housing.

29. The teleconferencing terminal of claim 25 wherein the image display is mounted at an angle in order to block the first conferee's view of the image bearing surface.

30. The teleconferencing terminal of claim 25 wherein a support structure supporting at least the image display and the semireflective transparent panel is constructed upon a wheel arrangement so that the terminal may be easily rolled about.

31. An eye contact teleconferencing terminal for allowing a first conferee to maintain eye contact with a second conferee imaged by the teleconferencing terminal, the teleconferencing terminal comprising:

an image display with an image bearing surface;

a semireflective transparent panel forming an angle of between about 30 and 60 degrees with the image display for viewing by the first conferee a reflection of the image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel;

a support structure with a usable working surface side and on the opposing side is mounted the semireflective transparent panel; and a connecting mechanism means so that the semireflective transparent panel-side of the support structure closes upon the image display leaving the usable working surface exposed to the first conferee.

32. The teleconferencing terminal of claim 31 in which the terminal is constructed into a housing.

33. The teleconferencing terminal of claim 31 wherein the image display is mounted at an angle in order to block the first conferee's view of the image bearing surface.

34. The teleconferencing terminal of claim 31 wherein the support structure is constructed upon a wheel arrangement so that the terminal may be easily rolled about.

35. An eye contact teleconferencing terminal for allowing a first conferee to maintain eye contact with a second conferee imaged by the teleconferencing terminal, the teleconferencing terminal comprising:

an image display with an image bearing surface;

a semireflective transparent panel forming an angle of between about 30 and 60 degrees with the image display for viewing by the first conferee a reflection of the image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel; and a structure mounting in position the image display, the semireflective panel, and the camera, the structure affixed to wheels so that the terminal can easily be rolled about.

36. An eye contact teleconferencing terminal for allowing a first conferee to maintain eye contact with a second conferee imaged by the teleconferencing terminal, the teleconferencing terminal comprising:

an image display with an image bearing surface;

a semireflective transparent panel forming an angle of between about 30 and 60 degrees with the image display for viewing by the first conferee a reflection of the image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel; and a free standing housing constructed as at least one of a desk, a table, a credenza, a speaker's podium and a coffee table, the housing providing support for the semireflective transparent panel.

37. The teleconferencing terminal of claim 36 wherein the camera-side of the semireflective transparent panel is laminated to a rigid transparent substrate.

38. The teleconferencing terminal of claim 36 wherein the camera is mounted separate of the semireflective transparent panel.

39. The teleconferencing terminal of claim 36 wherein the image display is mounted at an angle in order to block the first conferee's view of the image bearing surface.

40. The teleconferencing terminal of claim 36 wherein the housing is constructed upon a wheel arrangement so that the terminal may be easily rolled about.

41. The teleconferencing terminal of claim 36 wherein a room environment with common objects provides visual reference to a residing location of the reflection within the room environment when the room environment is viewed through the semireflective transparent panel by the first conferee.

42. The teleconferencing terminal of claim 36 wherein a usable working surface extension is mounted between the housing and the first conferee, the extension being adjustable to be removed from an extension area it resides when extended.

43. An eye contact teleconferencing terminal for allowing a first conferee to maintain eye contact with a second conferee imaged by the teleconferencing terminal, the teleconferencing terminal comprising:

an image display with an image bearing surface;

a semireflective transparent panel forming an angle of between about 30 and 60 degrees with the image display for viewing by the first conferee a reflection of the image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel; and a selectably dimmable shutter means for permitting the first conferee to select between the range of a clear mode for observation through and beyond the semireflective transparent panel and an opaque mode for enhancing contrast of the reflection of the image bearing surface on the semireflective panel.

44. An eye contact teleconferencing terminal for allowing a first conferee to maintain eye contact with a second conferee imaged by the teleconferencing terminal, the teleconferencing terminal comprising:

an image display with an image bearing surface;

a semireflective transparent panel forming an angle of between about 30 and 60 degrees with the image display for viewing by the first conferee a reflection of the image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel; and an electronically changeable image display for selecting between a computer image and a television image.

45. The teleconferencing terminal of claim 1 wherein the television image is used for teleconferencing and the computer image is used for data collaboration during the teleconference.

46. An eye contact teleconferencing terminal for allowing a first conferee to maintain eye contact with a second conferee imaged by the teleconferencing terminal, the teleconferencing terminal comprising:

an image display with an image bearing surface;

a semireflective transparent panel forming an angle of between about 30 and 60 degrees with the image display for viewing by the first conferee a reflection of the image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel; and a mechanical height adjustment system for raising and lowering the camera relative to the reflection of the image bearing surface.

47. The teleconferencing terminal of claim 46 wherein in the mechanical height adjustment system is motorized.

48. The teleconferencing terminal of claim 46 wherein mechanical height adjustment system is independent of the position of the semireflective transparent panel.

49. The teleconferencing terminal of claim 46 wherein the mechanical height adjustment system raises and lowers at least one of the image display and the semireflective transparent panel.

50. An eye contact teleconferencing terminal for allowing a first conferee to maintain eye contact with a second conferee imaged by the teleconferencing terminal, the teleconferencing terminal comprising:

an image display with an image bearing surface;

a semireflective transparent panel forming an angle of between about 30 and 60 degrees with the image display for viewing by the first conferee a reflection of the image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel;

a tinted layer for increasing the contrast of the reflected image by at least one of a layer disposed on a camera-side of the semireflective transparent panel, a layer being incorporated into the panel, and a layer being including in a reflective optical coating disposed on the image display-side of the semireflective transparent panel; and a non-tinted camera capture zone so that the camera captures images of the local conferee unaffected by the tint layer.

51. An eye contact teleconferencing terminal for allowing a first conferee to maintain eye contact with a second conferee imaged by the teleconferencing terminal, the teleconferencing terminal comprising:

an image display with an image bearing surface;

a semireflective transparent panel forming an angle of between about 30 and 60 degrees with the image display for viewing by the first conferee a reflection of the image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel;

terminal housing supporting the image display, the semireflective transparent panel and the video camera;

a remotely located appliance teleconferencing system for at least processing incoming and outgoing audio and video signals; and a cable management system for transferring functions from the remotely located teleconferencing system and transferring those functions, in at least one of, to and through the terminal housing.

52. An eye contact teleconferencing terminal for allowing a first conferee to maintain eye contact with a second conferee imaged by the teleconferencing terminal, the teleconferencing terminal comprising:

an image display with an image bearing surface;

a semireflective transparent panel forming an angle of between about 30 and 60 degrees with the image display for viewing by the first conferee a reflection of the image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel;

a terminal housing supporting the image display, the semireflective transparent panel and the video camera;

a remotely located teleconferencing personal computer system for at least processing incoming and outgoing audio and video signals; and a cable management system for transferring functions from the remotely located teleconferencing personal computer system and transferring those functions, in at least one of, to and through the terminal housing.

53. An eye contact teleconferencing terminal for allowing a first conferee to maintain eye contact with a second conferee imaged by the teleconferencing terminal, the teleconferencing terminal comprising:

an image display with an image bearing surface;

a semireflective transparent panel form an angle of between about 30 and 60 degrees with the image display for viewing by the first conferee a reflection of the image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel; and a monetary transaction system for collecting fees for temporary use by the first conferee of the image display, semireflective transparent panel and the video camera for a teleconference session.

\* \* \* \* \*